United States Patent
Naito et al.

(10) Patent No.: US 6,456,930 B1
(45) Date of Patent: Sep. 24, 2002

(54) METHOD OF AND DEVICE FOR REQUESTING GUIDE INFORMATION, METHOD OF AND DEVICE FOR SUPPLYING GUIDE INFORMATION, AND COMPUTER PRODUCT

(75) Inventors: Hirohisa Naito; Kuniharu Takayama; Yoshiharu Maeda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/947,532

(22) Filed: Sep. 7, 2001

(30) Foreign Application Priority Data

May 31, 2001 (JP) .......................................... 2001-165766

(51) Int. Cl.[7] .................................................. G06G 7/48
(52) U.S. Cl. ........................ 701/207; 701/213; 701/208; 701/25
(58) Field of Search ................................. 701/207, 208, 701/200, 205, 210, 211, 213, 25; 340/988

(56) References Cited

U.S. PATENT DOCUMENTS 5,961,571 A * 10/1999 Gorr et al. .................. 701/207
5,991,692 A * 11/1999 Spencer, II et al. .......... 701/213
6,252,544 B1 * 6/2001 Hoffburg ..................... 701/213
6,351,698 B1 * 2/2002 Kubota et al. ............... 701/209
6,336,072 B1 * 6/2002 Takagama et al. ........... 701/202

FOREIGN PATENT DOCUMENTS

JP         2001-215211 A      8/2000

* cited by examiner

*Primary Examiner*—Richard M. Camby
(74) *Attorney, Agent, or Firm*—Staas & Halsey LLP

(57) ABSTRACT

The device includes a current position information acquiring section that acquires current position information related to the current position of a car every fixed interval of time, a matching processing section that carries out a matching between a target position information located on a route through which the car travels and the current position information, a control unit which, if there is a match between the target position information and the current position information, requests a guide information supplying device to send guide information related to the target position information, through a radio link, a radio station, a traveling object network and the Internet, and a display section that displays the guide information supplied from the guide information supplying device through the Internet, the traveling object network, the radio station and the radio link.

24 Claims, 48 Drawing Sheets

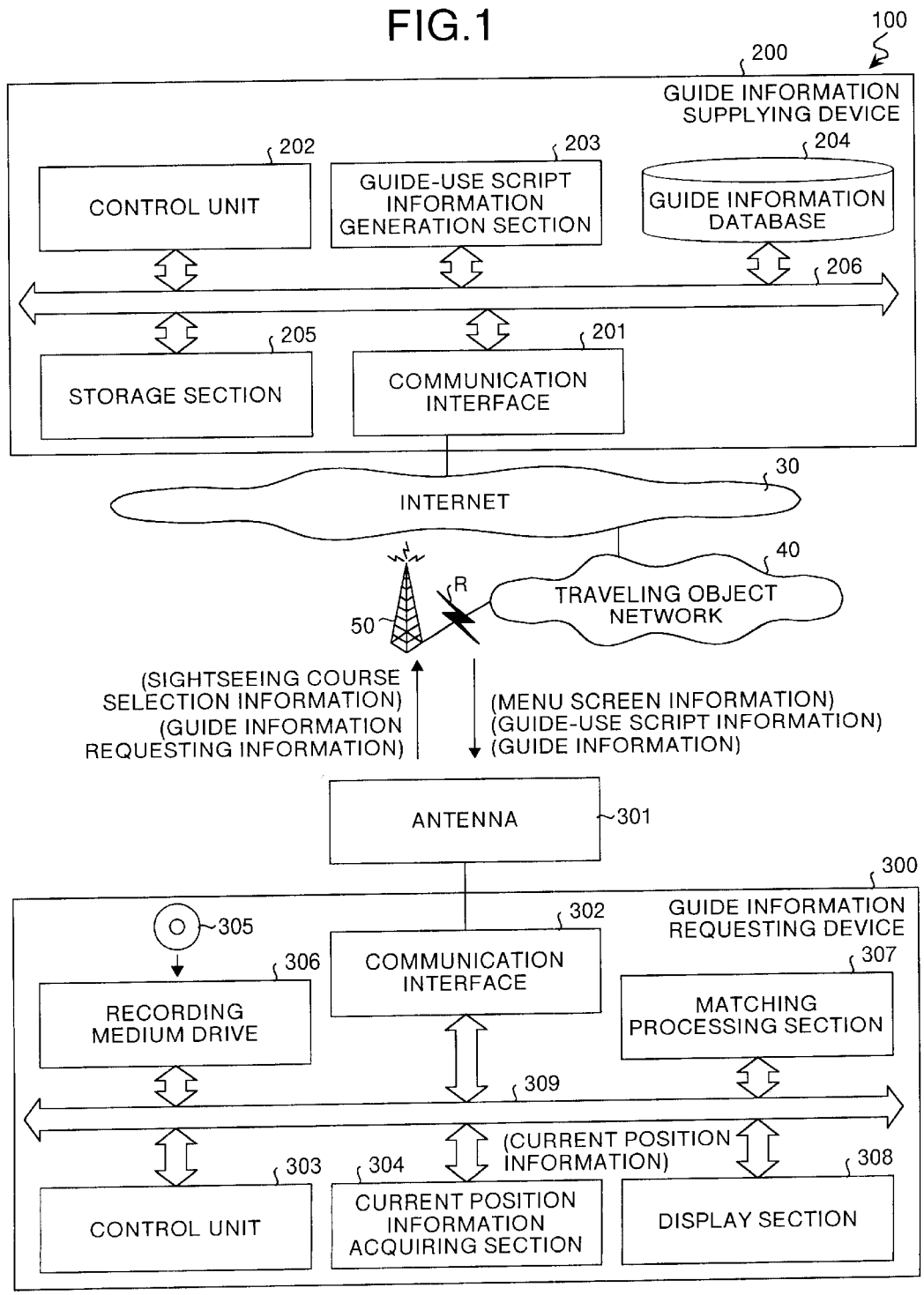

FIG.2

| | TARGET POSITION INFORMATION | NAME | ADDRESS | CATEGORY | RADIAL AREA | GUIDE INFORMATION | |
|---|---|---|---|---|---|---|---|
| Pa | N35.40.39.0 E139.46.18.1 | TOKYO STATION | TOKYO CHUO WARD | STATION TRAINS SUBWAY | 1.0km | THE BUILDING MADE OF RED BRICKS AHEAD OF US IS TOKYO STATION. TOKYO STATION WAS BUILD IN THE YEAR PP. IN TOKYO STATION, POPULAR TOKYO SOUVENIR RR IS SOLD. | Za |
| Ph | N35.49.20.12 E139.46.1 | IMPERIAL PALACE | | NOTED PLACE | 10.0km | WE CAN SEE THE IMPERIAL PALACE OVER THE MOAT.WE ALSO SEE THE DOUBLE BRIDGES ... | Zh |
| Pi | N35.49.20.12 E139.46.1 | XYZ DEPARTMENT STORE | | DEPARTMENT STORE | 0.5km | XYZ DEPARTMENT STORE IS IN A SUMMER SALE. ... | Zi |
| Pb | N35.40.19.96 E139.46.13.122 | NISHI GINZA IC | | METROPOLITAN EXPRESSWAY | 0.7km | METROPOLITAN EXPRESSWAY CHARGE 700 YEN TRAFFIC JAM OF 3 KM IN THE VICINITY OF SS ... | Zb |
| Pj | N35.45.30.85 E139.45.12.10 | Q DEPARTMENT STORE | | DEPARTMENT STORE | | GIFT SALE ... ... | Zj |
| Pc | N35.38.5.7 E139.45.42.6 | RAINBOW BRIDGE | | METROPOLITAN EXPRESSWAY | 3.5km | http://www.foo.com/rainbow-bridge.jpg (IMAGE OF RAINBOW BRIDGE) THE BRIDGE AHEAD OF US IS RAINBOW BRIDGE. IT'S A SUSPENSION BRIDGE HAVING A TOTAL LENGTH OF TTm. | Zc |
| | ... | ... | ... | ... | ... | ... | |
| Pd | N35.37.40.0 E139.47.1.0 | ARIAKE IC | | METROPOLITAN EXPRESSWAY | 0.8km | METROPOLITAN EXPRESSWAY CHARGE 700 YEN TRAFFIC ACCIDENT IN THE VICINITY OF UU | Zd |
| Pk | ... | ... | ... | ... | ... | ... | |
| | N36.20.27.5 E139.45.16.15 | ZZ BALL PARK | | BASEBALL STADIUM | 2.0km | A GAME BETWEEN A-TEAM VS. B-TEAM IS STARTED FROM 18:00. ... | Zk |
| Pe | ... | ... | ... | ... | ... | ... | |
| | N35.37.37.208 E139.46.49.221 | ODAIBA BEACH PARK | | PARK | 1.0km | XX EVENT IS HELD AT YY SITE. (IMAGE OF ODAIBA BEACH PARK) | Ze |
| Pf | N35.37.24.1 E139.46.39.2 | ABC TV | | TV STATION | 0.6km | ABC TV STATION HAS A PUBLIC BROAD CASTING PROGRAM FROM 10:00. THERE IS A TOUR INSIDE THE STATION ... | Zf |
| Pg | ... | ... | ... | ... | ... | ... | |
| | N35.37.3.5 E139.46.32.2 | SCIENCE MUSEUM FOR SHIPS | | MUSEUM | 0.3km | ENTRANCE FEE ADULT 600 YEN CHILD 300 YEN ... ... | Zg |

<nvml version="0.60">
 <head>
   <title> RAINBOW TOWN STROLL </title>
   <category> SIGHTSEEING </category>
   <category> TOKYO METROPOLIS </category>
   <transport> CAR, WALK </transport>
   <duration> REQUIRED TIME: 3 HOURS </duration>
   <distance> 9.6 km </distance>
   <expense> METROPOLITAN EXPRESSWAY CHARGE: 700 YEN</expense>
 </head>
 <body>
   <navi>
     <point>
       <latitude>N35.40.39.0</latitude>
       <longitude>E139.46.18.1</longitude>
     </point>
   </navi>
   <navi>
     <point>
       <latitude>N35.40.19.96</latitude>
       <longitude>E139.46.13.122</longitude>
     </point>
   </navi>
   <navi>
     <point>
       <latitude>N35.38.5.7</latitude>
       <longitude>E139.45.42.6</longitude>
     </point>
   </navi>
   <navi>
     <point>
       <latitude>N35.37.40.0</latitude>
       <longitude>E139.47.1.0</longitude>
     </point>
   </navi>
```

510 (head section)

520a (TOKYO STATION)
520b (NISHI GINZA IC)
520c (RAINBOW BRIDGE)
520d (ARIAKE IC)

FIG.10

(RAINBOW BRIDGE) 600c

```
<point>
  <latitude>N35.38.5.7</latitude>
  <longitude>E139.45.42.6</longitude>
</point>
```

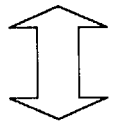

700c

```
<info>
<image src="rainbow-bridge.jpg"/>
<text>  THE BRIDGE AHEAD OF US IS
       RAINBOW BRIDGE.
       IT'S A SUSPENSION BRIDGE HAVING
       A TOTAL LENGTH OF TTm.
         ...
</text>
</info>
```

FIG.11

(ARIAKE IC) 600d

```
<point>
  <latitude>N35.37.40.0</latitude>
  <longitude>E139.47.1.0</longitude>
</point>
```

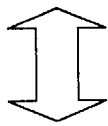

700d

```
<info>
<text>  METROPOLITAN EXPRESSWAY
       CHARGE  700 YEN
       TRAFFIC ACCIDENT IN THE VICINITY
       OF UU
         ...
</text>
</info>
```

FIG.12

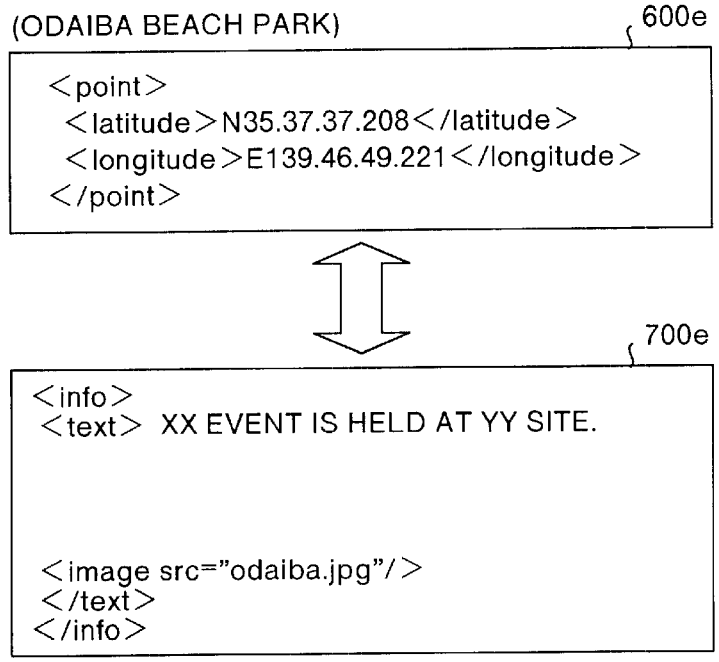

(ODAIBA BEACH PARK)   600e

```
<point>
  <latitude>N35.37.37.208</latitude>
  <longitude>E139.46.49.221</longitude>
</point>
```

700e

```
<info>
  <text> XX EVENT IS HELD AT YY SITE.

<image src="odaiba.jpg"/>
  </text>
</info>
```

FIG.13

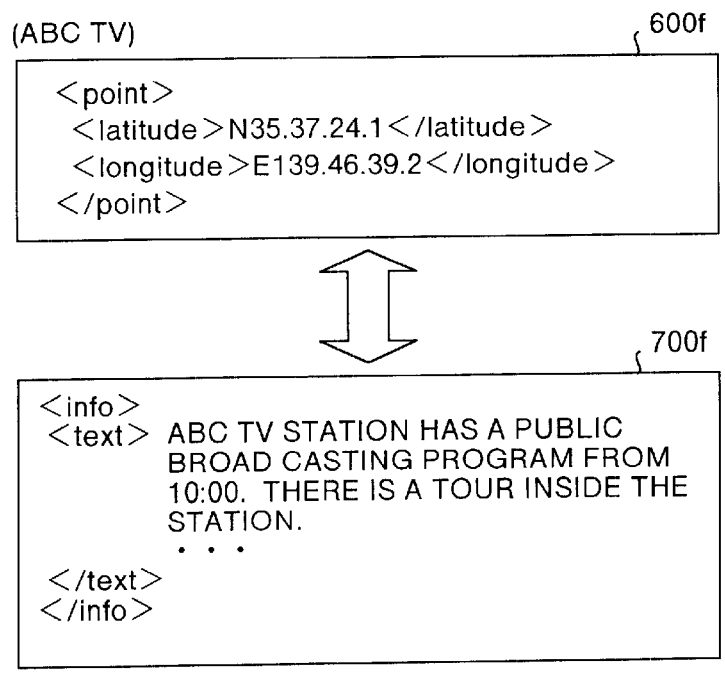

(ABC TV)   600f

```
<point>
  <latitude>N35.37.24.1</latitude>
  <longitude>E139.46.39.2</longitude>
</point>
```

700f

```
<info>
  <text> ABC TV STATION HAS A PUBLIC
         BROAD CASTING PROGRAM FROM
         10:00. THERE IS A TOUR INSIDE THE
         STATION.
            . . .
  </text>
</info>
```

(SCIENCE MUSEUM FOR SHIPS) ⸺ 600g

```
<point>
  <latitude>N35.37.3.5</latitude>
  <longitude>E139.46.32.2</longitude>
</point>
```

⸺ 700g

```
<info>
  <text> ENTRANCE FEE   ADULT 600 YEN
                       CHILD 300 YEN
                       ・・・
  </text>
</info>
```

```
<nvml version="0.60">
 <head>
   <title> RAINBOW TOWN STROLL </title>
   <category> SIGHTSEEING </category>
   <category> TOKYO METROPOLIS </category>
   <transport> CAR, WALK </transport>
   <duration> REQUIRED TIME: 3 HOURS </duration>
   <distance> 9.6 km </distance>
   <expense> METROPOLITAN EXPRESSWAY CHARGE: 700 YEN</expense>
 </head>
 <body>
   <navi>
     <point>
       <latitude>N35.40.39.0</latitude>
       <longitude>E139.46.18.1</longitude>
     </point>
   </navi>
   <navi>
     <point>
       <latitude>N35.40.19.96</latitude>
       <longitude>E139.46.13.122</longitude>
     </point>
   </navi>
   <navi>
     <point>
       <latitude>N35.38.5.7</latitude>
       <longitude>E139.45.42.6</longitude>
     </point>
     <info>
       <image url="http:www.foo.com/rainbow-bridge.jpg"/>
     </info>
   </navi>
   <navi>
     <point>
       <latitude>N35.37.40.0</latitude>
       <longitude>E139.47.1.0</longitude>
     </point>
   </navi>
```

510 — header block (title through expense)

520a (TOKYO STATION)
520b (NISHI GINZA IC)
520c (RAINBOW BRIDGE)
2000c
520d (ARIAKE IC)

(RAINBOW BRIDGE)        2100c

```
<point>
  <latitude>N35.38.5.7</latitude>
  <longitude>E139.45.42.6<longitude>
</point>
<info>
  <image url="http:www.foo.com/rainbow-bridge.jpg"/>
</info>
```

700c

```
<info>
  <image src="rainbow-bridge.jpg"/>
  <text> THE BRIDGE AHEAD OF US IS RAINBOW BRIDGE.
         IT'S A SUSPENSION BRIDGE HAVING A TOTAL
         LENGTH OF TTm.
           • • •
  </text>
</info>
```

(ODAIBA BEACH PARK)         2100e

```
<info url="http://foo/?point=odaiba.../>
```

700e
```
<info>
 <text> XX EVENT IS HELD AT YY SITE.
    . . .
 <image src="odaiba.jpg"/>
 </text>
</info>
```

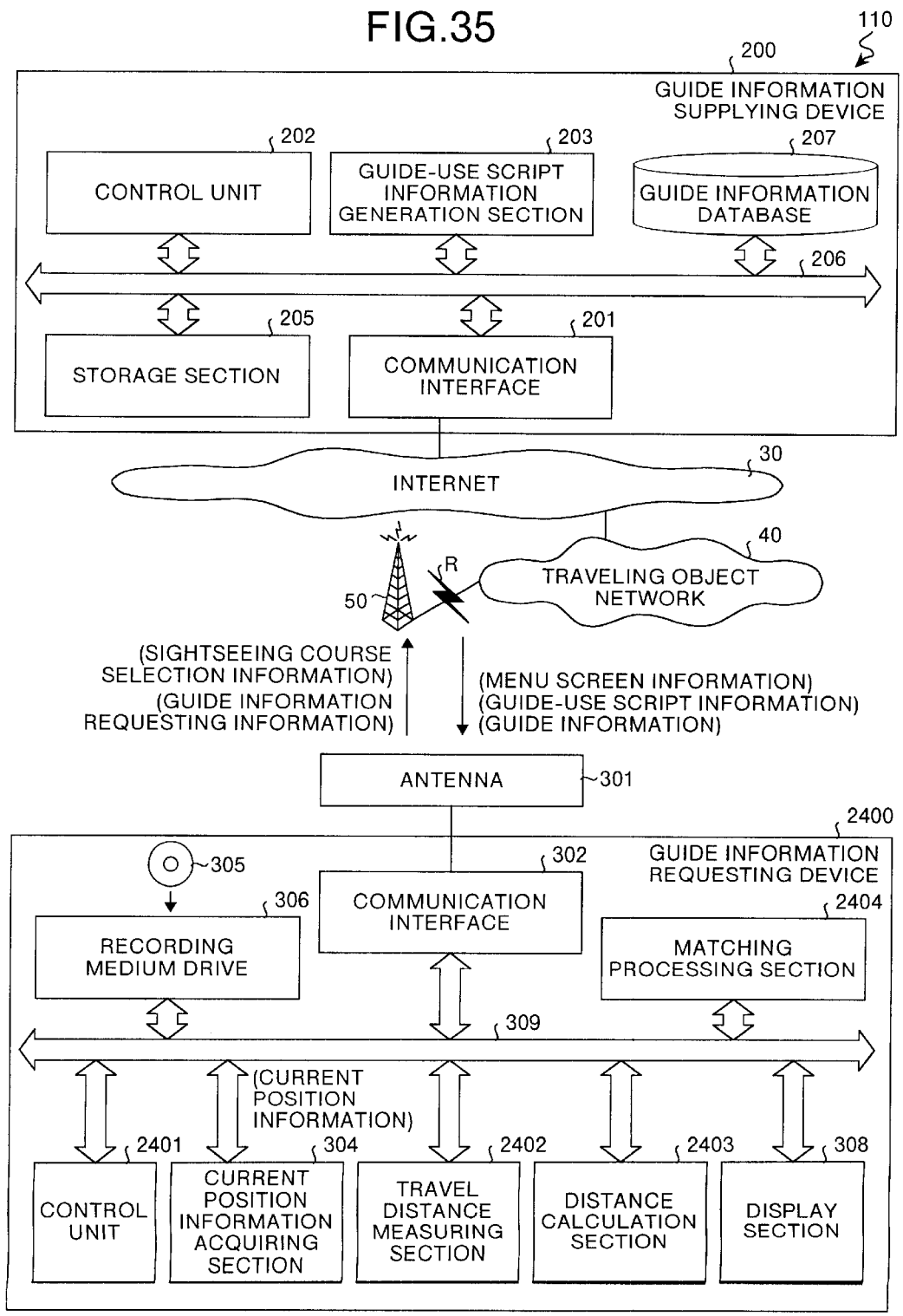

| POSITION INFORMATION | NAME | TIMING ADJUSTING INFORMATION | CATEGORY | GUIDE INFORMATION | |
|---|---|---|---|---|---|
| N35.40.39.0 E139.46.18.1 | TOKYO STATION | -1.0km | STATION TRAINS SUBWAY | THE BUILDING MADE OF RED BRICKS AHEAD OF US IS TOKYO STATION. TOKYO STATION WAS BUILD IN THE YEAR PP. IN TOKYO STATION, POPULAR TOKYO SOUVENIR RR IS SOLD. | Za |
| N35.49.20.12 E139.46.1 | IMPERIAL PALACE | | NOTED PLACE | WE CAN SEE THE IMPERIAL PALACE OVER THE MOAT. WE ALSO SEE THE DOUBLE BRIDGES ... | Zh |
| N35.49.20.12 E139.46.1 | XYZ DEPART-MENT STORE | | DEPART-MENT STORE | XYZ DEPARTMENT STORE IS IN A SUMMER SALE. ... | Zi |
| N35.40.19.96 E139.46.13.122 | NISHI GINZA IC | | METRO-POLITAN EX-PRESSWAY | METROPOLITAN EXPRESSWAY CHARGE 700 YEN TRAFFIC JAM OF 3 KM IN THE VICINITY OF SS ... | Zb |
| N35.45.30.85 E139.45.12.10 | Q DEPART-MENT STORE | | DEPART-MENT STORE | GIFT SALE ... | Zj |
| N35.38.5.7 E139.45.42.6 | RAINBOW BRIDGE | | METRO-POLITAN EX-PRESSWAY | http://www.foo.com/rainbow-bridge.jpg (IMAGE OF RAINBOW BRIDGE) THE BRIDGE AHEAD OF US IS RAINBOW BRIDGE. IT'S A SUSPENSION BRIDGE HAVING A TOTAL LENGTH OF TTm. | Zc |
| ... | ... | | ...... | ... | |
| N35.37.40.0 E139.47.1.0 | ARIAKE IC | | METRO-POLITAN EX-PRESSWAY | METROPOLITAN EXPRESSWAY CHARGE 700 YEN TRAFFIC ACCIDENT IN THE VICINITY OF UU | Zd |
| ... | ... | | ...... | ... | |
| N36.20.27.5 E139.45.16.15 | ZZ BALL PARK | | BASEBALL STADIUM | A GAME BETWEEN A-TEAM VS. B-TEAM IS STARTED FROM 18:00. ... | Zk |
| ... | ... | | ...... | ... | |
| N35.37.37.208 E139.46.49.221 | ODAIBA BEACH PARK | +1.0km | PARK | XX EVENT IS HELD AT YY SITE. (IMAGE OF ODAIBA BEACH PARK) | Ze |
| ... | ... | | ...... | ... | |
| N35.37.24.1 E139.46.39.2 | ABC TV | | TV STATION | ABC TV STATION HAS A PUBLIC BROAD CASTING PROGRAM FROM 10:00. THERE IS A TOUR INSIDE THE STATION ... | Zf |
| ... | ... | | ...... | ... | |
| N35.37.3.5 E139.46.32.2 | SCIENCE MUSEUM FOR SHIPS | | MUSEUM | ENTRANCE FEE ADULT 600 YEN CHILD 300 YEN ... ... | Zg |

```
2500
<nvml version="0.60">
 <head>
  <title> RAINBOW TOWN STROLL </title>
  <category> SIGHTSEEING </category>
  <category> TOKYO METROPOLIS </category>         ⎫
  <transport> CAR, WALK </transport>              ⎬ 510
  <duration> REQUIRED TIME: 3 HOURS </duration>
  <distance> 9.6 km </distance>
  <expense> METROPOLITAN EXPRESSWAY CHARGE: 700 YEN</expense>
 </head>
 <body>
  <navi>
   <point>
    <latitude>N35.40.39.0</latitude>     ⎫ 520a
    <longitude>E139.46.18.1</longitude>  ⎭ (TOKYO STATION)
   </point>
   <info delay="-1.0km"/>                  2500a
  </navi>
  <navi>
   <point>
    <latitude>N35.40.19.96</latitude>    ⎫ 520b
    <longitude>E139.46.13.122</longitude>⎭ (NISHI GINZA IC)
   </point>
  </navi>
  <navi>
   <point>
    <latitude>N35.38.5.7</latitude>      ⎫ 520c
    <longitude>E139.45.42.6</longitude>  ⎭ (RAINBOW BRIDGE)
   </point>
  </navi>
  <navi>
   <point>
    <latitude>N35.37.40.0</latitude>     ⎫ 520d
    <longitude>E139.47.1.0</longitude>   ⎭ (ARIAKE IC)
   </point>
  </navi>
```

FIG.46

```
┌─ 2900 ──────────────────────────────────────────────┐
│                                                      │
│         ┌─ 2901 ──────────────────────┐              │
│         │ AREA    KANTO               │              │
│         │ THERE ARE 3 COURSES (1/1)   │              │
│         └─────────────────────────────┘              │
│                                                      │
│  ┌─ 2902 ─────────────────────────────────────────┐  │
│  │ NUMBER  START   END    COURSE NAME             │  │
│  │         POINT   POINT  ROUTE                   │  │
│  │                        TRANSPORTATION,         │  │
│  │                        DISTANCE, TIME, EXPENSE │  │
│  ├────────────────────────────────────────────────┤  │
```

| NUMBER | START POINT | END POINT | COURSE NAME ROUTE TRANSPORTATION, DISTANCE, TIME, EXPENSE | |
|---|---|---|---|---|
| 1 | TOKYO STATION | SCIENCE MUSEUM FOR SHIPS | RAINBOW TOWN STROLL COURSE TOKYO STATION→NISHI GINZA →RAINBOW BRIDGE→ARIAKE IC →ODAIBA BEACH PARK→ABC TV →SCIENCE MUSEUM FOR SHIPS CAR/WALK 9.6 KM, 3 HOURS, METROPOLITAN EXPRESSWAY CHARGE 700 YEN | SELECT (2903) |
| 2 | TOKYO STATION | SCIENCE MUSEUM FOR SHIPS | . . .<br>. . . | SELECT (2904) |
| 3 | TOKYO STATION | SCIENCE MUSEUM FOR SHIPS | . . .<br>. . . | SELECT (2905) |

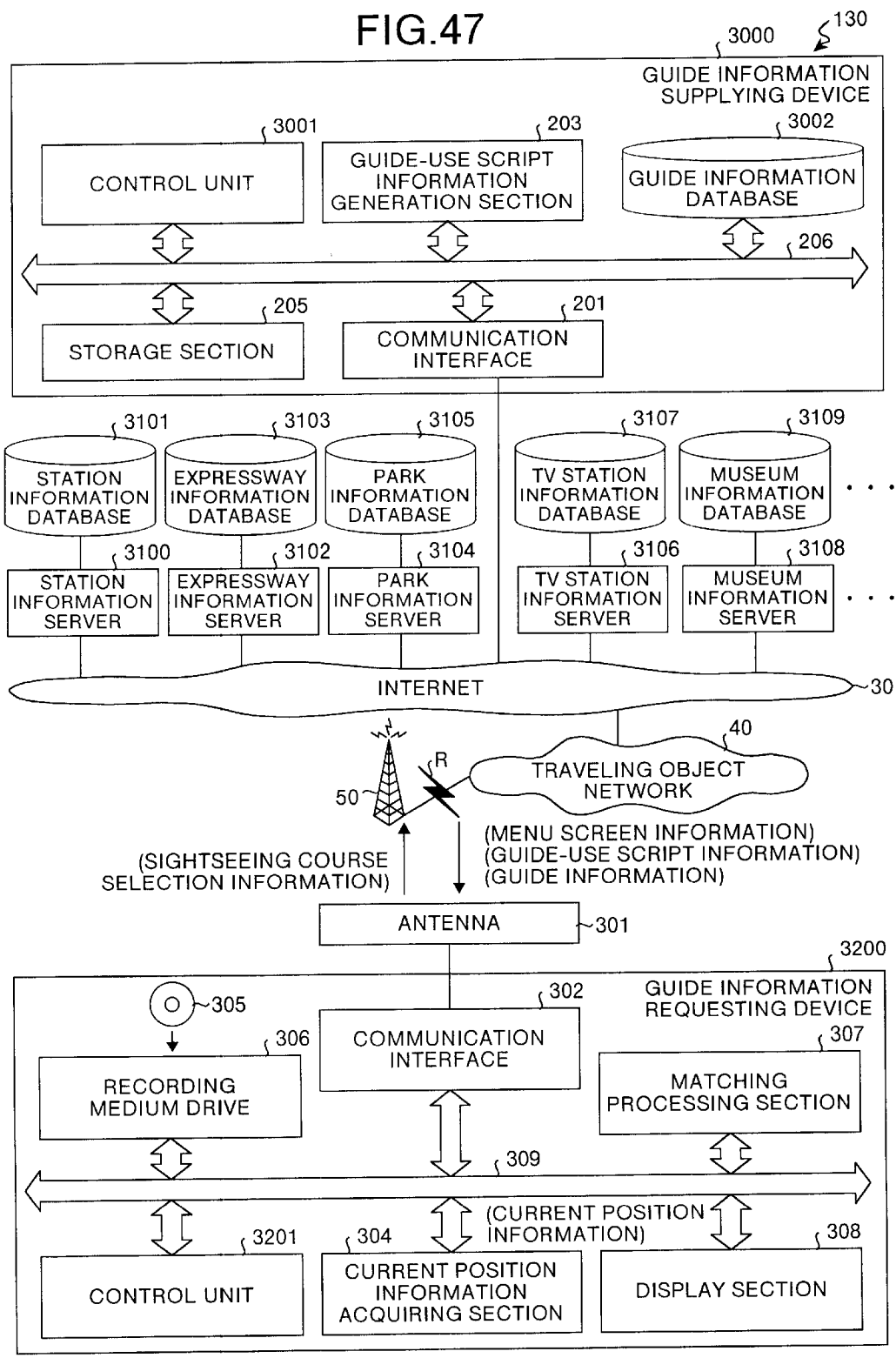

FIG.48

| | TARGET POSITION INFORMATION | NAME | CATEGORY | POINTER INFORMATION | |
|---|---|---|---|---|---|
| Pa | N35.40.39.0 E139.46.18.1 | TOKYO STATION | STATION TRAINS SUBWAY | http://www.station/tokyo.txt | Ua |
| Ph | N35.49.20.12 E139.46.1 | IMPERIAL PALACE | NOTED PLACE | http://www.meisyo/koukyo/txt | Uh |
| Pi | N35.49.20.12 E139.46.1 | XYZ DEPART-MENT STORE | DEPART-MENT STORE | http://www.depa/xyz.txt | Ui |
| Pb | N35.40.19.96 E139.46.13.122 | NISHI GINZA IC | METRO-POLITAN EX-PRESSWAY | http://www.highway/nishiginza.txt | Ub |
| Pj | N35.45.30.85 E139.45.12.10 | Q DEPART-MENT STORE | DEPART-MENT STORE | http://www.depa/q.txt | Uj |
| Pc | N35.38.5.7 E139.45.42.6 | RAINBOW BRIDGE | METRO-POLITAN EX-PRESSWAY | http://www.highway/rainbo-bridge.jpg http://www.highway/rainbow-bridge.txt | Uc |
| | ... | ... | ...... | ... | |
| Pd | N35.37.40.0 E139.47.1.0 | ARIAKE IC | METRO-POLITAN EX-PRESSWAY | http://www.highway/ariake.txt | Ud |
| | ... | ... | ...... | ... | |
| Pk | N36.20.27.5 E139.45.16.15 | ○○ BALL PARK | BASEBALL STADIUM | http://www.baseball.aaa.txt | Uk |
| | ... | ... | ...... | ... | |
| Pe | N35.37.37.208 E139.46.49.221 | ODAIBA BEACH PARK | PARK | http://www.park/odaiba.txt http://www.park/odaiba.jpg | Ue |
| | ... | ... | ...... | ... | |
| Pf | N35.37.24.1 E139.46.39.2 | ABC TV | TV STATION | http://www.tv/abc.txt | Uf |
| | ... | ... | ...... | ... | |
| Pg | N35.37.3.5 E139.46.32.2 | SCIENCE MUSEUM FOR SHIPS | MUSEUM | http://www.muse/ship.txt | Ug |

| POINTER INFORMATION | GUIDE INFORMATION | |
|---|---|---|
| http://www.station/tokyo.txt | THE BUILDING MADE OF RED BRICKS AHEAD OF US IS TOKYO STATION.<br>TOKYO STATION WAS BUILD IN THE YEAR PP.<br>IN TOKYO STATION, POPULAR TOKYO SOUVENIR RR IS SOLD. | Za |
|  |  | |

| POINTER INFORMATION | GUIDE INFORMATION | |
|---|---|---|
| http://www.highway/nishiginza.txt | METROPOLITAN EXPRESSWAY CHARGE 700 YEN<br>TRAFFIC JAM OF 3 KM IN THE VICINITY OF SS<br>. . . | Zb |
| http://www.highway/rainbo-bridge.jpg<br>http://www.highway/rainbow-bridge.txt | rainbow-bridge.jpg<br>THE BRIDGE AHEAD OF US IS RAINBOW BRIDGE.<br>IT'S A SUSPENSION BRIDGE HAVING A TOTAL LENGTH OF TTm. | Zc |
| http://www.highway/ariake.txt | METROPOLITAN EXPRESSWAY CHARGE 700 YEN<br>TRAFFIC ACCIDENT IN THE VICINITY OF UU<br>. . . | Zd |
|  |  | |

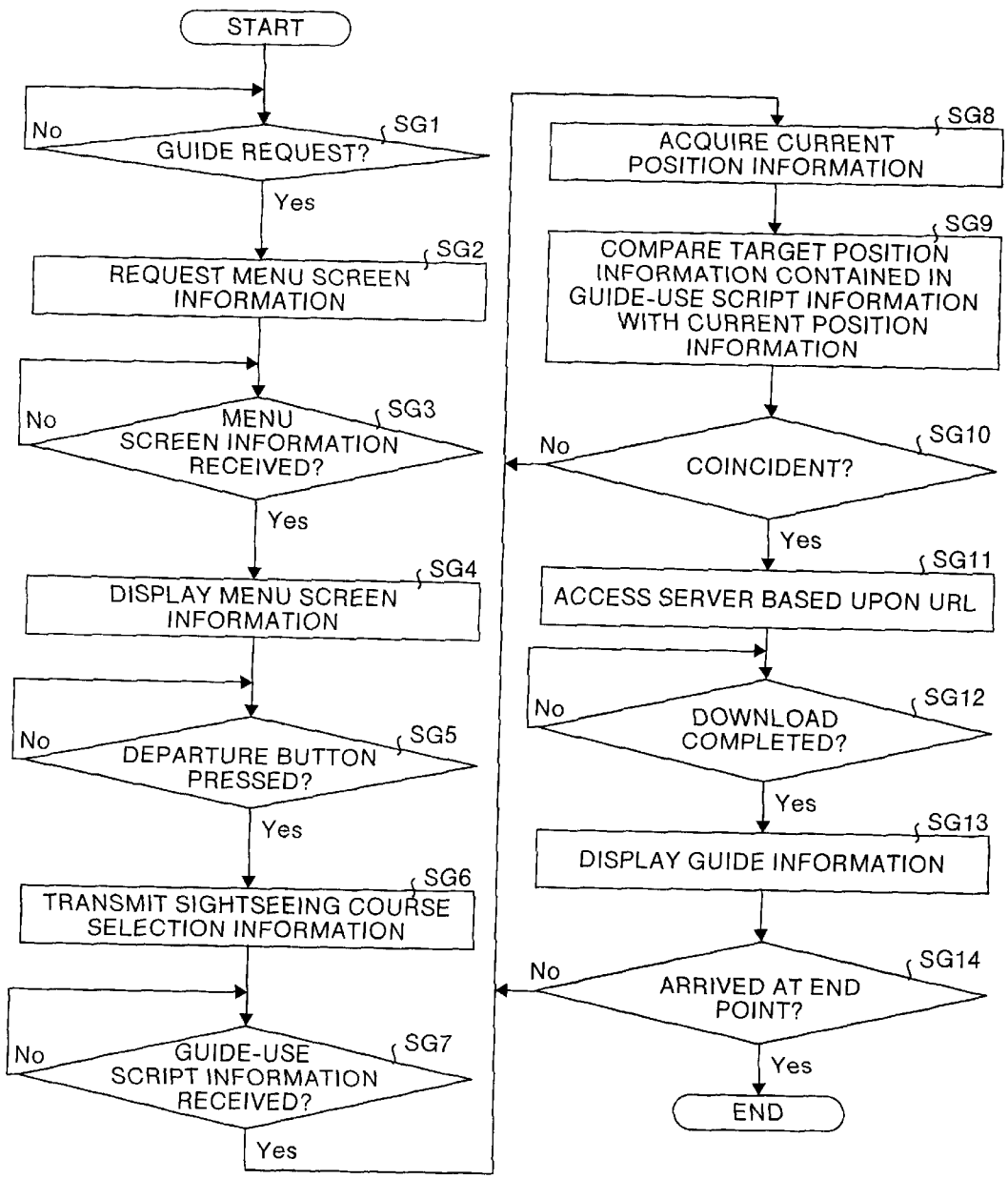

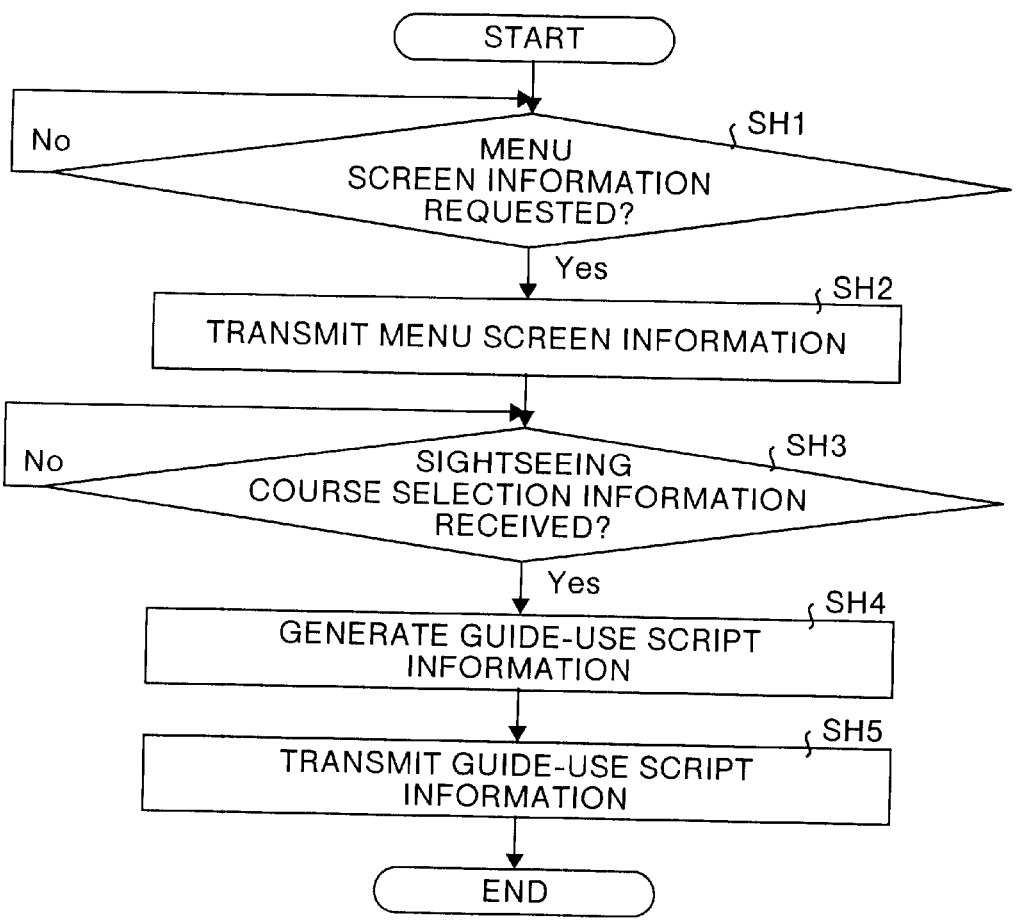

FIG.53

```
3300
<nvml version="0.60">
  <head>                                                                510
    <title> RAINBOW TOWN STROLL </title>
    <category> SIGHTSEEING </category>
    <category> TOKYO METROPOLIS </category>
    <transport> CAR, WALK </transport>
    <duration> REQUIRED TIME: 3 HOURS </duration>
    <distance> 9.6 km </distance>
    <expense> METROPOLITAN EXPRESSWAY CHARGE: 700 YEN</expense>
  </head>
  <body>
    <navi>
      <point>
        <latitude>N35.40.39.0</latitude>
        <longitude>E139.46.18.1</longitude>          520a
      </point>                                       (TOKYO STATION)
      <info>
        <txt url="http://www.station/tokyo.txt"/>    3300a
      <info/>
    </navi>
    <navi>
      <point>
        <latitude>N35.40.19.96</latitude>
        <longitude>E139.46.13.122</longitude>        520b
      </point>                                       (NISHI GINZA IC)
      <info>
        <txt url="http://www.highway/nishiginza.txt"/>   3300b
      <info/>
    </navi>
    <navi>
      <point>
        <latitude>N35.38.5.7</latitude>
        <longitude>E139.45.42.6</longitude>          520c
      </point>                                       (RAINBOW
      <info>                                          BRIDGE)
        <image url="http:www.highway/rainbow-bridge.jpg"/>
        <txt url="http://www.highway/rainbow-bridge.txt"/>   3300c
      </info>
    </navi>
    <navi>
      <point>
        <latitude>N35.37.40.0</latitude>
        <longitude>E139.47.1.0</longitude>           520d
      </point>                                       (ARIAKE IC)
      <info>
        <txt url="http://www.highway/ariake.txt"/>   3300d
      <info>
    </navi>
```

FIG.54

```
3300
  <navi>
      <point>
          <latitude>N35.37.37.208</latitude>      ⎫
          <longitude>E139.46.49.221</longitude>   ⎬ 520e
      </point>                                     ⎭ (ODAIBA BEACH
      <info>                                         PARK)
          <txt url="http://www.park/odaiba.txt"/>  ⎫
          <image url="http:www.park/odaoba.jpg"/> ⎬ 3300e
      <info/>                                      ⎭
  </navi>
  <navi>
      <point>
          <latitude>N35.37.24.1</latitude>         ⎫
          <longitude>E139.46.39.2</longitude>      ⎬ 520f
      </point>                                     ⎭ (ABC TV)
      <info>
          <txt url="http://www.tv/abc.txt"/>       ⎫
      <info/>                                      ⎬ 3300f
  </navi>                                          ⎭
  <navi>
      <point>
          <latitude>N35.37.3.5</latitude>          ⎫
          <longitude>E139.46.32.2</longitude>      ⎬ 520g
      </point>                                     ⎭ (SCIENCE MUSEUM
      <info/>                                        FOR SHIPS)
          <txt url="http://www.muse/ship.txt"/>    ⎫ 3300g
      <info/>                                      ⎭
  </navi>
 </body>
</nvml>
```

METHOD OF AND DEVICE FOR REQUESTING GUIDE INFORMATION, METHOD OF AND DEVICE FOR SUPPLYING GUIDE INFORMATION, AND COMPUTER PRODUCT

FIELD OF THE INVENTION

The present invention relates to a technology for obtaining information concerning guidance such as routes by using the description of Markup Language. More particularly, this invention relates to a technology that is applied to a car navigation system, a personal computer, a PDA (Personal Digital Assistant), a mobile telephone terminal (PDC (Personal Digital Cellular)), a PHS terminal (Personal Handyphone System), etc., and utilized for supplying various route information and additional information, such as road guidance, tourism guidance, distribution plans, tour plans, trafficcontrol, scheduling, entertainments and local government services, through a network and electronic media.

BACKGROUND OF THE INVENTION

In recent years, along with the remarkable development of mobile terminals such as the car navigation system and PDA, it has become possible to obtain various information without any limitation in locations. However, problems have arisen as the saturation level of mobile terminals has increased. For example, the network load increases and the processing load increases in the information supplying service device because of an increase in the amount of traffic. For this reason, there have been strong demands for means and methods for effectively solve the above-mentioned problems.

FIG. 56 is a block diagram that shows a conventional guide information supplying system 10. For example, this guide information supplying system 10 searches for a current position of a guide information requesting device 60 that is installed in a car which is running. When this car has reached a target position (for example, an interchange of an express way or a tourist point), guide information related to the target position (for example, traffic information, tourism information) is supplied to the guide information requesting device 60.

The guide information supplying device 20 is provided with a searching function for searching for the current position of the car in which the guide information requesting device 60 is installed, a matching function for making a matching between the current position informed from the guide information requesting device 60 every predetermined interval of time and a target position on a route through which the car is traveling, and a guide information supplying function for supplying guide information related to the target position at the time when the matching has been made.

These guide information supplying device 20 and guide information requesting device 60 become communicatable through the Internet 30, a traveling object network 40, a radio station 50 and a radio link R. In the guide information supplying device 20, the communication interface 21 serves as an communication interface for the guide information supplying device 20.

A control unit 22 controls respective parts of the guide information supplying device 20 so that the above-mentioned searching function, the guide information supplying function, etc. are achieved. The matching processing section 23 achieves the above-mentioned matching functions. A guide information database 24 is a database that stores pieces of guide information that correspond to target positions respectively placed on a plurality of routes. A storage section 25 stores route information, etc., required for the pursuit for the current position. A bus 26 connects the respective parts of the guide information supplying device 20.

The guide information requesting device 60 is, for example, a car navigation system installed in a car, and provided with functions, such as a current position informing function for informing the guide information supplying device 20 of the current position that changes with time in traveling every predetermined interval of time and a guide information presenting function for presenting the guide information supplied by the guide information supplying device 20 at the time when the car has reached a target position on one of the routes to the driver, etc.

An antenna 61 is provided with a function that transmits and receives electric waves used for carrying out communications with the radio station 50 through the radio link R. The communication interface 62 serves as communication interface to an external device. A control unit 63 controls the respective parts of the guide information requesting device 60 so that the above-mentioned current position informing function, the guide information presenting function, etc. are achieved.

A current position information acquiring section 64 utilizes the GPS (Global Positioning System) so that it acquires the current position information related to the current position represented by the latitude/longitude every fixed interval of time. The GPS, which is an electric wave navigation system developed in the United States, is a system for carrying out three-dimensional measurements, that is, latitude, longitude and altitude, by using not less than four satellites for a positional measurement at one time.

Among the three-dimensional measurements, latitude, longitude, and altitude, the current position information acquiring section 64 uses the information of latitude and longitude as the current position information. A display section 65 is constituted by a LCD (Liquid Crystal Display), etc., so that it displays guide information, map information, etc. A bus 66 connects the respective parts of the guide information request device 60.

In the above-mentioned arrangement, if a car travels from a start point to an end point through a certain route, the control unit 63 of the guide information requesting device 60 transmits the current position information from the current position information acquiring section 64 every fixed interval of time. Thus, the current position information is received by the guide information supplying device 20 through the radio link R, the radio station 50, the traveling body network 40 and the Internet 30 every fixed interval of time.

Based upon the current position information successively received every fixed interval of time, the control unit 22 of the guide information supplying device 20 pursues for the car in which the guide information requesting device 60 is installed. Moreover, the matching section 23 makes a matching between the current position of the car and the target position within the guide information database 24 so that it monitors whether or not the two positions are coincident with each other within a predetermined range of error.

When the car has arrived at the target position on the route (for example, an interchange in an express way), a matching is made between the current position and the target position. For such matching, the control unit 22 acquires guide information related to the target position (for example, traffic information) from the guide information database 24. The control unit 22 transmits the guide information to the guide information requesting device 60.

The guide information is received by the guide information requesting device 60 through the Internet 30, the traveling object network 40, the radio station 50 and the radio link R. Thus, the control unit 63 allows the display section 65 to display the traffic information as guide information.

FIG. 57 is a block diagram that shows an arrangement of a guide information supplying system 70 that shows another conventional structural example. In this figure, those parts corresponding to the respective parts shown in FIG. 56 are indicated by the same reference numerals.

In this guide information supplying system 70, for example, to a guide information requesting device 90 installed in a car in travel is preliminarily downloaded a guide information database 83 that stores guide information respectively related to a plurality of target positions located on a plurality of routes from a guide information supplying device 80, and when there is a match between the current position and the target position on the guide information requesting device 90 side, the corresponding guide information is selected from the guide information database that has been downloaded, and supplied to the driver, etc.

The guide information supplying device 80 has a function for preliminarily supplying a guide information database 83 that stores guide information respectively related to a plurality of target positions located on a plurality of routes to the guide information requesting device 90.

These guide information supplying device 80 and guide information requesting device 90 become communicatable through the Internet 30, a traveling object network 40, a radio station 50 and a radio link R. In the guide information supplying device 80, the communication interface 81 serves as an communication interface for the guide information supplying device 80.

A control unit 82, which controls the respective parts of the guide information supplying device 80, is provided with a function for managing the above-mentioned guide information database 83 and a function for supplying the guide information database 83 to the guide information requesting device 90. The guide information database 83 is a database that stores guide information respectively related to a plurality of target positions located on a plurality of routes. A storage section 84 stores various pieces of information. A bus 85 connects the respective parts of the guide information supplying device 80.

Here, the guide information requesting device 90 is, for example, a car navigation system installed in a car, and provided with functions, such as a current position information acquiring function for acquiring the current position information related to the current position that changes with time in traveling every predetermined interval of time, a matching function for making a matching between the current position and the target position on a route through which the car travels, and a guide information supplying function for supplying guide information related to the target position from the guide information database 83 supplied by the guide information supplying device 80, at the time when the matching has been made.

An antenna 91 is provided with a function that transmits and receives electric waves used for carrying out communications with the radio station 50 through the radio link R. The communication interface 92 serves as a communication interface to an external device. A control unit 93 controls the respective parts of the guide information requesting device 90 so that the above-mentioned guide information supplying function, etc. are achieved.

A current position information acquiring section 94 utilizes the aforementioned GPS so that it acquires the current position information related to the current position represented by the latitude/longitude every fixed interval of time. A storage section 95 stores the guide information database 83 that has been downloaded from the guide information supplying device 80.

Here, in another conventional system, a driver for reading information from a portable-type recording medium is installed in place of the storage section 95 so that the driver reads the portable-type recording medium in which the guide information database 83 has been stored.

A matching processing section 96 has a function for making a matching between the current position corresponding to the current position information acquired by the current position information acquiring section 94 every fixed interval of time and the target position on a route through which the car is traveling. A display section 97, which is constituted by a LCD, etc., displays the guide information, map information, etc. A bus 98 connects the respective parts of the guide information requesting device 90.

In the above-mentioned arrangement, before a car travels from an start point to an end point through a route, the control unit 93 of the guide information requesting device 90 transmits a downloading request for the guide information database 83 to the guide information supplying device 80 through the radio link R, the radio station 50, the traveling object network 40 and the Internet 30.

With this arrangement, the guide information database 83 is downloaded from the guide information supplying device 80 to the guide information requesting device 90 through the Internet 30, the traveling object network 40, the radio station 50 and the radio link R. The downloaded guide information database 83 is stored in the storage section 95 by the control of the control unit 93.

In this state, if a car travels from an start point to an end point through a route, the current position information acquiring section 94 acquires the current position information every fixed interval of time. Moreover, the matching processing section 96 makes a matching between the current position obtained from the current position information and the target position with in the guide information database in the storage section 95 so that it monitors whether or not the two positions are coincident with each other within a predetermined range of error.

When the car has arrived at the target position on a route (for example, an interchange in an express way), the matching is made between the current position and the target position. Therefore, after having acquired guide information (for example, traffic information) related to the target position from the guide information database, the control unit 93 allows the display section 97 to display the traffic information as guide information.

As described above, in the guide information supplying system 10 shown in FIG. 56, the current position of the car is pursued on the guide information supplying device 20 side, and when the car has arrived at the target position, the guide information is supplied to the guide information requesting device 60.

However, in the guide information supplying system 10, in order to carry out the above-mentioned pursuit, the guide information requesting device 60 needs to inform the guide information supplying device 20 of the current position information every predetermined interval of time. Therefore, as the number of cars to be pursued on the guide information supplying device 20 increases, the load of the guide information supplying device 20 increases.

Therefore, in the conventional guide information supplying system 10, in order to reduce the load of the guide information supplying device 20, for example, it is necessary to prepare the guide information supplying device 20 as a high spec machine or to provide a plurality of guide information supplying devices 20 so as to carry out the processes in a dispersed manner, resulting in high production costs.

Moreover, in the conventional guide information supplying system 10, since the current position information is given from the guide information requesting device 60 to the guide information supplying device 20 every fixed interval of time in order to carry out the above-mentioned pursuit, the traffic of the network (the traveling object network 40, the Internet 30) is inevitably increased as the number of cars to be pursued by the guide information supplying device 20 increases, resulting in an increase in the network load.

Moreover, in the guide information supplying system 70 shown in FIG. 57, the guide information database 83 needs to be preliminarily downloaded from the guide information supplying device 80 to the guide information requesting device 90, and when the car has arrived at the target position, the corresponding guide information contained in the guide information database 83 is supplied to the driver.

However, in the method of downloading the guide information database 83, all the pieces of guide information located on the plurality of routes of the guide information database 83 are included in the guide information database 83. Therefore, unless the car travels through all the routes, there are some pieces of guide information that have not been used at all, resulting in wasteful use of data. Moreover, in the conventional guide information supplying system 70, the guide information database 83 having a great capacity needs to be downloaded. Therefore, the resulting problem is that, as the number of simultaneous down-loads increases, the load of the guide information supplying device 80 and the network load increase.

In the above-mentioned method, in place of the method of downloading, a portable-type recording medium having the guide information database 83 is installed on the guide information requesting device 90 side. In this method, it is certainly possible to solve the problems of the increased load of the guide information supplying device 80 and the increased network load.

In the above-mentioned method, however, due to inherent characteristics of the portable-type recording medium, since the recorded information is not updated at real time, other problems arise in which guide information to be supplied to the driver becomes ineffective or different from the actual situation.

SUMMARY OF THE INVENTION

It is an object of this invention to provide a method of a device for requesting guide information, a method of a device for supplying guide information which can reduce the network load required for supplying guide information and the load on the guide information supplying device. It is another object of this invention to provide a computer program which when executed on a computer realizes the devices according to the present invention on a computer.

The guide information requesting device according to one aspect of this invention comprises a situation information acquiring unit which acquires current situation information related to a current situation concerning a traveling object every predetermined interval of time; a matching unit which carries out a matching between a normal situation and the current situation, based upon the normal situation information including a sequence of a plurality of predetermined normal situations and the current situation information; a requesting unit which, if there is a match between the normal situation and the current situation, requests an external guide information supplying device to send guide information related to the normal situation, through a network; and a presenting unit which presents the guide information supplied by the guide information supplying device through the network.

According to the above-mentioned aspect, it is not until there is a match between a normal situation and the current situation that a request is given to the guide information supplying device. Therefore, in comparison with the conventional system in which the guide information supplying device is always accessed every fixed interval of time or a database including unnecessary guide information needs to be downloaded, it is possible to reduce the network load and load on the guide information supplying device side.

The guide information requesting device according to another aspect of this invention comprises a current position information acquiring unit which acquires current position information related to a current position concerning a traveling object every predetermined interval of time; a matching unit which carries out a matching between target position information including a sequence of target positions located on a route through which said traveling object shifts and the current position information; a requesting unit which, if there is a match between the target position information and the current position information, requests an external guide information supplying device to send guide information related to the target position, through a network; and a presenting unit which presents the guide information supplied by the guide information supplying device through the network.

According to the above-mentioned aspect, it is not until there is a match between a target position information and the current position information that the guide information supplying device is allowed to request. Therefore, in comparison with the conventional system in which the guide information supplying device is always accessed every fixed interval of time or a database including unnecessary guide information needs to be downloaded, it is possible to reduce the network load and load on the guide information supplying device side.

The guide information supplying device according to still another aspect of this invention comprises a request receiving unit which, if there is match between a current situation related to a traveling object and a predetermined normal situation, receives a request for receiving a supply of guide information related to the normal situation from a guide information requesting device through a network; and a supply unit which, when the request has been accepted, supplies guide information related to the normal situation to said guide information requesting device through the network.

According to above-mentioned aspect, it is not until there is a match between a normal situation and the current situation that the guide information requesting device is allowed to request. Therefore, in comparison with the conventional system in which the guide information supplying device is always accessed every fixed interval of time or a database including unnecessary guide information needs to be downloaded, it is possible to reduce the network load and load on the guide information supplying device side.

The guide information supplying device according to still another aspect of this invention comprises a request receiving unit which, if there is a match between a current position of a traveling object and a target position located on a route through which said traveling object shifts, receives a request for receiving a supply of guide information related to the target position from a guide information requesting device through a network; and a supply unit which, when the request has been accepted, supplies guide information related to the target position to said guide information requesting device through the network.

According to the above-mentioned aspect, it is not until there is a match between a target position and the current position that the guide information requesting device is allowed to request. Therefore, in comparison with the conventional system in which the guide information supplying device is always accessed every fixed interval of time or a database including unnecessary guide information needs to be downloaded, it is possible to reduce the network load and load on the guide information supplying device side.

The computer program according to the present invention realizes the above-mentioned units according to the present invention on a computer.

Other objects and features of this invention will become apparent from the following description with reference to the accompanying drawings.

BRIEF DESCRIPTION OF THE DRAWINGS

FIG. 1 is a block diagram that shows a construction of a first embodiment in accordance with the present invention;

FIG. 2 is a drawing that shows a table structure of a guide information database 204 shown in FIG. 1;

FIG. 6 is a drawing that shows one example of guide-use script information 500 in the first embodiment;

FIG. 10 is a drawing that shows guide information requesting information 600c and guide information 700c in the first embodiment;

FIG. 11 is a drawing that shows guide information requesting information 600d and guide information 700d in the first embodiment;

FIG. 12 is a drawing that shows guide information requesting information 600e and guide information 700e in the first embodiment;

FIG. 13 is a drawing that shows guide information requesting information 600f and guide information 700f in the first embodiment;

FIG. 29 is a drawing that shows one example of guide-use script information 2000 in the first embodiment;

FIG. 35 is a block diagram that shows a construction of a second embodiment in accordance with the present invention;

FIG. 36 is a drawing that shows a table structure of a guide information database 207 shown in FIG. 35;

FIG. 39 is a drawing that shows one example of guide-use script information 2500 in accordance with the second embodiment;

FIG. 46 is a drawing that shows a course selection screen 2900 in the third embodiment;

FIG. 47 is a block diagram that shows a construction of a fourth embodiment in accordance with the present invention;

FIG. 48 is a drawing that shows the table structure of a guide information database 3002 shown in FIG. 47;

FIG. 49 is a drawing that shows a station information database 3101 shown in FIG. 47;

FIG. 50 is a drawing that shows an expressway information database 3103 shown in FIG. 47;

FIG. 51 is a flow chart that explains the operation of a guide information requesting device 3200 shown in FIG. 47;

FIG. 52 is a flow chart that explains the operation of a guide information requesting device 3000 shown in FIG. 47;

FIG. 53 is a drawing that shows one example of guide-use script information 3300 in accordance with the fourth embodiment;

FIG. 54 is a drawing that shows one example of guide-use script information 3300 in accordance with the fourth embodiment;

DESCRIPTION OF THE PREFERRED EMBODIMENTS

Figure 3:
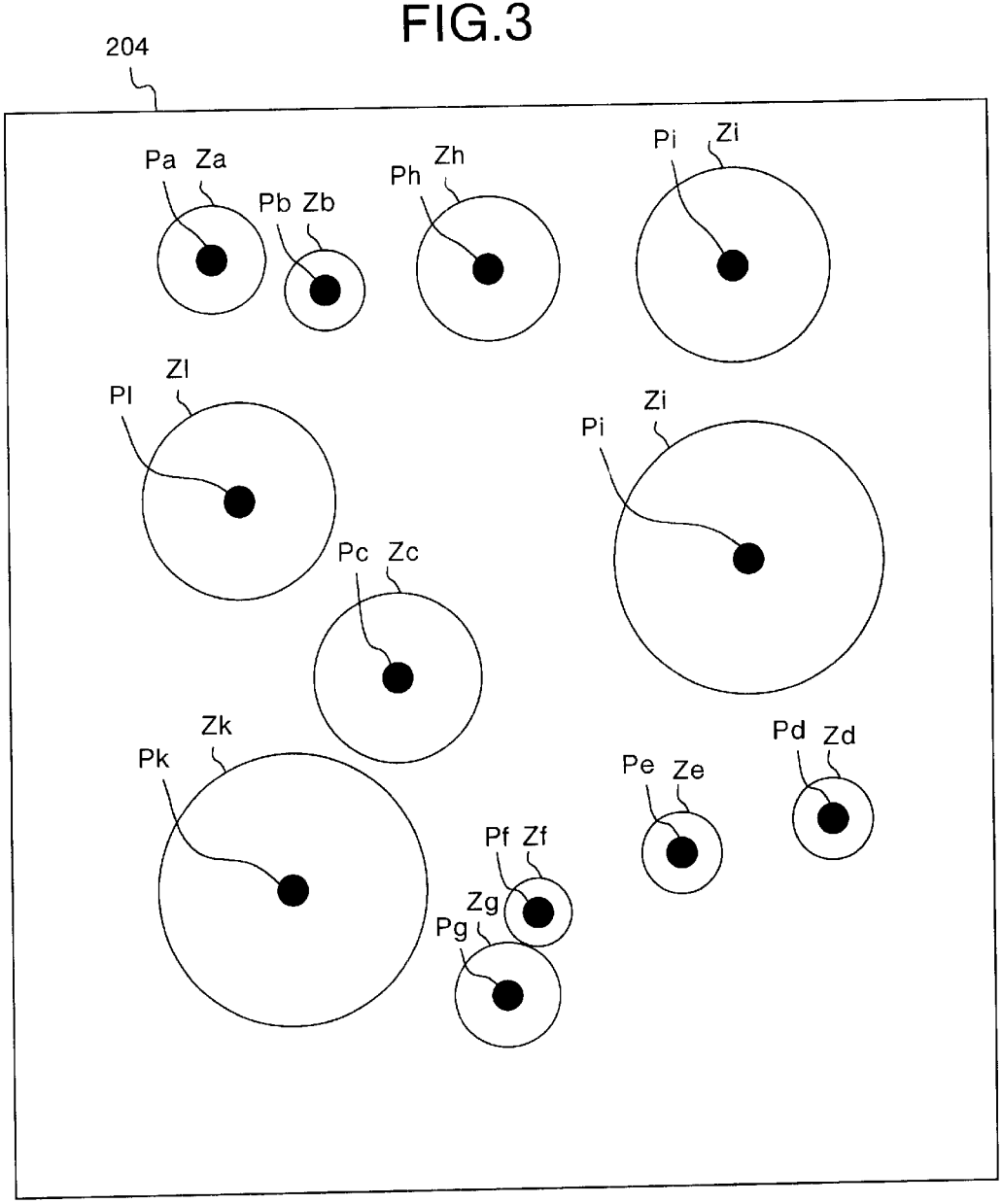
FIG. 3 is a drawing that shows the concept of the guide information database 204 shown in FIG. 2.

Embodiments of the guide information requesting device and the guide information supplying device in accordance with the present invention will be explained in detail below while referring to accompanying drawings.

FIG. 1 is a block diagram that shows a construction of a first embodiment in accordance with the present invention. In this figure, those parts that perform same or similar functions as the parts shown in FIG. 56 are indicated by the same reference numerals and the description thereof is omitted.

Figure 56:
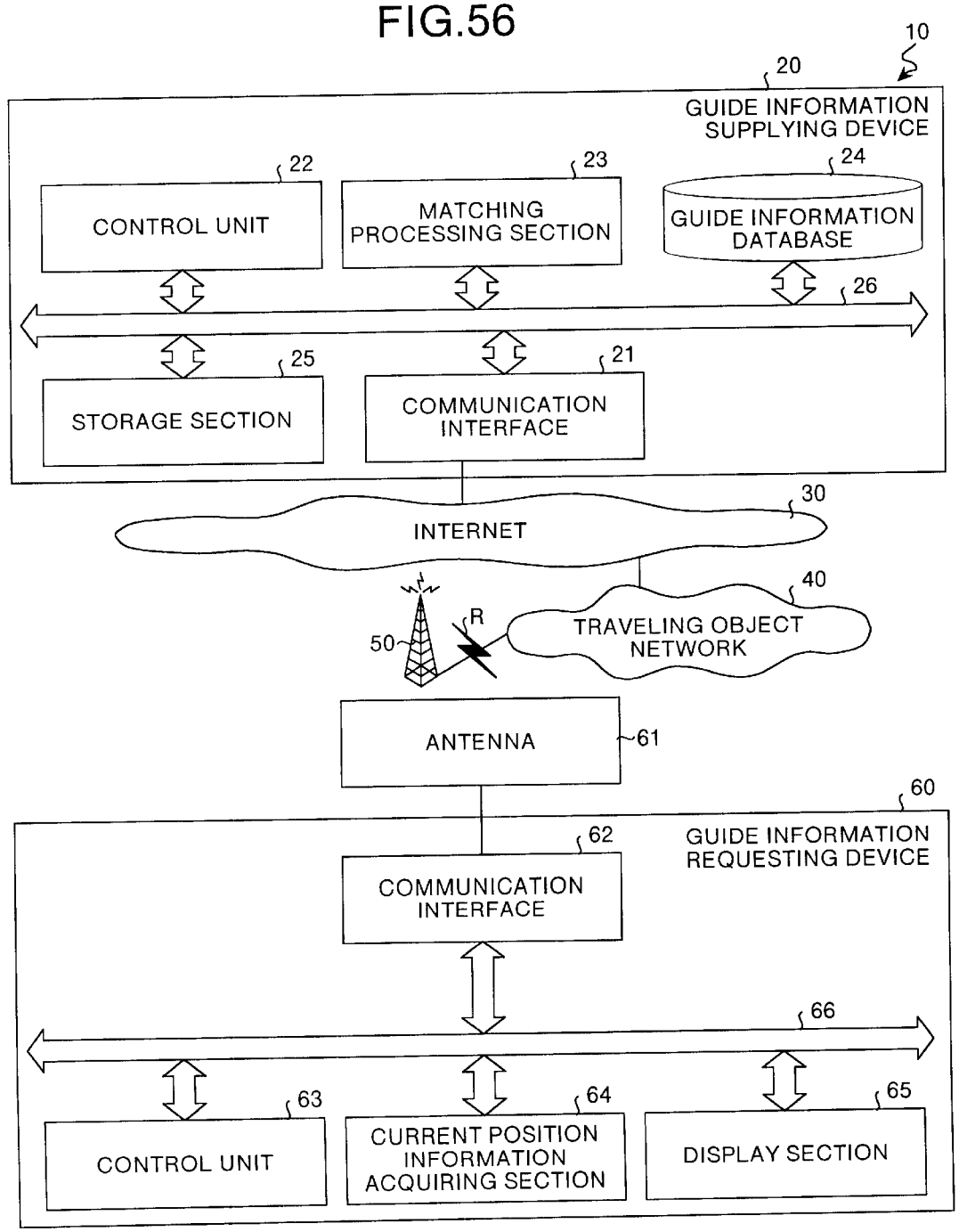
FIG. 56 is a block diagram that shows a construction of a conventional guide information supplying system 10.
Figure 57:
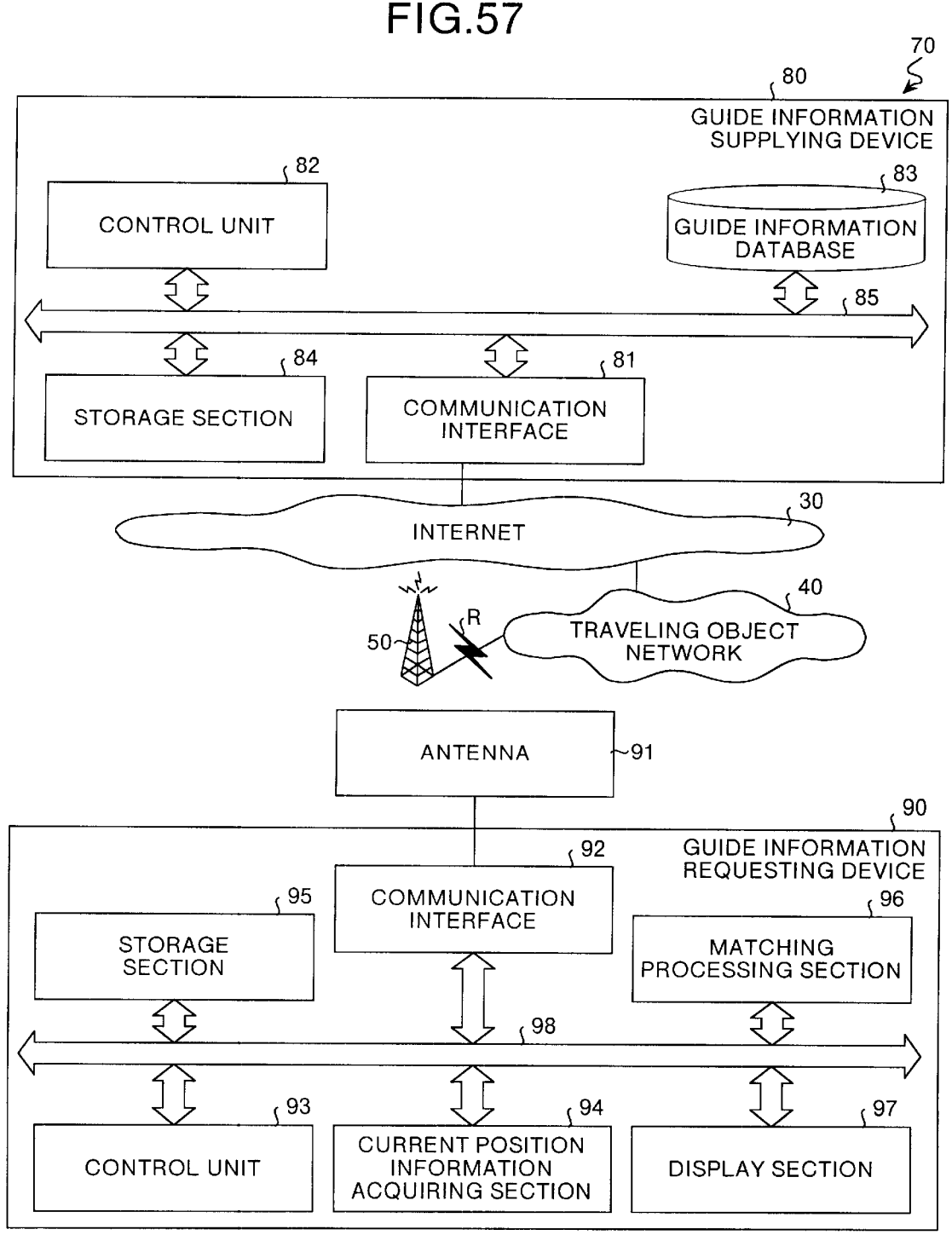
FIG. 57 is a block diagram that shows a construction of a conventional guide information supplying system 70.

In the guide information supplying system 100 shown in FIG. 56, for example, a guide information requesting device 300 installed in a car in travel is allowed to have a plurality of pieces of target position information located on routes, and upon arrival of the car at a target position, it requests the guide information supplying means 200 to send guide information related to the target position, and only the corresponding guide information is supplied from the guide information supplying device 200 to the guide information requesting device 300.

Based upon the above-mentioned plurality of target positions located on routes, the guide information supplying device 200 has a guide-use script information generating function for generating guide-use script information, a function for supplying the guide-use script information to the guide information requesting device 300, and a guide information supplying function for supplying guide information related to the corresponding target position to the guide information requesting device 300 in accordance with the request from the guide information requesting device 300.

These guide information supplying device 200 and guide information requesting device 300 become communicatable through the Internet 30, a traveling object network 40, a radio station 50 and a radio link R. In the guide information supplying device 200, a communication interface 201 serves as a communication interface to the guide information supplying device 200.

A control unit 202, which controls the respective sections of the guide information supplying device 200, is provided with a function for managing the above-mentioned guide information database 204, and a function for retrieving a guide information database 204 for guide information in accordance with the request and for supplying the resulting guide information to the guide information requesting device 300.

The guide information database 204 is a database that stores pieces of guide information that are made in association with target positions located on the plurality of routes respectively and other information. More specifically, as shown in FIG. 2, the guide information database 204 is provided with fields, such as "target position information", "name", "address", "category", "radial area" and "guide information", etc.

FIG. 3 is a drawing that explains the concept of the guide information database 204 shown in FIG. 2. In this figure, pieces of target position information Pa to Pk corresponding to a plurality of target positions located in a region in a scattered manner and pieces of guide information Za to Zk related to a predetermined radial area centered on each of the target positions are shown. The plurality of target positions are located on a plurality of routes on which cars travel. For example, if a target position corresponding to the target position information Pa is given as Tokyo Station, the guide information Za includes time table information, station introducing information, etc. that relate to a predetermined radial area centered on Tokyo Station.

In this manner, the guide information database 204 is an aggregate of the pieces of target position information Pa to Pk corresponding to a plurality of target positions located on routes, and pieces of guide information Za to Zk respectively related to these pieces of target position information Pa to Pk.

Moreover, in FIG. 2, "target position information", which correspond to pieces of target position information Pa to Pk shown in FIG. 3, are indicated by the latitude and longitude. For example, target position information Pa is indicated by latitude N35. 40. 39. 0 and longitude E139. 46. 18. 1.

"Name" is information related to the name of a building, etc., located in the target position. For example, "name" corresponding to target position information Pa is Tokyo Station. "Address" is information related to the address of the building, etc. For example, "address" corresponding to target position information Pa (Tokyo Station) is Chuo Ward, Tokyo Metropolis. "Category" is a category (station, famous place, department store, metropolitan express way, etc.) to which guide information, which will be described later, belongs.

"Radial area", which corresponds to the radius of a circle shown in FIG. 3, is an area in which the guide information is made effective. For example, guide information Za (guide information of Tokyo Station) is made effective within an area represented by a radius 1.0 km from Tokyo Station. "Guide information", which is information related to the target position, includes text information, image information, voice information, etc.

For example, guide information Za (guide information of Tokyo Station) is text information related to tourism guidance, historical background, sales of souvenirs, etc. of Tokyo Station, such as those starting with "The building made of red bricks ahead of us is Tokyo Station, . . . ". Moreover, guide information Zc (guide information of Rainbow Bridge) includes image information of Rainbow Bridge http://www.foo.com/rainbow-bridge.jpg and text information starting with "The bridge ahead of us is Rainbow Bridge . . . ".

Figure 4:
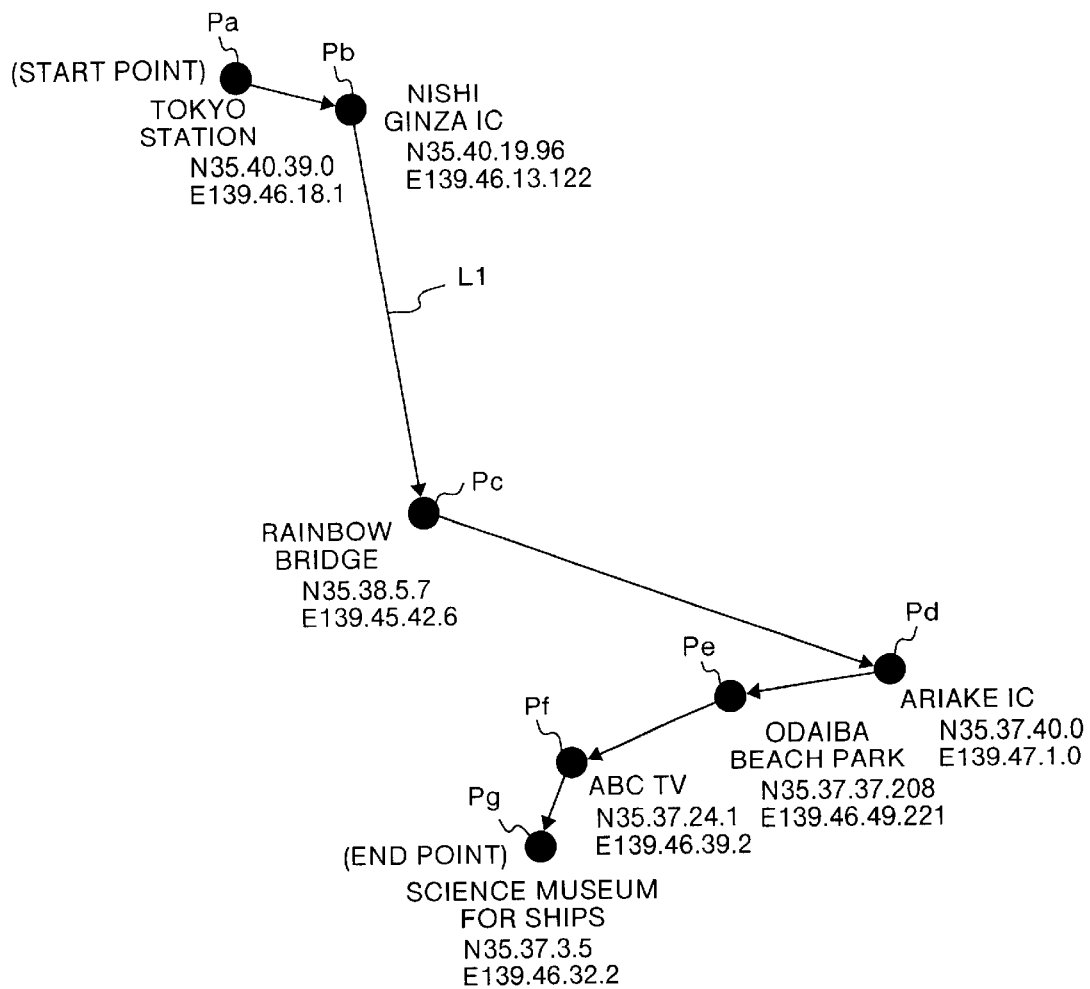
FIG. 4 is a drawing that explains route L1 in the first embodiment.

Referring to FIG. 4, an explanation will be given of one example of a route through which a car travels. In this figure, those parts corresponding to the respective parts of FIG. 3 are indicated by the same reference numerals. This figure shows route L1 from Tokyo Station (start point) to the Science Museum for Ships (endpoint), and route L1, which includes pieces of target position information Pa to Pg (see FIG. 3), passes through respective target positions.

Target position information Pa relates to the position (start point) of Tokyo Station. Target position information Pb relates to the position of Nishi Ginza IC (InterChange). Target position information Pc relates to the position of Rainbow Bridge. Target position information Pd relates to the position of Ariake IC. Target position information Pe relates to the position of Odaiba Beach Park. Target position information Pf relates to the position of ABC TV broadcasting station. Target position information Pg relates to the position of Science Museum for Ships (end point).

Figure 5:
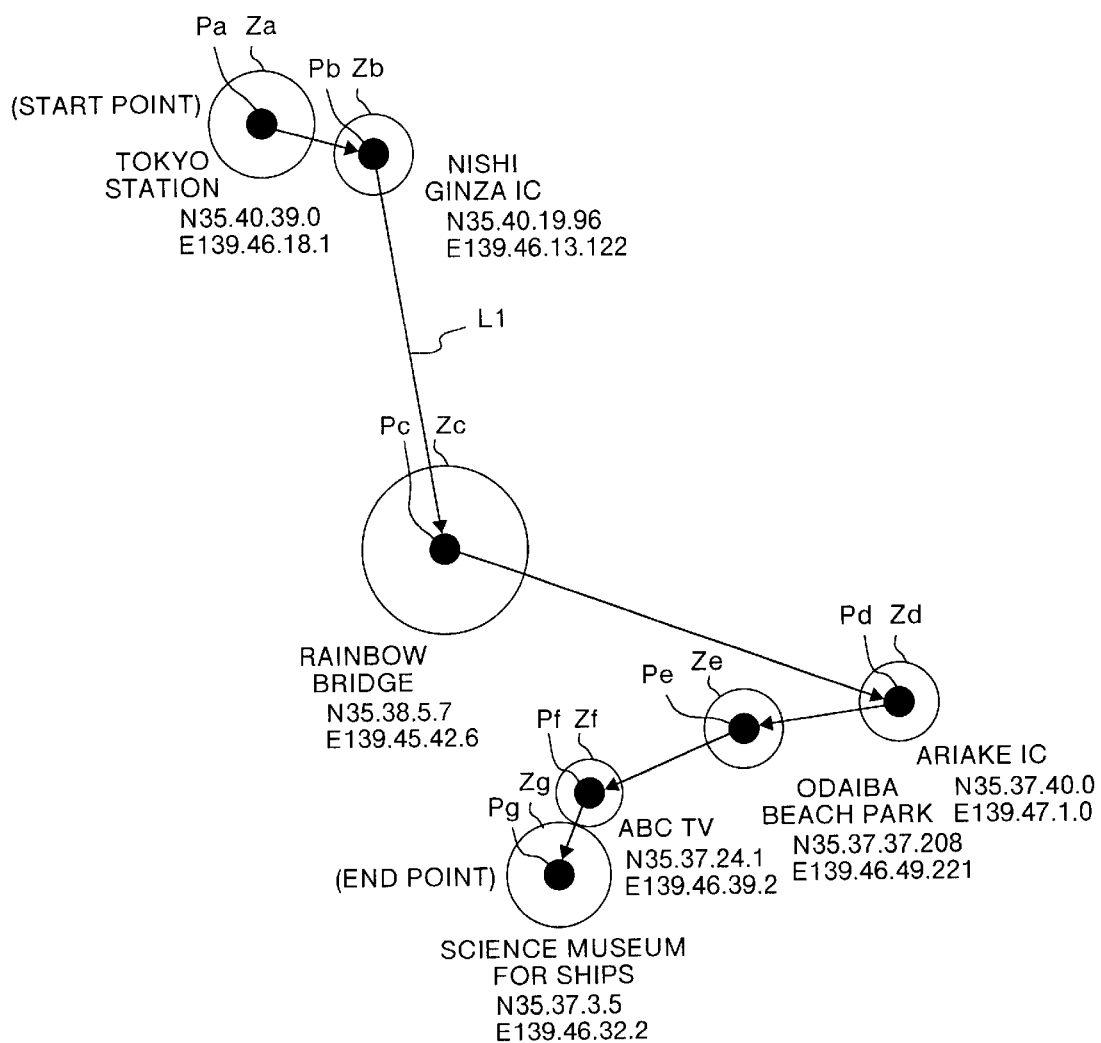
FIG. 5 is a drawing that explains the operational principle of the first embodiment.

In this manner, route L1 is a route passing through the respective target positions, Tokyo Station to Nishi Ginza IC to Rainbow Bridge to Ariake IC to Odaiba Beach Park to ABC TV broadcasting station to Science Museum for Ships. In the guide information requesting device 300 (see FIG. 1) installed in a car, guide information is supplied by the guide information supplying device 200 for each of the target positions, as shown in FIG. 5, while the car is traveling from Tokyo Station (start point) to Science Museum for Ships (end point).

More specifically, first, at Tokyo Station, guide information Za corresponding to target position information Pa is supplied. At Nishi Ginza IC, guide information Zb corresponding to target position information Pb is supplied. At Rainbow Bridge, guide information Zc corresponding to target position information Pc is supplied.

Moreover, at Ariake IC, guide information Zd corresponding to target position information Pd is supplied. At Odaiba Beach Park, guide information Ze corresponding to target position information Pe is supplied. At ABC TV broadcasting station, guide information Zf corresponding to target position Pf is supplied. At Science Museum for ships, guide information Zg corresponding to target position Pg is supplied. Here, besides the above-mentioned route L1, there are a plurality of routes, and prior to the start, the driver selects one of the plurality of routes.

In FIG. 1, the guide-use script information generating section 203 generates guide-use script information corresponding to the above-mentioned route selected by the driver. More specifically, for example, guide-use script information 500 corresponding to route L1 (see FIG. 5) shown in FIGS. 6 and 7, is generated.

Guide-use script information 500 is constituted by a sequence of the above-mentioned pieces of target position information written by Markup language such as XML (extensible Markup Language), and this is transmitted to the guide information requesting device 300.

Figure 7:
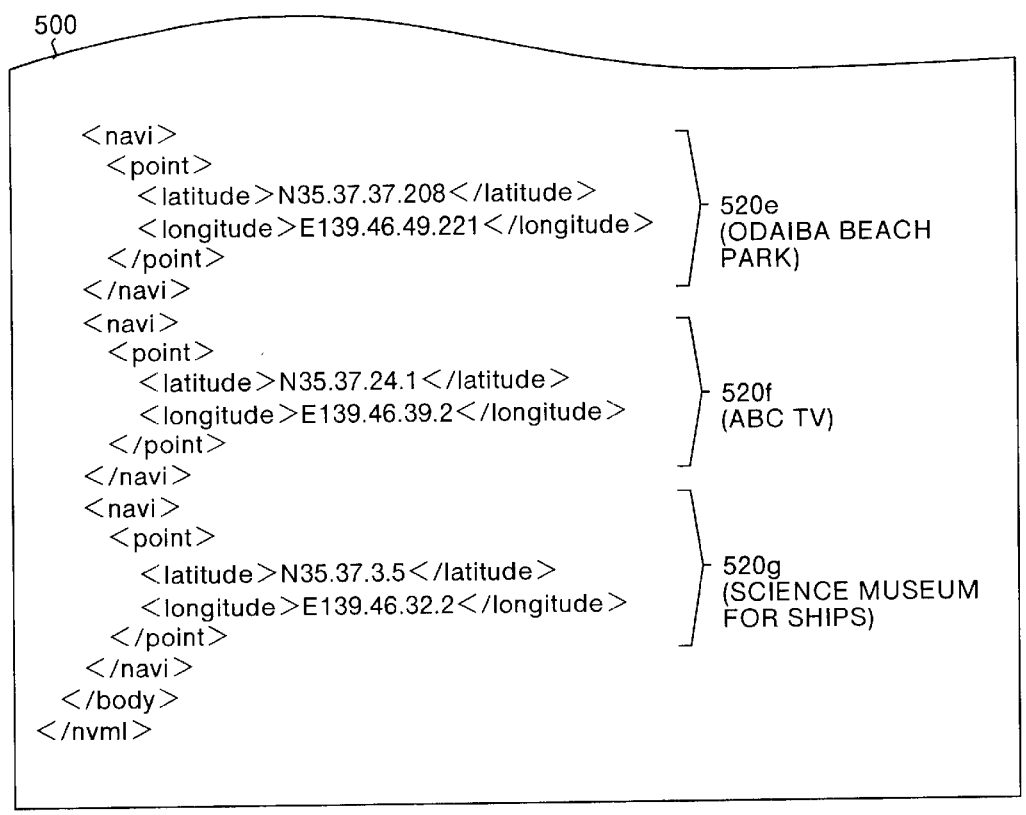
FIG. 7 is a drawing that shows another example of guide-use script information 500 in the first embodiment.

Guide-use script information 500, shown in FIG. 6, is constituted by header information 510, pieces of target position information 520a, 520b, 520c, 520d, and 520e, 520f and 520g shown in FIG. 7.

In guide-use script information 500, a set enclosed by <and > is referred to as "tag", such as <head> and </head>. In Markup Language, among tags, those starting without </ are referred to as starting tags, and those starting with </ are referred to as ending tags.

The starting tag and the ending tag are used as a pair, such as <head> and </head>. The pair of this type is referred to as "tag set". Guide-use script information 500 is written by using a hierarchical structure of tag sets. The portion sandwiched by the tag set represents the tag contents.

Header information 510 includes pieces of information related to route L1 (see FIG. 4), such as title (title: Rainbow Town stroll), category (category: tourism and Tokyo Metropolis), a transport means (transport: car, walk), the time required (duration: 3 hours), distance (distance: 9.6 km) and expense (expense: Metropolitan Expressway Fee 700 yen).

Target position information 520a corresponds to target position information Pa shown in FIG. 4, in which the position of Tokyo Station is represented by the North Latitude (latitude: N35. 40. 39. 0) and the East Longitude (longitude: E139. 46. 18. 1). Target position information 520b corresponds to target position information Pb shown in FIG. 4, in which the position of Nishi Ginza IC is represented by the North Latitude (latitude: N35. 40. 19. 96) and the East Longitude (longitude: E139. 46. 13. 122). In this figure, the tag set, <point> and </point> represents the target position information.

Target position information 520c corresponds to target position information Pc shown in FIG. 4, in which the position of Rainbow Bridge is represented by the North Latitude (latitude: N35. 38. 5. 7) and the East Longitude (longitude: E139. 45. 42. 6). Target position information 520d corresponds to target position information Pd shown in FIG. 4, in which the position of Ariake IC is represented by the North Latitude (latitude: N35. 37. 40. 0) and the East Longitude (longitude: E139. 47. 1. 0).

Target position information 520e, shown in FIG. 7, corresponds to target position information Pe shown in FIG. 4, in which the position of Odaiba Beach Park is represented by the North Latitude (latitude: N35. 37. 37. 208) and the East Longitude (longitude: E139. 46. 49. 221). Target position information 520f corresponds to target position information Pf shown in FIG. 4, in which the position of ABC TV broadcasting station is represented by the North Latitude (latitude: N35. 37. 24. 1) and the East Longitude (longitude: E139. 46. 39. 2).

Target position information 520g corresponds to target position information Pg shown in FIG. 4, in which the position of Science Museum for Ships is represented by the North Latitude (latitude: N35. 37. 3. 5) and the East Longitude (longitude: E139. 46. 32. 2). Moreover, in FIG. 1, the storage section 205 stores various pieces of information. A bus 206 connects respective parts of the guide information supplying device 200.

The guide information requesting device 300 is, for example, a car navigation system installed in a car, and provided with functions, such as a current position information acquiring function for acquiring the current position information related to the current position that changes with time in traveling, every predetermined interval of time, and a matching function for making a matching between the current position of the car and the target position obtained from the guide-use script information 500 (see FIGS. 6 and 7).

Moreover, the guide information requesting device 300 is provided with functions, such as a guide information requesting function for requesting guide information related to the corresponding target position to the guide information supplying device 200 at the time when a matching has been made and a guide information supplying function for supplying the guide information given from the guide information requesting device 300 in response to the request.

An antenna 301 is provided with a function that transmits and receives electric waves used for carrying out communications with the radio station 50 through the radio link R. The communication interface 302 serves as communication interface to an external device. A control unit 303 controls the respective parts of the guide information requesting device 300 so that the guide information requesting function, the guide information supplying function, etc. are achieved.

In the guide information requesting process, for example, pieces of guide information requesting information, 600a, 600b, 600c, 600d, 600e, 600f and 600g shown in FIGS. 8 to 14, are successively transmitted to the guide information supplying device 200. These pieces of guide information requesting information 600a, etc., will be described later, in detail.

A current position information acquiring section 304 utilizes GPS so as to acquire current position information related to the current position represented by the latitude/longitude every fixed interval of time. A recording medium drive 306 reads information recorded on the recording medium 305.

A matching processing section 307 has a function for making a matching between the current position corresponding to the current position information obtained by the current position information acquiring section 304 every fixed interval of time and the target position obtained from the guide-use script information 500 (see FIGS. 6 and 7).

A display section 308, which is constituted by a LCD, etc., is allowed to display pieces of information, such as guide information consisting of text information, image information, etc., and map information, based upon, for example, the pieces of guide information, 700a, 700b, 700c, 700d, 700e, 700f and 700g shown in FIGS. 8 to 14. These pieces of guide information 700a, etc., will be described later in detail. A bus 309 connects respective parts of the guide information requesting device 300.

Figure 15:
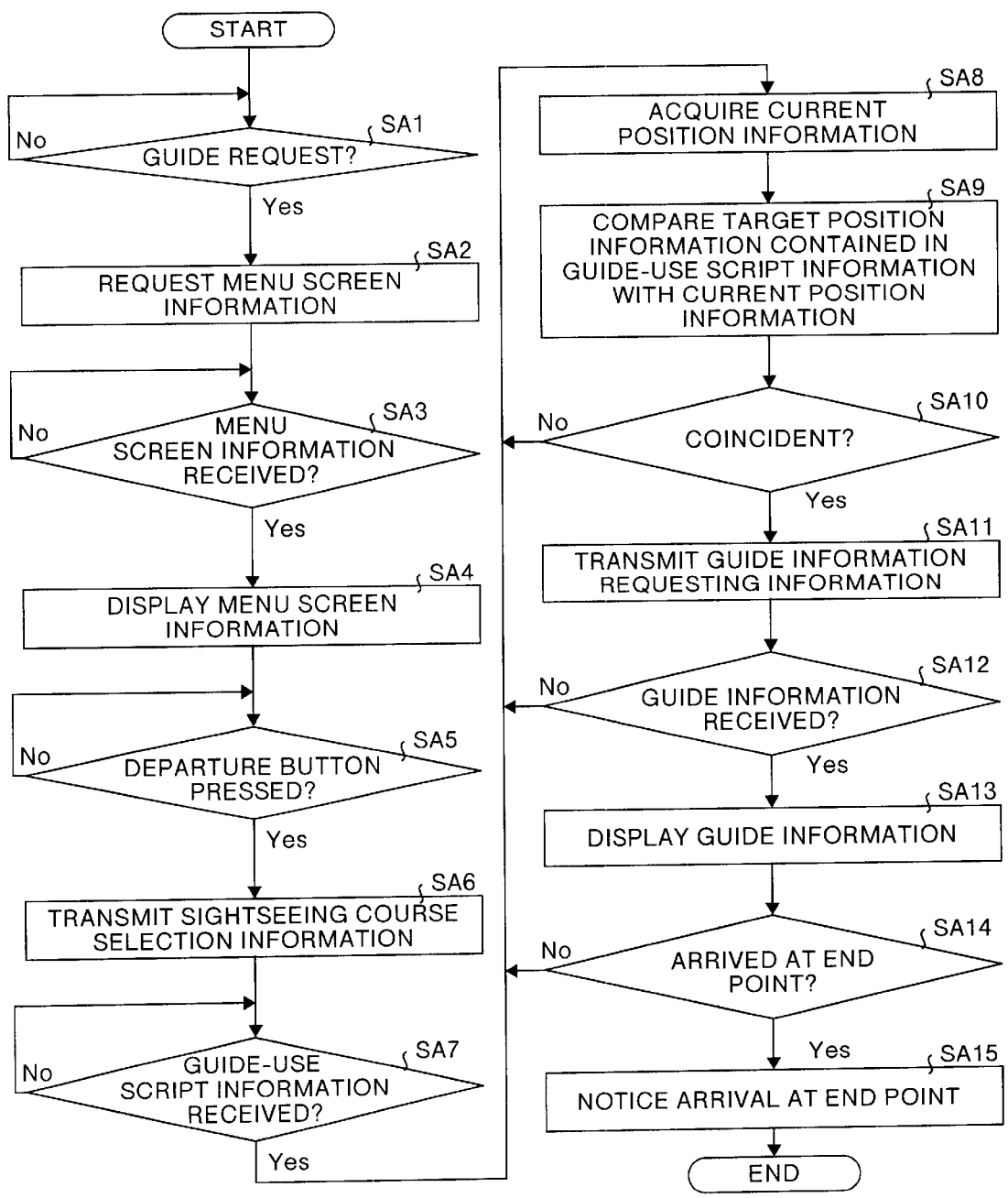
FIG. 15 is a flow chart that explains the operation of a guide information requesting device 300 shown in FIG. 1.
Figure 16:
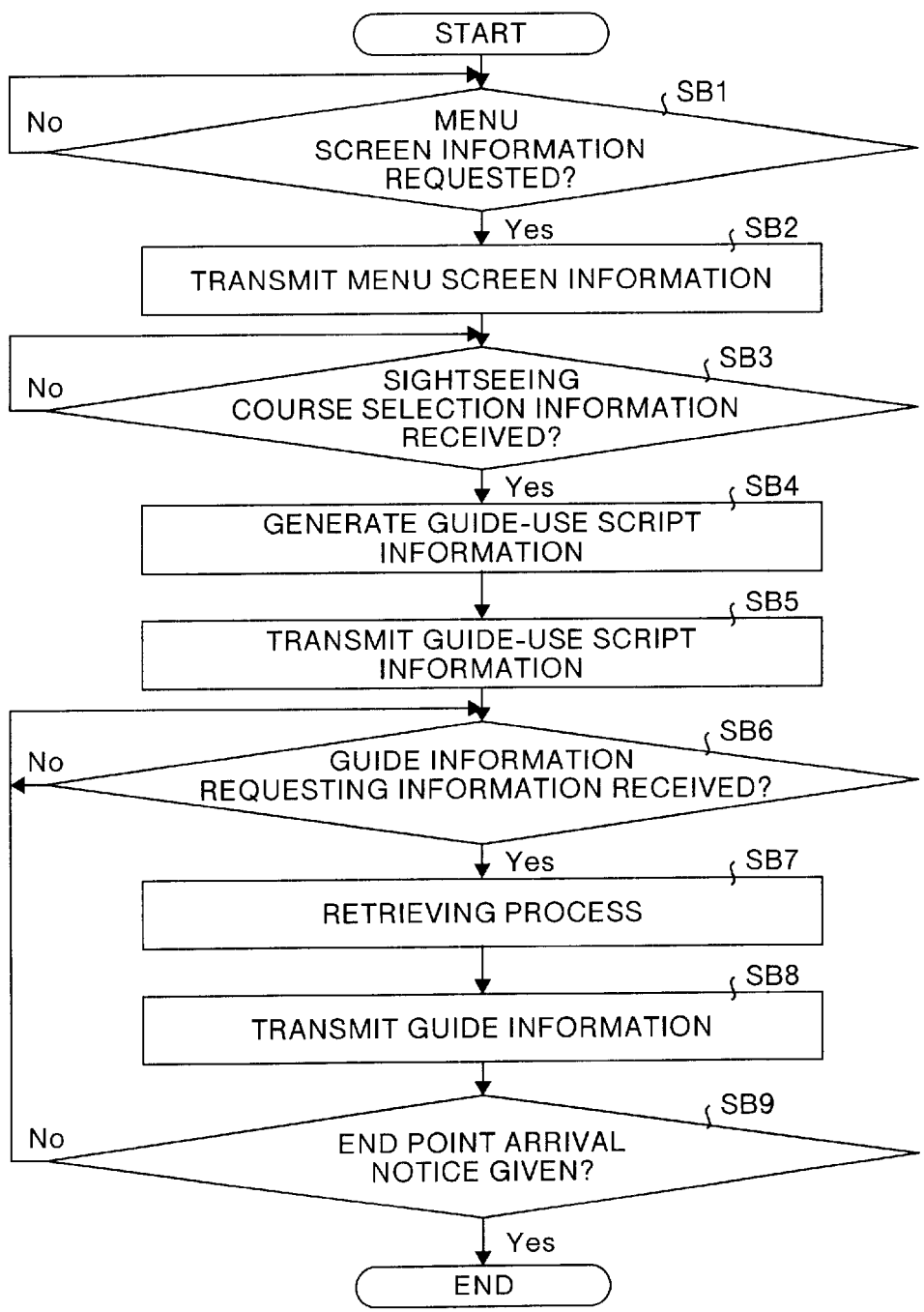
FIG. 16 is a flow chart that explains the operation of a guide information supplying device 200 shown in FIG. 1.

Next, referring to flow charts of FIGS. 15 and 16 and to respective screens shown in FIGS. 17 to 28, the following description will discuss the operations of the first embodiment in detail. FIG. 15 is a flow chart that explains the operation of the guide information requesting device 300 shown in FIG. 1. FIG. 16 is a flow chart that explains the operation of the guide information supplying device 200 shown in FIG. 1.

The following description will discuss a case in which a car in which the guide information requesting device 300 is installed is traveling through route L1 (from Tokyo Station (start point) to Science Museum for Ships (end point)) shown in FIG. 5 among a plurality of tourist routes in the sight-seeing tours in Tokyo.

At step SA1 shown in FIG. 15, the control unit 303 of the guide information requesting device 300 makes a determination as to whether or not there is any guide request from the driver, and in this case, the same determination is repeated with the result of determination being "No".

In contrast, at step SB1 shown in FIG. 16, the control unit 202 of the guide information supplying device 200 makes a determination as to whether or not there is any request for menu screen information from the guide information requesting device 300, and in this case, the same determination is repeated with the result of determination being "No". Here, the menu screen information is information for allowing the display section 308 to display respective screens (menu screens) shown in FIGS. 17 to 21.

When a guide button (not shown) is pressed by the driver, he control unit 303 of the guide information requesting device 300 turns the result of determination at step SA1 shown in FIG. 15 to "Yes". At step SA2, the control unit 303 requests the guide information supplying device 200 to send menu screen information through the radio link R, the radio station 50, the traveling object network 40 and the Internet 30.

Thus, the control unit 202 of the guide information supplying device 200 changes the result of determination at step SB1 shown in FIG. 16 to "Yes". At step SB2, the control unit 202 transmits the menu screen information to the guide information requesting device 300 through the Internet 30, the traveling object network 40, the radio station 50 and the radio link R. At step SB3, the control unit 202 makes a determination as to whether or not sightseeing course selection information, which is the result of a selection on the above-mentioned routes, has been received, and in this case, the same determination is repeated with the result of determination being "No".

At step SA3, the control unit 303 makes a determination as to whether or not the menu screen information has been received, and in this case, the same determination is repeated with the result of determination being "No". When the menu screen information has been received by the guide information requesting device 300, the control unit 303 turns the result of determination at step SA3 shown in FIG. 15 to "Yes". At step SA4, the control unit 303 allows the display section 308 to successively display the respective screens shown in FIGS. 17 to 21 in response to the button operation by the driver. At step SA5, the control unit 303 makes a determination as to whether or not a departure button 1202 shown in FIG. 21 has been depressed, and in this case, the same determination is repeated with the result of determination being "No".

Figure 17:
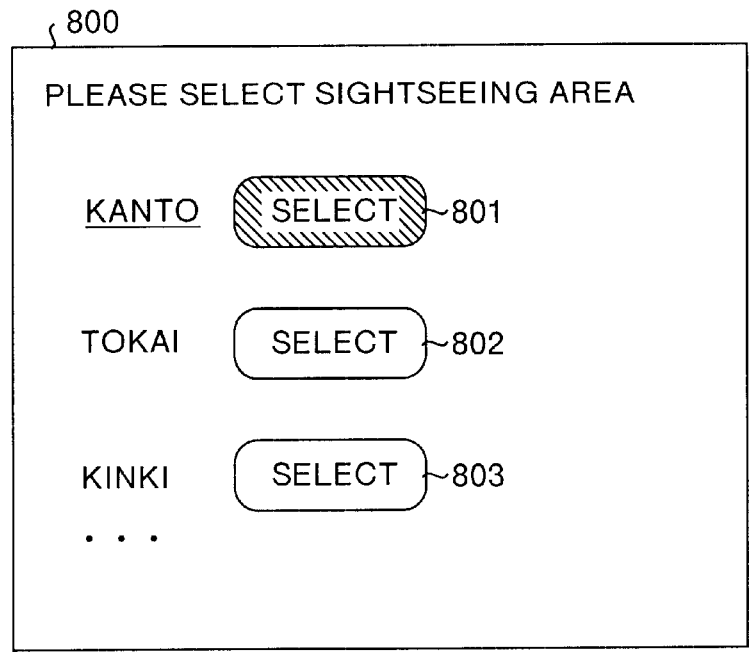
FIG. 17 is a drawing that shows a sightseeing area selection screen 800 in the first and third embodiments.

More specifically, at step SA4, the control unit 303 allows the display section 308 to display a sight-seeing area selection screen 800 shown in FIG. 17. This sight-seeing area selection screen 800 is a screen for allowing the driver to select any sight-seeing area (Kanto area, Tokai area, Kinki area, . . . ) . The sight-seeing area selection screen 800 displays selection buttons 801, 802, 803, . . . corresponding to the respective areas, Kanto, Tokai, Kinki, . . . , etc.

Figure 18:
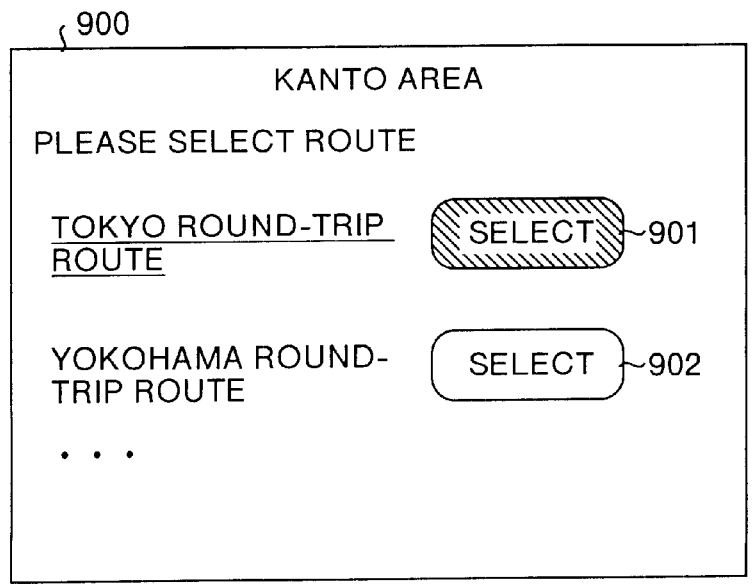
FIG. 18 is a drawing that shows a route selection screen 900 in the first embodiment.

In this case, when one of the selection buttons 801 (Kanto) has been pressed by the driver, the control unit 303 allows the display section 308 to display a route selection screen 900 shown in FIG. 18. This route selection screen 900 is a screen for allowing the driver to select any of the sight-seeing routes in Kanto area (Tokyo round-trip route, Yokohama round-trip route, . . . , etc.). This route selection screen 900 displays selection buttons 901, 902, . . . that respectively correspond to Tokyo round-trip route, Yokohama round-trip route, . . . etc.

Figure 19:
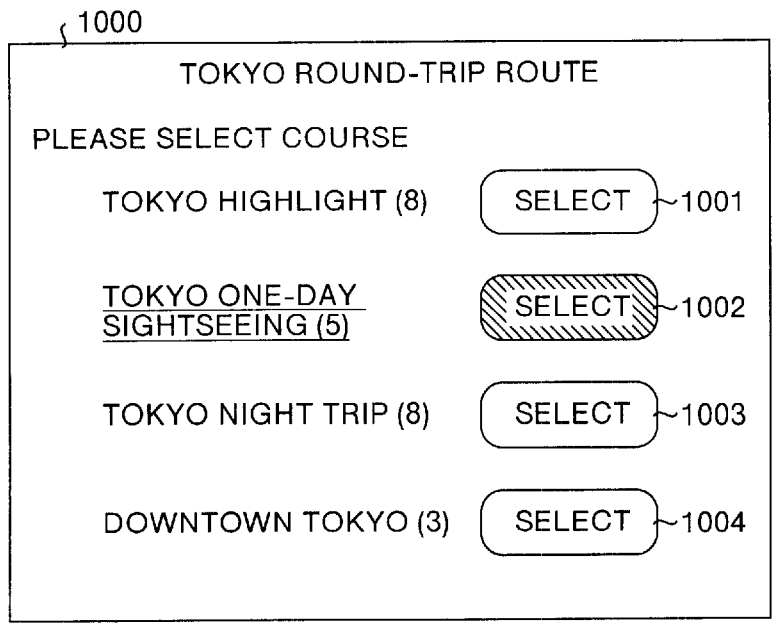
FIG. 19 is a drawing that shows a course selection screen 1000 in the first embodiment.

When the driver presses one of the selection buttons 901 (Tokyo round-trip route), the control unit 303 allows the display section 308 to display a course selection screen 1000 shown in FIG. 19. This course selection screen 1000 allows the driver to select courses in Tokyo round-trip route. This course selection screen 1000 displays selection buttons 1001, 1002, 1003 and 1004 that correspond to the respective courses, Tokyo Highlight, Tokyo one-day sightseeing, Tokyo night tour and Tokyo down town.

Figure 20:
FIG. 20 is a drawing that shows a course selection screen 1100 in the first embodiment.

When the driver presses one of the selection buttons 1002 (Tokyo one-day sightseeing), the control unit 303 allows the display section 308 to display a course selection screen 1100 shown in FIG. 20. This course selection screen 1100 allows the driver to select detailed courses in Tokyo one-day sightseeing course. This course selection screen 1100 displays selection buttons 1101, 1102, 1103, 1104 and 1105 that correspond to the respective detailed courses, Skyscrapers, Rainbow town stroll, Popular film-shooting spots, Down town atmosphere and Tokyo highlight.

Figure 21:
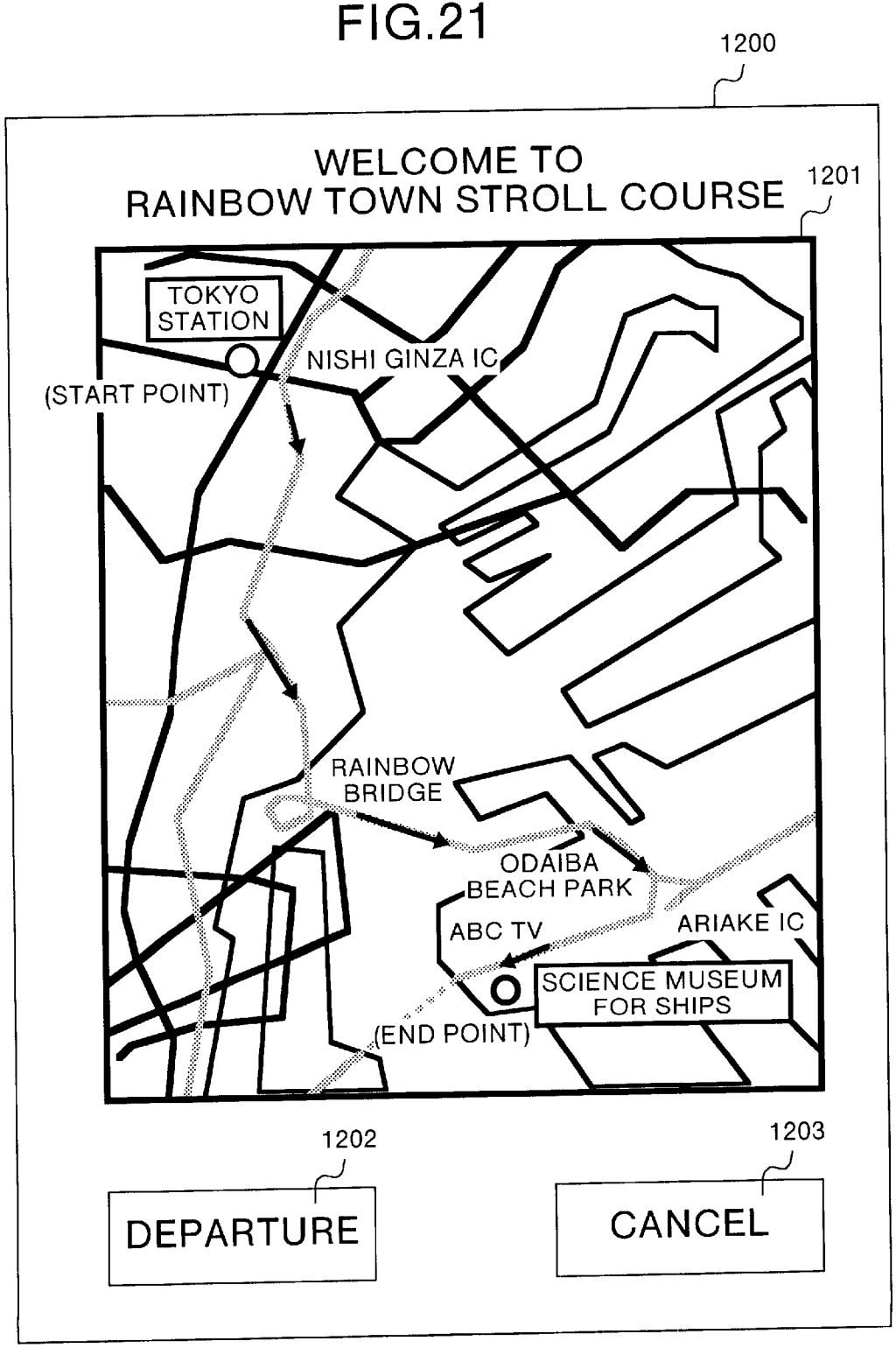
FIG. 21 is a drawing that shows a guide map screen 1200 in the first and third embodiments.
Figure 22:
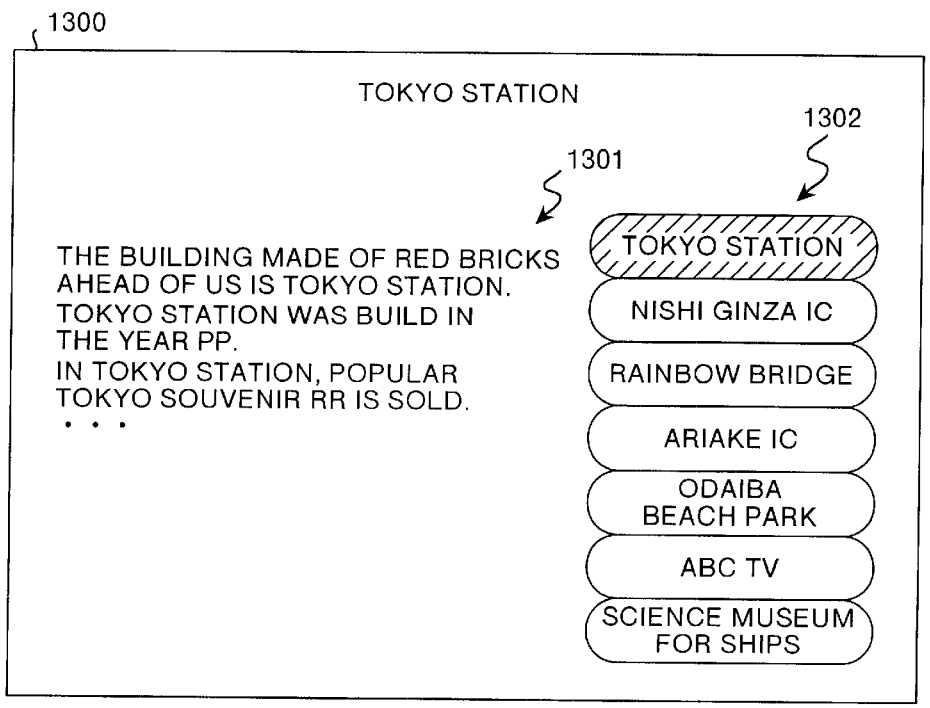
FIG. 22 is a drawing that shows a guide screen 1300 in the first embodiment.
Figure 23:
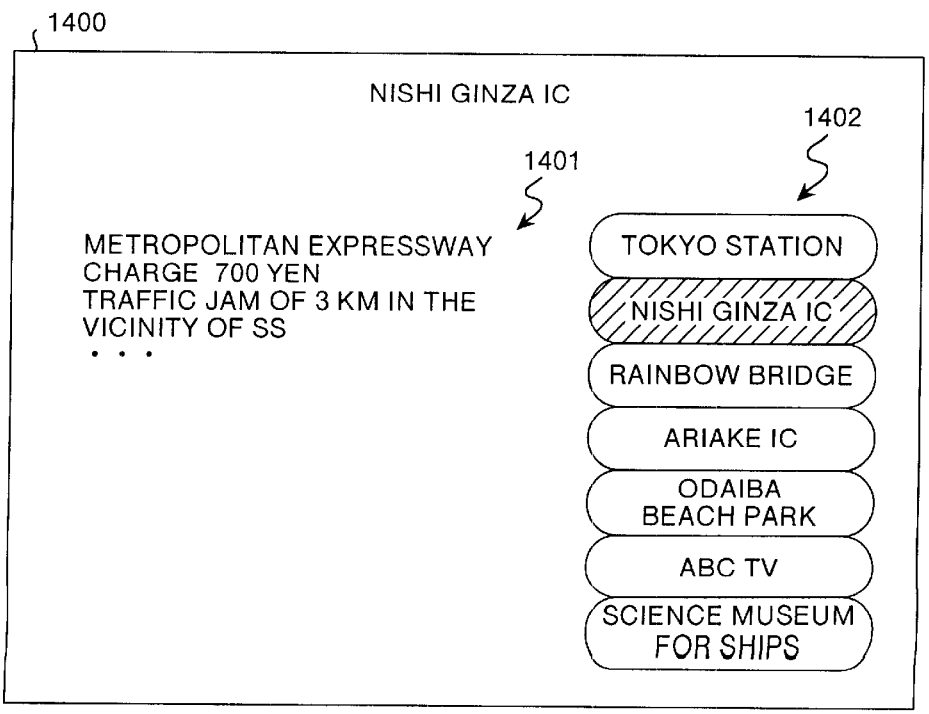
FIG. 23 is a drawing that shows a guide screen 1400 in the first embodiment.
Figure 24:
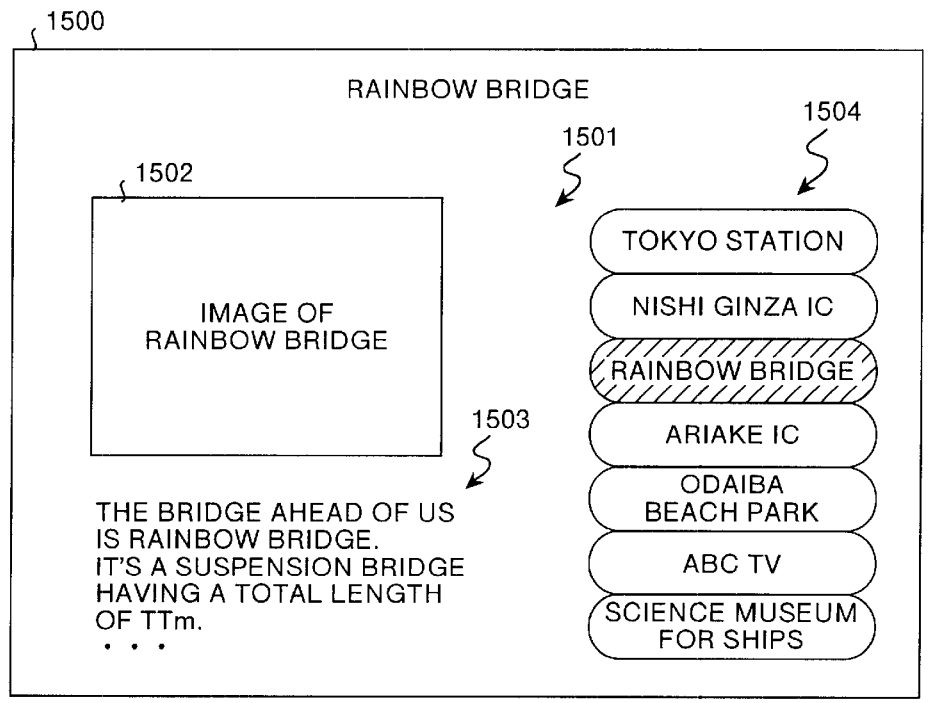
FIG. 24 is a drawing that shows a guide screen 1500 in the first embodiment.
Figure 25:
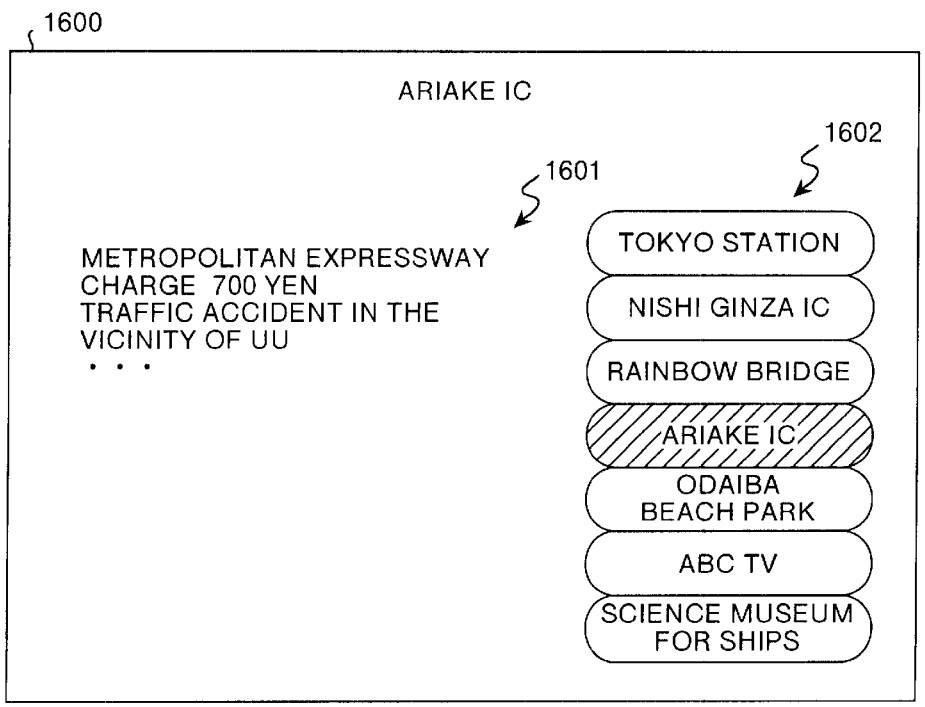
FIG. 25 is a drawing that shows a guide screen 1600 is in the first embodiment.
Figure 26:
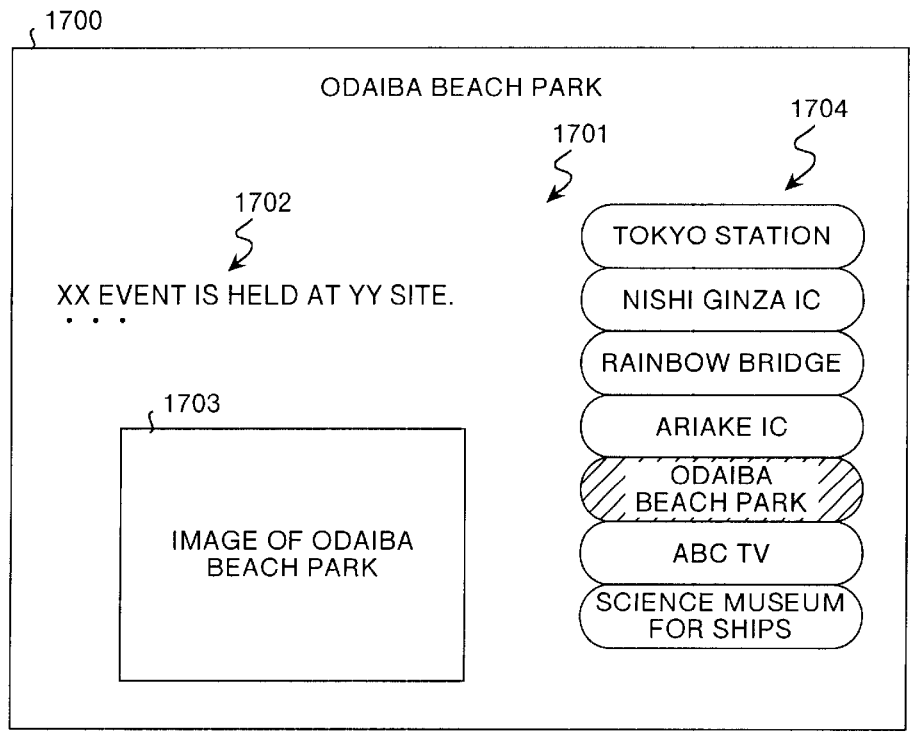
FIG. 26 is a drawing that shows a guide screen 1700 in the first embodiment.
Figure 27:
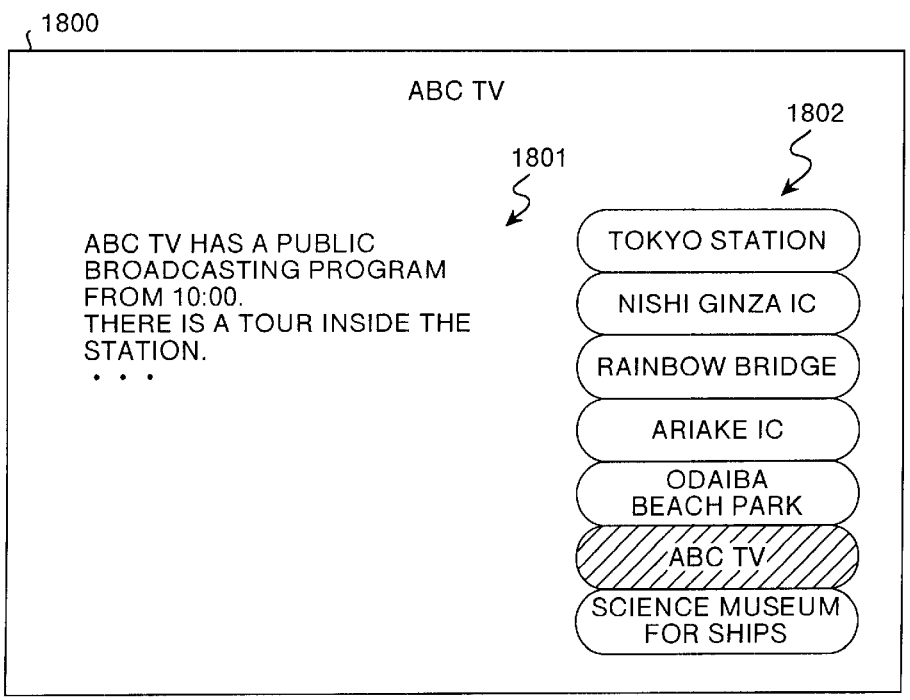
FIG. 27 is a drawing that shows a guide screen 1800 in the first embodiment.
Figure 28:
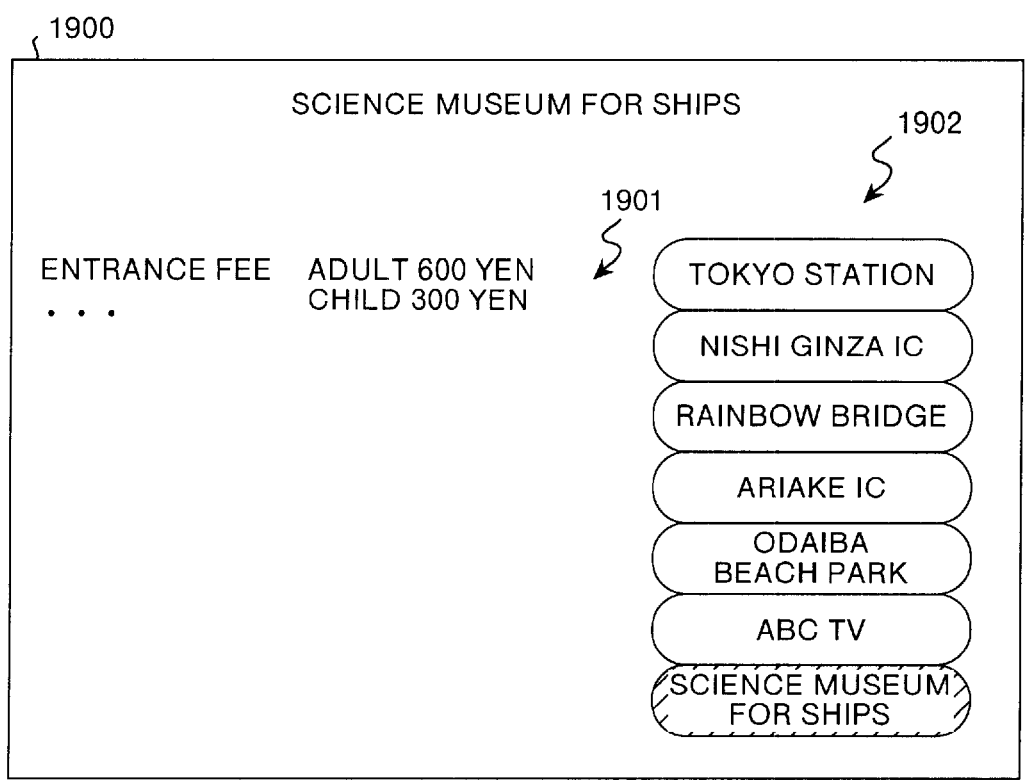
FIG. 28 is a drawing that shows a guide screen 1900 in the first embodiment.

When the driver presses one of the selection buttons 1102 (Rainbow town stroll), the control unit 303 allows the display screen 308 to display a guide map screen 1200 shown in FIG. 21. This course guide map screen 1200 allows the driver to finally make a determination to "Rainbow town stroll course". The guide map screen 1200 displays a guide map 1201, a departure button 1202 and a cancel button 1203.

This guide map 1201 is a map that shows the Rainbow town stroll course (route). This Rainbow town stroll course corresponds to route L1 shown in FIG. 4. In other words, as clearly shown by the guide map 1201 of FIG. 21, the Rainbow town stroll course consists of a route, Tokyo station (start point) to Nishi Ginza IC to Rainbow Bridge to Ariake IC to Odaiba Beach Park to ABC TV broadcasting station to Science Museum for Ships (end point).

After the driver has confirmed the sightseeing course by the guide map 1201, he or she presses the departure button 1202. Thus, the control unit 303 turns the result of determination at step SA5 shown in FIG. 15 to "Yes". Moreover, the driver drives the car to Tokyo Station that is the start point.

At step SA6, the control unit 303 transmits sightseeing course selection information indicating the selection of the Rainbow town stroll course to the guide information supplying device 200. At step SA7, the control unit 303 makes a determination as to whether or not guide-use script information (see FIGS. 6 and 7) has been received from the guide information supplying device 200, and in this case, the same determination is repeated with the result of determination being "No".

When the sightseeing course selection information has been received by the guide information supplying device 200, the control unit 202 of the guide information supplying device 200 turns the result of determination at step SB3 shown in FIG. 16 to "Yes". At step SB4, the guide-use script information generation section 203 generates guide-use script information 500 (see FIGS. 6 and 7) corresponding to the Rainbow town stroll course (route L1: see FIG. 5).

At step SB5, the control unit 202 transmits the guide-use script information 500 shown in FIGS. 6 and 7 to the guide information requesting device 300. At step SB6, the control unit 202 makes a determination as to whether or not guide information requesting information has been received from the guide information requesting device 300, and in this case, the same determination is repeated with the result of determination being "No".

When the guide-use script information 500 has been received by the guide information requesting device 300, the control unit 303 turns the result of determination at step SA7 shown in FIG. 15 to "Yes". At step SA8, the matching processing section 307 acquires the current position information (latitude/longitude) indicating the current position of the car from the current position information acquiring section 304 every fixed interval of time.

At step SA9, the matching processing section 307 compares the current position information acquired at step SA8 with pieces of target position information 520a to 520g contained in FIGS. 6 and 7. At step SA10, the matching processing section 307 determines whether or not the target position information and the current position information are coincident with each other within a predetermined error based upon the results of comparison at step SA9, and in this case, the result of determination is "No".

Thereafter, steps SA8 to SA10 are repeated until the result of determination at step SA10 has become "Yes". Here, the current position information acquired at step SA8 is changing with time since the car is traveling toward Tokyo Station (see FIG. 5).

When the car has arrived at Tokyo Station (see FIG. 5), the matching processing section 307 turns the result of determination at step SA10 to "Yes" since the target position information 520a shown in FIG. 6 and the current position information acquired at step SA8 are coincident with each other within a predetermined range of error.

Figure 8:
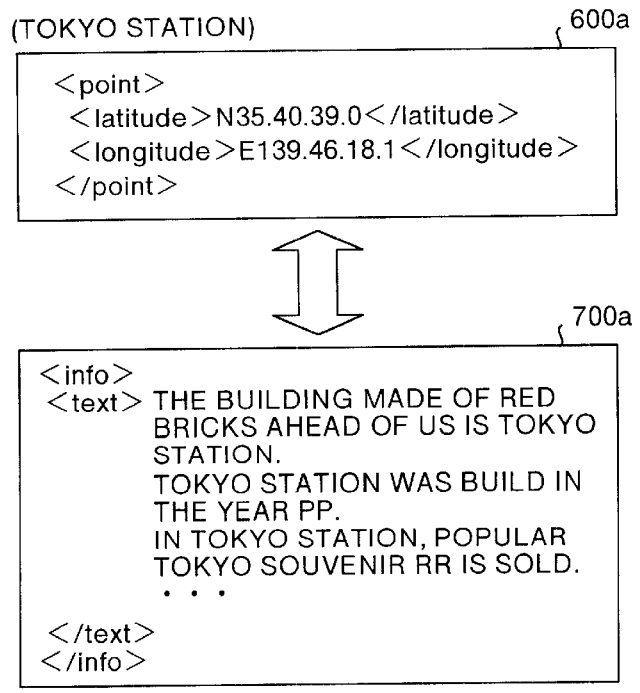
FIG. 8 is a drawing that shows guide information requesting information 600a and guide information 700a in the first embodiment.

At step SA11, the control unit 303 transmits guide information requesting information 600a shown in FIG. 8 to the guide information supplying device 200. This guide information requesting information 600a corresponds to the target position information 520a (see FIG. 6), and forms the position information (latitude/longitude) of Tokyo Station. At step SA12, the control unit 303 determines whether or not guide information has been received from the guide information supplying device 200, and in this case, the same determination is repeated with the result of determination being "No".

When the guide information requesting information 600a has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600a as a key.

In this case, guide information Za (text information), which corresponds to the target position information Pa (Tokyo Station) is retrieved. At step SB8, the control unit 202 transmits guide information 700a shown in FIG. 8 to the guide information requesting device 300. This guide information 700a corresponds to the guide information Za (see FIG. 2).

In the guide information 700a, a set of tags <info> and </info> represents that the data is guide information, and a set of tags <text> and </text> represents that the data is text information.

At step SB9, the control unit 202 makes a determination as to whether or not an end point arrival notice has been given from the guide information requesting device 300, and in this case, a determination at step SB6 is made with the result of determination being "No".

When the guide information 700a shown in FIG. 8 has been received by the guide information requesting device 300, the control unit 303 turns the result of determination at step SA12 shown in FIG. 15 to "Yes". At step SA13, the control unit 303 allows the display section 308 to display a guide screen 1300 shown in FIG. 22.

This guide screen 1300 displays guide information 1301 related to Tokyo Station and route information 1302 indicating the current target position (Tokyo Station). The guide information 1301, which corresponds to the guide information 700a (see FIG. 8) and the guide information Za (see FIG. 2), is text information ("A building made of red bricks ahead of us is Tokyo Station . . . ").

At step SA14, the control unit 303 determines whether or not the car has arrived at the end point (Science Museum for Ships), and in this case, the result of determination is "No". Thereafter, until the car has arrived at the end point, steps SA8 to SA14 are repeated.

Moreover, the driver receives guide information related to Tokyo Station from the guide screen 1300. Then, the driver drives the car toward West Ginza IC that is the next target position along route L1 (see FIG. 5).

When the car has arrived at West Ginza IC (see FIG. 5), the matching processing section 307 turns the result of determination at step SA10 to "Yes" since the target position information 520b shown in FIG. 6 and the current position information acquired at step SA8 are coincident with each other within a predetermined range of error.

Figure 9:
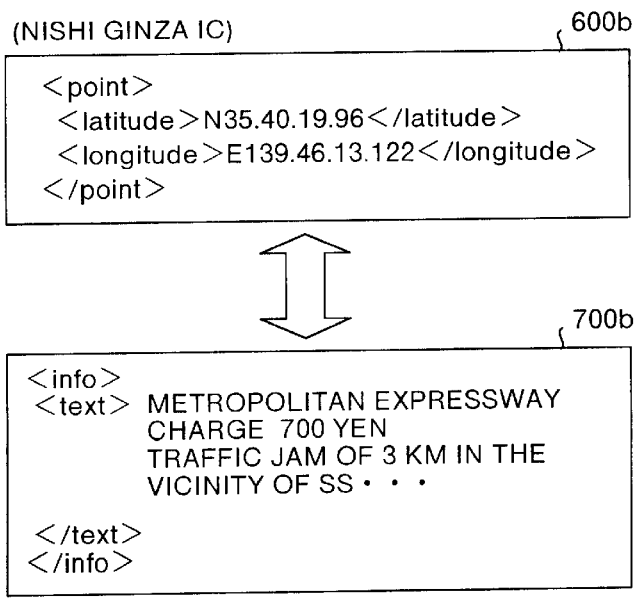
FIG. 9 is a drawing that shows guide information requesting information 600b and guide information 700b in the first embodiment.

At step SA11, the control unit 303 transmits guide information requesting information 600b shown in FIG. 9 to the guide information supplying device 200. This guide information requesting information 600b corresponds to the target position information 520b (see FIG. 6), and forms the position information (latitude/longitude) of West Ginza IC. At step SA12, the control unit 303 determines whether or not guide information has been received from the guide information supplying device 200, and in this case, the same determination is repeated with the result of determination being "No".

When the guide information requesting information 600b has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600b as a key.

In this case, guide information Zb (text information), which corresponds to the target position information Pb (West Ginza IC) is retrieved. At step SB8, the control unit 202 transmits guide information 700b shown in FIG. 9 to the guide information requesting device 300. This guide information 700b corresponds to the guide information Zb (see FIG. 2). At step SB9, the control unit 202 makes a determination as to whether or not an end point arrival notice has been given from the guide information requesting device 300, and in this case, a determination at step SB6 is made with the result of determination being "No".

When the guide information 700b shown in FIG. 9 has been received by the guide information requesting device 300, the control unit 303 turns the result of determination at step SA12 shown in FIG. 15 to "Yes". At step SA13, the control unit 303 allows the display section 308 to display a guide screen 1400 shown in FIG. 23.

This guide screen 1400 displays guide information 1401 related to West Ginza IC and route information 1402 indicating the current target position (West Ginza IC). The guide information 1401, which corresponds to the guide information 700b (see FIG. 9) and the guide information Zb (see FIG. 2), is text information ("Metropolitan Expressway Charge 700 yen . . . "). At step SA14, the control unit 303 determines whether or not the car has arrived at the end point (Science Museum for Ships), and in this case, the result of determination is "No". Thereafter, until the car has arrived at the end point, steps SA8 to SA14 are repeated.

Moreover, the driver receives guide information related to West Ginza IC from the guide screen 1400. Then, the driver drives the car toward Rainbow Bridge that is the next target position along route L1 (see FIG. 5).

When the car has arrived at Rainbow Bridge (see FIG. 5), the matching processing section 307 turns the result of determination at step SA10 to "Yes" since the target position information 520c shown in FIG. 6 and the current position information acquired at step SA8 are coincident with each other within a predetermined range of error.

At step SA11, the control unit 303 transmits guide information requesting information 600c shown in FIG. 10 to the guide information supplying device 200. This guide information requesting information 600c corresponds to the target position information 520c (see FIG. 6), and forms the position information (latitude/longitude) of Rainbow Bridge. At step SA12, the control unit 303 determines whether or not guide information has been received from the guide information supplying device 200, and in this case, the same determination is repeated with the result of determination being "No".

When the guide information requesting information 600c has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600c as a key.

In this case, guide information Zc (image information and text information), which corresponds to the target position information Pc (Rainbow Bridge) is retrieved. At step SB8, the control unit 202 transmits guide information 700c shown in FIG. 10 to the guide information requesting device 300. This guide information 700c corresponds to the guide information Zc (see FIG. 2).

In the guide information 700c, a set of tags <image> and </image> indicates that the data is image information. At step SB9, the control unit 202 makes a determination as to whether or not an end point arrival notice has been given from the guide information requesting device 300, and in this case, a determination at step SB6 is made, with the result of determination being "No".

When the guide information 700c shown in FIG. 10 has been received by the guide information requesting device 300, the control unit 303 turns the result of determination at step SA12 shown in FIG. 15 to "Yes". At step SA13, the control unit 303 allows the display section 308 to display a guide screen 1500 shown in FIG. 24.

This guide screen 1500 displays guide information 1501 related to Rainbow Bridge and route information 1504 indicating the current target position (Rainbow Bridge). The guide information 1501, which corresponds to the guide information 700c (see FIG. 10) and the guide information Zc (see FIG. 2), is composed of image information 1502 (an image of Rainbow Bridge) and text information 1503 ("The bridge ahead of us is Rainbow Bridge . . . ").

At step SA14, the control unit 303 determines whether or not the car has arrived at the end point (Science Museum for Ships), and in this case, the result of determination is "No". Thereafter, until the car has arrived at the end point, steps SA8 to SA14 are repeated.

Moreover, the driver receives guide information related to Rainbow Bridge from the guide screen 1500. Then, the driver drives the car toward Ariake IC that is the next target position along route L1 (see FIG. 5).

When the car has arrived at Ariake IC (see FIG. 5), the matching processing section 307 turns the result of determination at step SA10 to "Yes" since the target position information 520d shown in FIG. 6 and the current position information acquired at step SA8 are coincident with each other within a predetermined range of error.

At step SA11, the control unit 303 transmits guide information requesting information 600d shown in FIG. 11 to the guide information supplying device 200. This guide information requesting information 600d corresponds to the target position information 520d (see FIG. 6), and forms the position information (latitude/longitude) of Ariake IC. At step SA12, the control unit 303 determines whether or not guide information has been received from the guide information supplying device 200, and in this case, the same determination is repeated with the result of determination being "No".

When the guide information requesting information 600d has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600d as a key.

In this case, guide information Zd (text information), which corresponds to the target position information Pd (Ariake IC) is retrieved. At step SB8, the control unit 202 transmits guide information 700d shown in FIG. 11 to the guide information requesting device 300. This guide information 700d corresponds to the guide information Zd (see FIG. 2).

At step SB9, the control unit 202 makes a determination as to whether or not an end point arrival notice has been given from the guide information requesting device 300, and in this case, a determination at step SB6 is made, with the result of determination being "No".

When the guide information 700d shown in FIG. 11 has been received by the guide information requesting device 300, the control unit 303 turns the result of determination at step SA12 shown in FIG. 15 to "Yes". At step SA13, the control unit 303 allows the display section 308 to display a guide screen 1600 shown in FIG. 25.

This guide screen 1600 displays guide information 1601 related to Ariake IC and route information 1602 indicating the current target position (Ariake IC). The guide information 1601, which corresponds to the guide information 700d (see FIG. 11) and the guide information Zd (see FIG. 2), is text information ("Metropolitan Expressway Charge 700 yen . . . ").

At step SA14, the control unit 303 determines whether or not the car has arrived at the end point (Science Museum for Ships), and in this case, the result of determination is "No". Thereafter, until the car has arrived the endpoint, steps SA8 to SA14 are repeated.

Moreover, the driver receives guide information related to Ariake IC from the guide screen 1600. Then, the driver drives the car toward Odaiba Beach Park that is the next target position along route L1 (see FIG. 5).

When the car has arrived at Odaiba Beach Park (see FIG. 5), the matching processing section 307 turns the result of determination at step SA10 to "Yes" since the target position information 520e shown in FIG. 7 and the current position information acquired at step SA8 are coincident with each other within a predetermined range of error.

At step SA11, the control unit 303 transmits guide information requesting information 600e shown in FIG. 12 to the guide information supplying device 200. This guide information requesting information 600e corresponds to the target position information 520e (see FIG. 7), and forms the position information (latitude/longitude) of Odaiba Beach Park. At step SA12, the control unit 303 determines whether or not guide information has been received from the guide information supplying device 200, and in this case, the same determination is repeated, with the result of determination being "No".

When the guide information requesting information 600e has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600e as a key.

In this case, guide information Ze (text information and image information), which corresponds to the target position information Pe (Odaiba Beach Park), is retrieved. At step SB8, the control unit 202 transmits guide information 700e shown in FIG. 12 to the guide information requesting device 300. This guide information 700e corresponds to the guide information Ze (see FIG. 2).

At step SB9, the control unit 202 makes a determination as to whether or not an end point arrival notice has been given from the guide information requesting device 300, and in this case, a determination at step SB6 is made, with the result of determination being "No".

When the guide information 700e shown in FIG. 12 has been received by the guide information requesting device 300, the control unit 303 turns the result of determination at step SA12 shown in FIG. 15 to "Yes". At step SA13, the control unit 303 allows the display section 308 to display a guide screen 1700 shown in FIG. 26.

This guide screen 1700 displays guide information 1701 related to Odaiba Beach Park and route information 1704 indicating the current target position (Odaiba Beach Park) The guide information 1701, which corresponds to the guide information 700e (see FIG. 12) and the guide information Ze (see FIG. 2), is composed of text information 1702 ("XX event is held at YY site . . . ") and image information 1703 (an image of Odaiba Beach Park).

At step SA14, the control unit 303 determines whether or not the car has arrived at the end point (Science Museum for Ships), and in this case, the result of determination is "No". Thereafter, until the car has arrived at the end point, steps SA8 to SA14 are repeated.

Moreover, the driver receives guide information related to Odaiba Beach Park from the guide screen 1700. Then, the driver drives the car toward ABC TV broadcasting station that is the next target position along route L1 (see FIG. 5).

When the car has arrived at ABC TV broadcasting station (see FIG. 5), the matching processing section 307 turns the result of determination at step SA10 to "Yes" since the target position information 520f shown in FIG. 7 and the current position information acquired at step SA8 are coincident with each other within a predetermined range of error.

At step SA11, the control unit 303 transmits guide information requesting information 600f shown in FIG. 13 to the guide information supplying device 200. This guide information requesting information 600f corresponds to the target position information 520f (see FIG. 7), and forms the position information (latitude/longitude) of ABC TV broadcasting station. At step SA12, the control unit 303 determines whether or not guide information has been received from the guide information supplying device 200, and in this case, the same determination is repeated with the result of determination being "No".

When the guide information requesting information 600f has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600f as a key.

In this case, guide information Zf (text information), which corresponds to the target position information Pf (ABC TV broadcasting station), is retrieved. At step SB8, the control unit 202 transmits guide information 700f shown in FIG. 13 to the guide information requesting device 300. This guide information 700f corresponds to the guide information Zf (see FIG. 2).

At step SB9, the control unit 202 makes a determination as to whether or not an end point arrival notice has been given from the guide information requesting device 300, and in this case, a determination at step SB6 is made, with the result of determination being "No".

When the guide information 700f shown in FIG. 13 has been received by the guide information requesting device 300, the control unit 303 turns the result of determination at step SA12 shown in FIG. 15 to "Yes". At step SA13, the control unit 303 allows the display section 308 to display a guide screen 1800 shown in FIG. 27.

This guide screen 1800 displays guide information 1801 related to ABC TV broadcasting station and route information 1802 indicating the current target position (ABC TV broadcasting station). The guide information 1801 is text information ("ABC TV carries out a public broadcasting program from 10:00 . . . ").

At step SA14, the control unit 303 determines whether or not the car has arrived at the end point (Science Museum for Ships), and in this case, the result of determination is "No". Thereafter, until the car has arrived at the end point, steps SA8 to SA14 are repeated.

Moreover, the driver receives guide information related to ABC TV broadcasting station from the guide screen 1800. Then, the driver drives the car toward Science Museum for Ships (end point) that is the next target point along route L1 (see FIG. 5).

When the car has arrived at Science Museum for Ships (see FIG. 5), the matching processing section 307 turns the result of determination at step SA10 to "Yes" since the target position information 520g shown in FIG. 7 and the current position information acquired at step SA8 are coincident with each other within a predetermined range of error.

Figure 14:
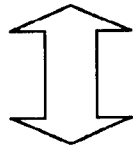
FIG. 14 is a drawing that shows guide information requesting information 600g and guide information 700g in the first embodiment.

At step SA11, the control unit 303 transmits guide information requesting information 600g shown in FIG. 14 to the guide information supplying device 200. This guide information requesting information 600g corresponds to the target position information 520g (see FIG. 7), and forms the position information (latitude/longitude) of Science Museum for Ships. At step SA12, the control unit 303 determines whether or not guide information has been received from the guide information supplying device 200, and in this case, the same determination is repeated with the result of determination being "No".

When the guide information requesting information 600g has been received by the guide information supplying device 200, the control unit 202 turns the result of determination at step SB6 shown in FIG. 16 to "Yes". At step SB7, the control unit 202 retrieves the guide information database 204 shown in FIG. 2 for the guide information by using the target position information (latitude/longitude) contained in the guide information requesting information 600g as a key.

In this case, guide information Zg (text information), which corresponds to the target position information Pg (Science Museum for Ships), is retrieved. At step SB8, the control unit 202 transmits guide information 700g shown in FIG. 14 to the guide information requesting device 300. This guide information 700g corresponds to the guide information Zg (see FIG. 2).

At step SB9, the control unit 202 makes a determination as to whether or not an end point arrival notice has been given from the guide information requesting device 300, and in this case, a determination at step SB6 is made, with the result of determination being "No".

When the guide information 700g shown in FIG. 14 has been received by the guide information requesting device 300, the control unit 303 turns the result of determination at step SA12 shown in FIG. 15 to "Yes". At step SA13, the control unit 303 allows the display section 308 to display a guide screen 1900 shown in FIG. 28.

This guide screen 1900 displays guide information 1901 related to Science Museum for Ships and route information 1902 indicating the current target position (Science Museum for Ships). The guide information 1901 is text information ("Entrance Fee: Adult 600 yen, Children 300 yen . . . ").

At step SA14, the control unit 303 determines whether or not the car has arrived at the end point (Science Museum for Ships), and in this case, the result of determination is "Yes", thereby completing the sequence of processes related to route L1. At step SA15, the control unit 303 gives the end point arrival notice to the guide information supplying device 200. Thus, the control unit 202 turns the result of determination at step SB9 shown in FIG. 16 to "Yes", thereby completing the sequence of processes related to route L1.

In the first embodiment, the explanation has been given of a case in which the guide information requesting information 600a (see FIG. 8) consisting of target position information is transmitted to the guide information supplying device 200 so that based upon the target position information, the guide information supplying device 200 retrieves the guide information database 204 for guide information. However, with respect to the guide information requesting information, information, such as a retrieving program and a URL (Uniform Resource Locator), may also be transmitted so as to reduce the load of the guide information supplying device 200.

Figure 30:
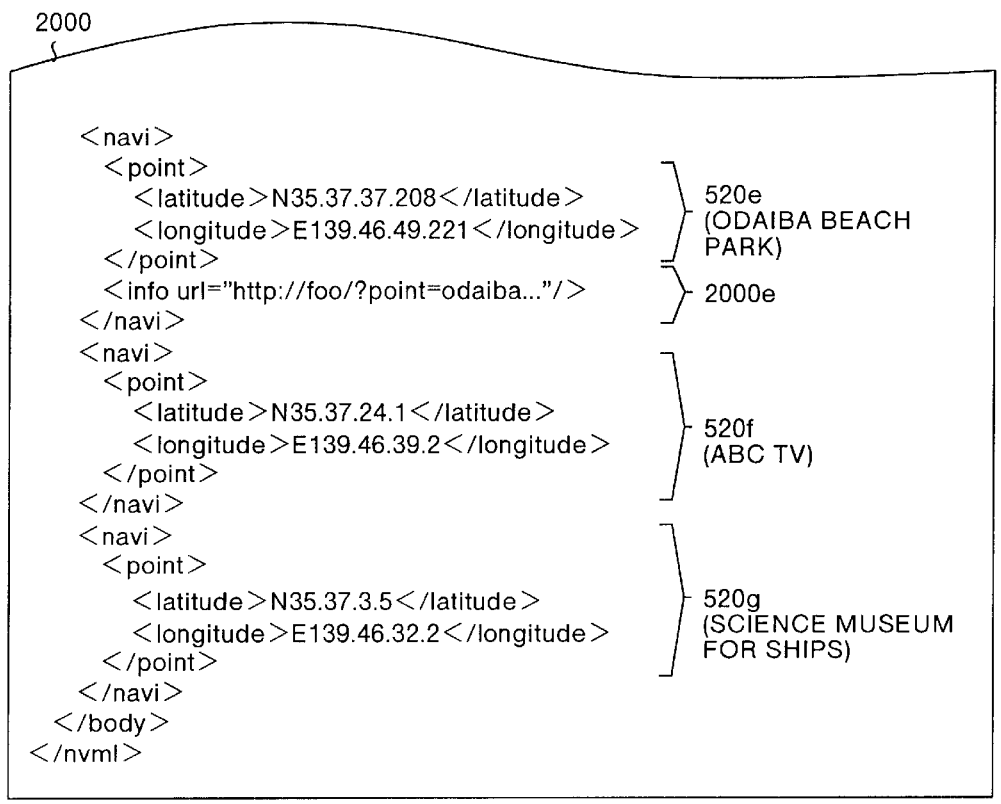
FIG. 30 is a drawing that shows one example of guide-use script information 2000 in the first embodiment.

In this case, at step SB4 shown in FIG. 16, instead of the guide-use script information 500 (see FIGS. 6 and 7), guide-use script information 2000, shown in FIGS. 29 and 30, are generated by a guide-use script information generation section 203. In FIGS. 29 and 30, those parts that perform same or similar functions as the parts shown in FIGS. 6 and 7 are indicated by the same reference numerals.

In guide-use script information 2000 shown in FIG. 29, URL information 2000c that is paired with the target position information 520c is added thereto. This URL information 2000c is information for univocally indicating the storage position of image information (rainbow-bridge.jpg) of Rainbow Bridge contained in guide information Zc shown in FIG. 2.

Moreover, in guide-use script information 2000 shown in FIG. 30, retrieving program information 2000e that is paired with the target position information 520e is added thereto. This retrieving program information 2000e is a program used for retrieving for image information (odaiba.jpg) of Odaiba Beach Park contained in guide information Ze shown in FIG. 2.

The guide-use script information 2000 (see FIGS. 29 and 30), generated at step SB4 shown in FIG. 16, is transmitted to the guide information requesting device 300 at step SB5. The guide-use script information 2000 is received by the guide information requesting device 300.

In this case, when the car has arrived at Rainbow Bridge (see FIG. 5), the matching processing section 307 turns the result of determination at step SA10 to "Yes" since the target position information 520c shown in FIG. 29 and the current position information acquired at step SA8 are coincident with each other within a predetermined range of error.

Figure 31:
FIG. 31 is a drawing that shows guide information requesting information 2100c and guide information 700c in the first embodiment.

At step SA11, the control unit 303 transmits guide information requesting information 2100c shown in FIG. 31 to the guide information supplying device 200. This guide information requesting information 2100c corresponds to the target position information 520c shown in FIG. 29 and the URL information 2000c, and forms the position information (latitude/longitude) of Rainbow Bridge and the URL information of Rainbow Bridge. At step SA12, the control unit 303 determines whether or not guide information has been received from the guide information supplying device 200, and in this case, the same determination is repeated with the result of determination being "No".

When the guide information requesting information 2100c has been received by the guide information supplying device 200, the control unit 202 turns the result of determination at step SB6 shown in FIG. 16 to "Yes". At step SB7, the control unit 202 retrieves the guide information database 204 shown in FIG. 2 for text information by using the target position information (latitude/longitude) contained in the guide information requesting information 2000c as a key. Moreover, the control unit 202 directly acquires image information from the URL information http://www.foo.com/rainbow-bridge.jpg contained in the guide information requesting information 2100c.

At step SB8, the control unit 202 transmits guide information 700c shown in FIG. 31 to the guide information requesting device 300. Then, after the aforementioned processes have been carried out, at step SA13 shown in FIG. 15, the control unit 303 allows the display section 308 to display the guide screen 1500 shown in FIG. 24.

When the car has arrived at Odaiba Beach Park (see FIG. 5), the matching processing section 307 turns the result of determination at step SA10 to "Yes" since the target position information 520e shown in FIG. 30 and the current position information acquired at step SA8 are coincident with each other within a predetermined range of error.

Figure 32:
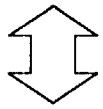
FIG. 32 is a drawing that shows guide information requesting information 2100e and guide information 700e in the first embodiment.

At step SA11, the control unit 303 transmits guide information requesting information 2100e shown in FIG. 32 to the guide information supplying device 200. This guide information requesting information 2100e corresponds to the retrieving program information 2000e shown in FIG. 30. At step SA12, the control unit 303 determines whether or not guide information has been received from the guide information supplying device 200, and in this case, the same determination is repeated with the result of determination being "No".

When the guide information requesting information 2100e has been received by the guide information supplying device 200, the control unit 202 turns the result of determination at step SB6 shown in FIG. 16 to "Yes". At step SB7, the control unit 202 executes the guide information requesting information 2100e (retrieving program) shown in FIG. 32 so as to retrieve the guide information database 204 shown in FIG. 2 for text information and image information of Odaiba Beach Park.

At step SB8, the control unit 202 transmits guide information 700e shown in FIG. 32 to the guide information requesting device 300. Then, after the aforementioned processes have been carried out, at step SA13 shown in FIG. 15, the control unit 303 allows the display section 308 to display the guide screen 1700 shown in FIG. 26.

Figure 33:
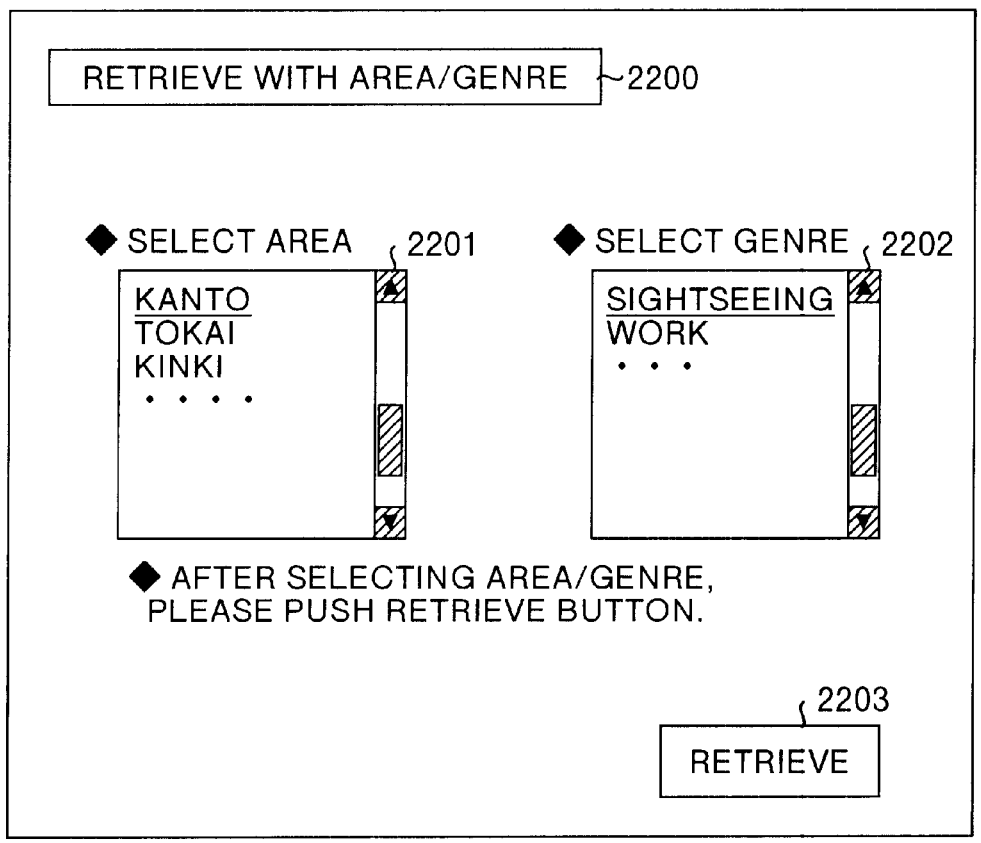
FIG. 33 is a drawing that shows a menu screen 2200 in the first embodiment.
Figure 34:
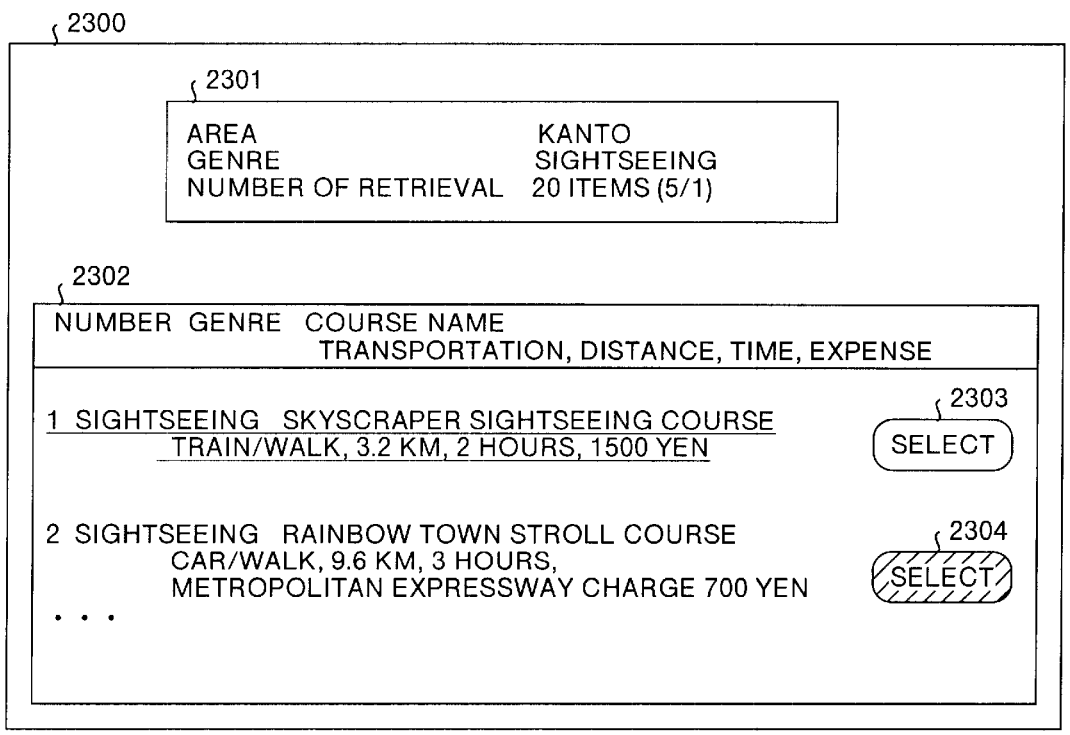
FIG. 34 is a drawing that shows a menu screen 2300 in the first embodiment.

Moreover, in the first embodiment, in place of the menu screens shown in FIGS. 17 to 20, menu screens 2200 and 2300 shown in FIGS. 33 and 34 may be used for selecting sightseeing courses. The menu screen 2200, shown in FIG. 23, displays an area selection section 2201 for selecting areas (Kanto, Tokai, Kinki, etc.), a genre selection section 2202 for selecting genres (tourism, work, etc.) and a retrieving button 2203.

When, after Kanto has been selected in the area selection section 2201 and sightseeing has been selected in the genre selection section 2202, the retrieving button 2203 is pressed, the control unit 300 of the guide information requesting device 300 allows the display section 308 to display the menu screen 2300 shown in FIG. 34. The menu screen 2300 displays a retrieval result displaying frame 2301 and a course selection section 2302. The course selection section 2302 is a frame used for selecting sightseeing courses.

Moreover, the course selection section 2302 displays the selection button 2303, the selection button 2304, . . . that correspond to the respective sightseeing courses. Here, if the selection button 2304 corresponding to number 2 sightseeing course (Rainbow Town stroll course) is pressed, the control unit 303 allows the display section 308 to display a guide map screen 1200 shown in FIG. 21.

In the first embodiment, the target position includes the concept of place. Moreover, in the first embodiment, advertising information related to the target position (place) may be supplied as the guide information. For example, in the case of Harajuku (target position), advertisements related to young fashion may be provided, and in the case of Ginza (target position), advertisements related to brand items for adults may be provided.

Moreover, in the first embodiment, pieces of guide information that are divided into categories are registered in a database, and the piece of guide information corresponding to a category (or categories) specified by the user may be supplied to the user.

As described above, in accordance with the first embodiment, as explained by reference to FIG. 15, provision is made so that it is not until there is a match between the target position information and the current position information (step SA10) that a request for guide information is given to the guide information supplying device 200. Therefore, in comparison with the conventional system in which the guide information supplying device is always accessed every fixed interval of time or a database including unnecessary guide information needs to be downloaded, it is possible to reduce the network load and load on the guide information supplying device side.

For example, supposing that the interval of transmission of position information that is transmitted from the conventional guide information requesting device 60 (see FIG. 56) to guide information supplying device 20 is 10 seconds and the first embodiment makes it possible to reduce the transmission interval to average 10 minutes, the traffic is reduced to 1/60 in comparison with the conventional system.

For example, when the first embodiment is applied to car navigation systems of 4000,000, the traffic is reduced to 1/2.4×100 million as compared with the conventional system. Moreover, when the first embodiment is applied to mobile telephone terminals (58 million) that are widely used in Japan, the traffic is reduced to 1/34.8×100 million as compared with the conventional terminal.

Moreover, in accordance with the first embodiment, as explained in the guide information requesting information 600a shown in FIG. 8, the positional information is transmitted to the guide information supplying device 200 as a pointer for guide information in the guide information database 204 (see FIG. 2). Therefore, based upon the above-mentioned pointer (position information), the guide information supplying device 200 readily carries out retrieval and supply of the guide information.

Furthermore, in accordance with the first embodiment, the guide-use script information 500 (see FIGS. 6 and 7) consisting of a sequence of pieces of target position information is generated by the guide-use script information generation section 203, and this guide-use script information 500 is supplied to the guide information requesting device 300. Therefore, it becomes possible to reduce the load imposed on the guide information requesting device 300. Thus, in particular, even in the case of small-size PDAs, mobile telephone terminals and PHS terminals having a small storage area and the subsequent low processing capability, it is possible to reduce the network load and the load imposed on the guide information supplying device.

Moreover, in accordance with the first embodiment, with respect to the guide information requesting information, URL information (guide information requesting information 2100c: FIG. 31) related to the storage position of guide information and a retrieving program (guide information requesting information 2100e: FIG. 32) for retrieving the guide information database 204 for guide information are transmitted to the guide information supplying device. Therefore, based upon the above-mentioned pointer (position information), the guide information supplying device 200 readily carries out retrieval and supply of the guide information.

In the first embodiment, the explanation has been given of a case in which, upon arrival of the car at the target position, the guide information requesting device 300 requests the guide information supplying device 200 to send guide information in real time so that the guide information supplying device 200 supplies the guide information to the guide information requesting device 300; however, the request may be made prior to the arrival of the car at the target position or after the arrival thereof, that is, the timing of the request may be adjusted. These cases will be explained below as a second embodiment.

FIG. 35 is a block diagram that shows a construction of the second embodiment in accordance with the present invention. In this figure, those parts that perform same or similar functions as the parts shown in FIG. 1 are indicated by the same reference numerals, and the description thereof is omitted. In a guide information supplying system 110 shown in FIG. 35, in place of the guide information requesting device 300 shown in FIG. 1, a guide information requesting device 2400 is installed. Moreover, in the guide information supplying device 200, in place of the guide information database 204 shown in FIG. 2, a guide information database 207 shown in FIG. 36 is installed.

In this guide information database 207, those parts corresponding to those of the guide information database 204 shown in FIG. 2 are indicated by the same reference numerals. In the guide information database 207, a field named "timing adjusting information" is newly placed. This "timing adjusting information" is information used for adjusting the timing in which the guide information requesting device 2400 gives a request for guide information to the guide information supplying device 200.

More specifically, if "timing adjusting information"=−1.0 km has been set in association with target position information Pa, upon arrival of the car 1.0 km before the target position (Tokyo Station), a request for guide information is made (hereinafter, referred to as early request) before the arrival at the target position. Moreover, if "timing adjusting information"=+0.1 km has been set in association with target position information Pe, when, after the car has reached the target position (Odaiba Beach Park), it further travels 0.1 km, a request for guide information is made (hereinafter, referred to as delayed request).

Again, in FIG. 35, in the guide information requesting device 2400, in place of the control unit 303 and the matching processing section 307 shown in FIG. 1, a control unit 2401 and a matching processing section 2404 are placed.

Specific operations of these control unit 2401 and matching processing section 2404 will be described later. A travel distance measuring section 2402 measures the travel distance of the car from the target position at the time of delayed request. A distance calculation section 2403 calculates the distance between the current position of the car and the target position at the time of early request.

Figure 37:
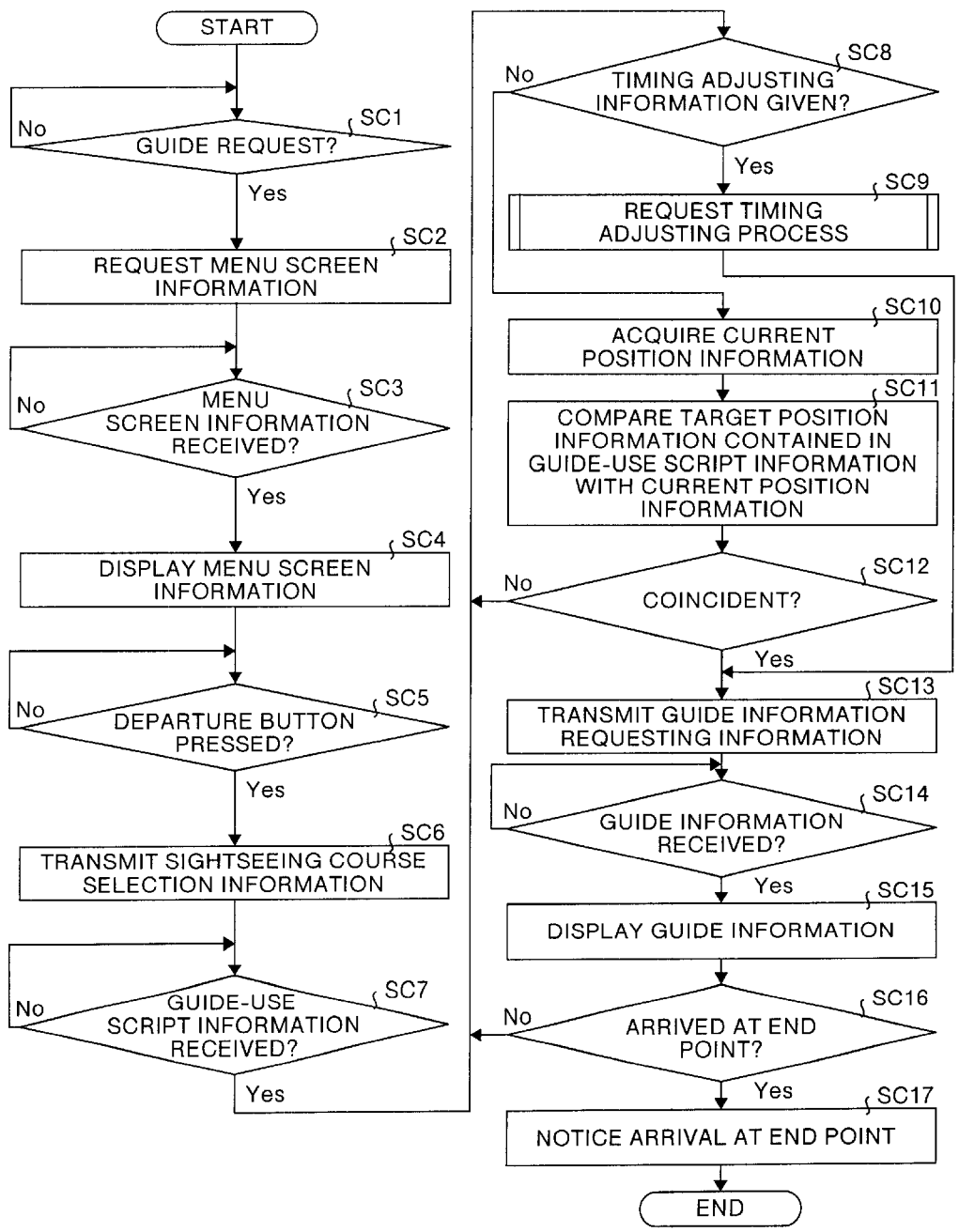
FIG. 37 is a flow chart that explains the operation of a guide information requesting device 2400 shown in FIG. 35.
Figure 38:
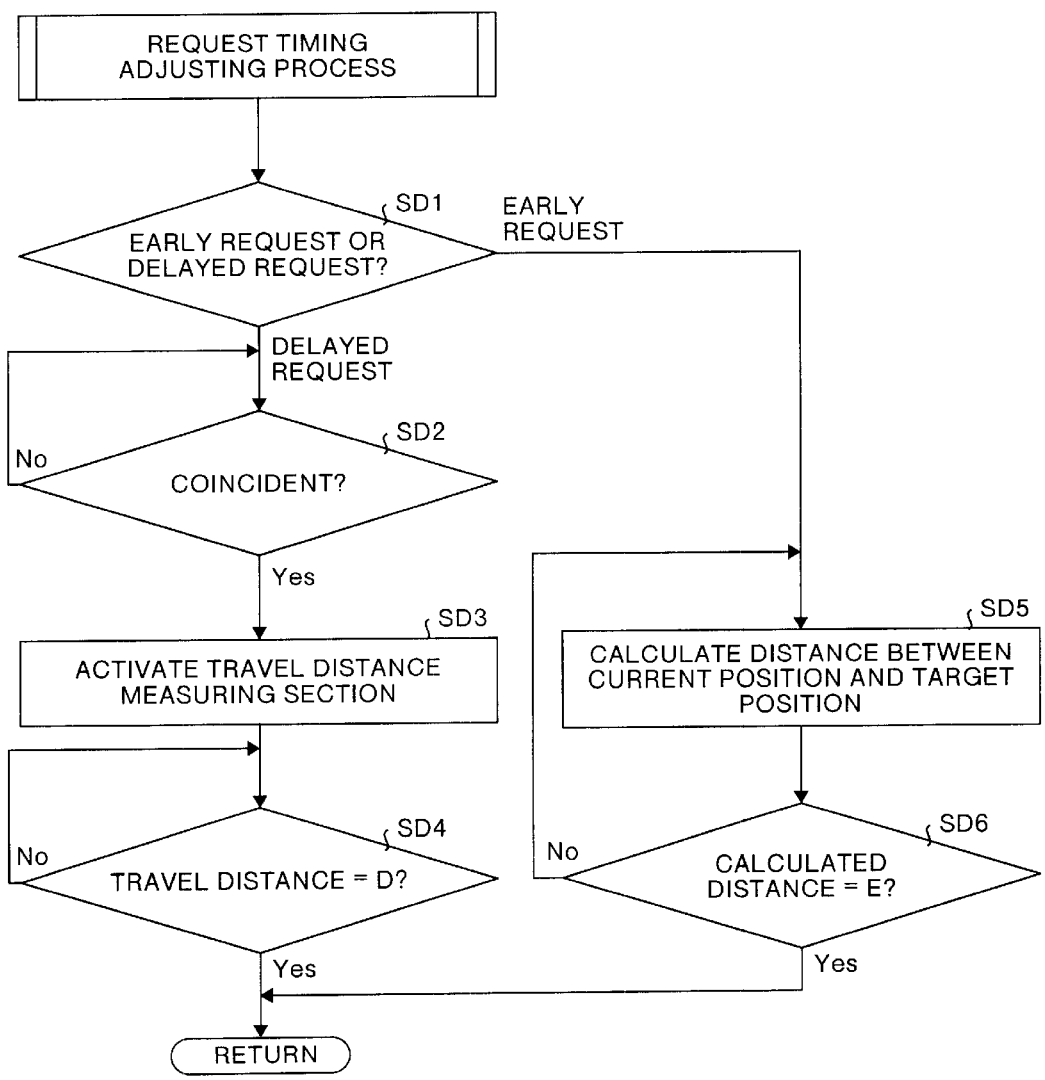
FIG. 38 is a flow chart that explains a request timing adjusting process shown in FIG. 37.

Next, referring to flow charts shown in FIGS. 37 and 38, the following description will discuss the operation of the second embodiment in detail. FIGS. 37 and 38 are flow charts that explain the operation of the guide information requesting device 2400 shown in FIG. 35.

In the same manner as the first embodiment, the following description will exemplify a case in which a car provided with the guide information requesting device 2400 travels through route L1 (Tokyo Station (start point) to Science Museum for Ships (end point)) shown in FIG. 5.

At step SC1 shown in FIG. 37, the control unit 2401 of the guide information requesting device 2400 makes a determination as to whether or not there is any guide request from the driver, and in this case, the same determination is repeated with the result of determination being "No".

In contrast, at step SB1 shown in FIG. 16, the control unit 202 of the guide information supplying device 200 makes a determination as to whether or not there is any request for menu screen information from the guide information requesting device 2400, and in this case, the same determination is repeated with the result of determination being "No". Here, the menu screen information is information for allowing the display section 308 to display respective screens (menu screens) shown in FIGS. 17 to 21.

When a guide button (not shown) is pressed by the driver, the control unit 2401 of the guide information requesting device 2400 turns the result of determination at step SC1 shown in FIG. 37 to "Yes". At step SC2, the control unit 2401 requests the guide information supplying device 200 to send menu screen information in the same manner as step SA2 (see FIG. 15).

Thus, the control unit 202 of the guide information supplying device 200 changes the result of determination at step SB1 shown in FIG. 16 to "Yes". At step SB2, the control unit 202 transmits the menu screen information to the guide information requesting device 2400 through the Internet 30, the traveling object network 40, the radio station 50 and the radio link R. At step SB3, the control unit 202 makes a determination as to whether or not sightseeing course selection information, which is the result of a selection on the above-mentioned routes, has been received, and in this case, the same determination is repeated with the result of determination being "No".

At step SC3, the control unit 2401 makes a determination as to whether or not the menu screen information has been received, and in this case, the same determination is repeated with the result of determination being "No". When the menu screen information has been received by the guide information requesting device 2400, the control unit 2401 turns the result of determination at step SC3 shown in FIG. 37 to "Yes". Thereafter, at steps SC4 to SC6, the same operations as the aforementioned steps SA4 to SA6 (see FIG. 15) are carried out.

In other words, if the departure button 1202 shown in FIG. 21 is depressed, at step SC6, the control unit 2401 transmits the sightseeing course selection information indicating that the above-mentioned Rainbow Town stroll course has been selected to the guide information supplying device 200. At step SC7, the control section 2401 determines whether or not guide-use script information (see FIGS. 39 and 40) has been received from the guide information supplying device 200, and in this case, the same determination is repeated with the result of determination being "No".

When the sightseeing course selection information has been received by the guide information supplying device 200, the control unit 202 of the guide information supplying device 200 turns the result of determination at step SB3 shown in FIG. 16 to "Yes". At step SB4, the guide-use script information generation section 203 generates guide-use script information 2500 (see FIGS. 39 and 40) corresponding to Rainbow Town stroll course (route L1: see FIG. 5).

In the guide-use script information 2500, those parts that perform same or similar functions as the parts shown in FIGS. 6 and 7 are indicated by the same reference numerals. With respect to the guide-use script information 2500 shown in FIG. 39, timing adjusting information 2500a that is paired with the target position information 520a is added thereto. This timing adjusting information 2500a corresponds to "timing adjusting information"=−1.0 km recorded in association with target position information Pa shown in FIG. 36.

Figure 40:
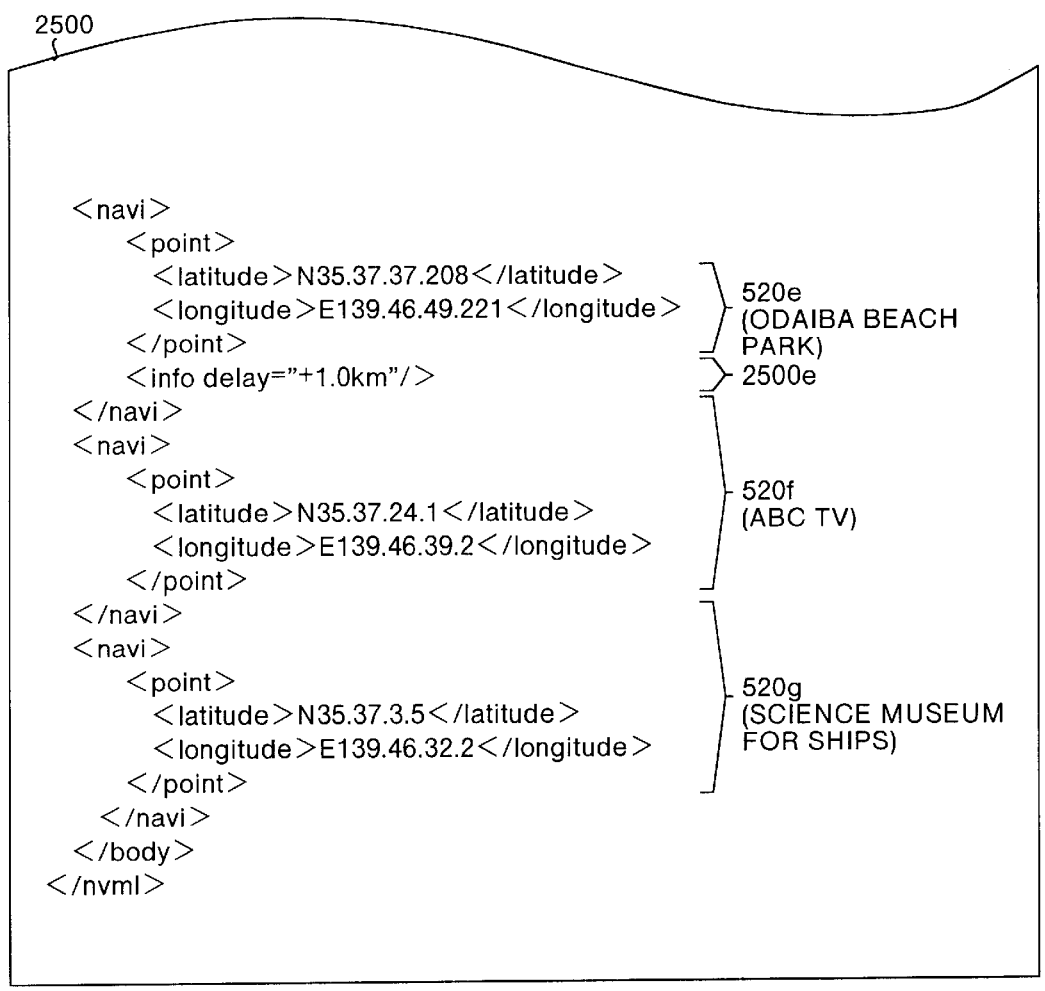
FIG. 40 is a drawing that shows one example of guide-use script information 2500 in accordance with the second embodiment.

Moreover, with respect to the guide-use script information 2500 shown in FIG. 40, timing adjusting information 2500e that is paired with the target position information 520e is added thereto. This timing adjusting information 2500e corresponds to "timing adjusting information"=+0.1 km recorded in association with target position information Pe shown in FIG. 36.

At step SB5, the control unit 202 transmits the guide-use script information 2500 shown in FIGS. 39 and 40 to the guide information requesting device 2400. At step SB6, the control unit 202 makes a determination as to whether or not guide information requesting information has been received from the guide information supplying device 200, and in this case, the same determination is repeated with the result of determination being "No".

When the guide-use script information 2500 has been received by the guide information requesting device 2400, the control unit 2401 turns the result of determination at step SC7 shown in FIG. 37 to "Yes". At step SC8, the matching processing section 2404 makes a determination as to whether or not the received guide-use script information contains any timing adjusting information.

In this case, since the timing adjusting information 2500a, paired with the target position information 520a of the guide-use script information 2500 shown in FIG. 39, exists, the matching processing section 2404 turns the result of determination at step SC8 to "Yes". At step SC9, the matching processing section 2404 executes a request timing adjusting process. At this point of time, the car is on the way to Tokyo Station.

More specifically, at step SD1 shown in FIG. 38, the matching processing section 2404 makes a determination as to which request the timing adjusting information 2500a shown in FIG. 39 is related to, early request or delayed request. In this case, since it is related to early request (−1.0 km), the process of step SD5 is executed.

At step SD5, based upon the current position information from the current position information acquiring section 304 and the target position information 520a (see FIG. 39), a distance calculation section 2403 calculates the distance between the current position of the car and the target position (Tokyo Station). At step SD6, the matching processing section 2404 determines whether or not the calculated distance is equal to a set distance E.

This set distance E is an absolute value (1.0 km) of −1.0 km in the timing adjusting information 2500a. In other words, at step SD6, it is determined whether or not the car is located 1.0 km before the target position (Tokyo Station).

In this case, supposing that the result of determination at step SD6 is "No", the succeeding step SD5 and step SD6 are repeated so that as the car approaches the target position, the calculated distance is gradually shortened. Then, the car has reached 1.0 km before the target position (Tokyo Station), the matching processing section 2404 turns the result of determination at step SD6 to "Yes".

At step SC13 shown in FIG. 37, the control unit 2401 transmits guide information requesting information 600a shown in FIG. 8 to the guide information supplying device 200. At step SC14, the control unit 2401 determines whether or not guide information has been received from the guide information supplying device 200, and in this case, the same determination is repeated with the result of determination being "No".

When the guide information requesting information 600a has been received by the guide information supplying device 200, the control unit 202 turns the result of determination at step SB6 shown in FIG. 16 to "Yes". At step SB7, the control unit 202 retrieves the guide information database 207 shown in FIG. 36 for the guide information.

At step SB8, the control unit 202 transmits guide information 700a shown in FIG. 8 to the guide information requesting device 2400. At step SB9, the control unit 202 makes a determination as to whether or not an end point arrival notice has been given from the guide information requesting device 2400, and in this case, a determination at step SB6 is made, with the result of determination being "No".

When the guide information 700a shown in FIG. 8 has been received by the guide information requesting device 2400, the control unit 2401 turns the result of determination at step SC14 shown in FIG. 37 to "Yes". At step SC15, the control unit 2401 allows the display section 308 to display a guide screen 1300 shown in FIG. 22. At this point of time, the car has not arrived at the target position.

At step SC16, the control unit 2401 determines whether or not the car has arrived at the end point (Science Museum for Ships), and in this case, the result of determination is "No". Thereafter, until the car has arrived at the end point, the determination at step SC8 is carried out. Here, when the result of determination at step SB8 is "No", the same processes as the aforementioned steps SA8 to SA10 are carried out in steps SC10 to SC12.

Then, if, after having passed through Nishi Ginza IC to Rainbow Bridge to Ariake IC shown in FIG. 5, the car is traveling toward Odaiba Beach Park that is the next target point, at step SC8 shown in FIG. 37, since the timing adjusting information 2500e, paired with the target position information 520e (Odaiba Beach Park) shown in FIG. 40, exists, the matching processing section 2404 turns the result of determination to "Yes". At step SC9, the matching processing section 2404 executes a request timing adjusting process.

In other words, at step SD1 shown in FIG. 38, the matching processing section 2404 makes a determination as to which request the timing adjusting information 2500e shown in FIG. 40 is related to, early request or delayed request. In this case, since it is related to delayed request (+1.0 km), the process of step SD2 is executed.

At step SD2, based upon the current position information from the current position information acquiring section 304 and the target position information obtained from the target position information 520e, the matching processing section 2404 determines whether or not the current position is coincident with the target position within a predetermined range of error, and in this case, the same determination is repeated, with the result of determination being "No".

Upon arrival of the car at the target position (Odaiba Beach Park), the matching processing section 2404 turns the result of determination at step SD2 to "Yes". At step SD3, the matching processing section 2404 activates the traveling distance measuring section 2402. Thus, the travel distance of the car from the target position (Odaiba Beach Park) is measured.

At step SD4, the matching processing section 2404 makes a determination as to whether or not the travel distance is equal to a set distance D, and in this case, the same determination is repeated with the result of determination being "No". This set distance D is an absolute value (1.0 km) of +1.0 km in the timing adjusting information 2500e. In other words, at step SD4, it is determined whether or not the car is located at an advanced position by 1.0 km from the target position (Odaiba Beach Park) as the start point.

As the car goes farther from the target position, the travel distance increases gradually. Here, when the car has arrived at an advanced position by 1.0 km from the target position (Odaiba Beach Park) as the start point, the matching processing section 2404 turns the result of determination at step SD4 to "Yes".

At step SC13 shown in FIG. 37, the control unit 2401 transmits guide information requesting information 600e shown in FIG. 12 to the guide information supplying device 200. At step SC14, the control unit 2401 determines whether or not guide information has been received from the guide information supplying device 200, and in this case, the same determination is repeated with the result of determination being "No".

When the guide information requesting information 600e has been received by the guide information supplying device 200, the control unit 202 turns the result of determination at step SB6 shown in FIG. 16 to "Yes". At step SB7, the control unit 202 retrieves the guide information database 207 shown in FIG. 36 for the guide information.

At step SB8, the control unit 202 transmits guide information 700e shown in FIG. 12 to the guide information requesting device 2400. At step SB9, the control unit 202 makes a determination as to whether or not an end point arrival notice has been given from the guide information requesting device 2400, and in this case, a determination at step SB6 is made, with the result of determination being "No".

When the guide information 700e shown in FIG. 12 has been received by the guide information requesting device 2400, the control unit 2401 turns the result of determination at step SC14 shown in FIG. 37 to "Yes". At step SC15, the control unit 2401 allows the display section 308 to display a guide screen 1700 shown in FIG. 26. At this point of time, the car has reached an advanced point by 1.0 km from the target position (Odaiba Beach Park) as the start point.

At step SC16, the control unit 2401 determines whether or not the car has arrived at the end point (Science Museum for Ships), and in this case, the result of determination is "No". Thereafter, until the car has arrived at the end point, the determination at step SC8 is carried out.

Here, the second embodiment has exemplified a case in which the timing of request is adjusted based upon the distance. However, instead of the distance, the above-mentioned adjustment may be carried out based upon time.

As described above, in accordance with the second embodiment, the timing of request given to the guide information supplying device 200 is adjusted so that, for example, prior to the arrival of the car at the target position (before event) or after the arrival of the car at the target position (after event), the guide information is supplied; thus, the driver is allowed to properly utilize the guide information in accordance with its characteristic.

In the first embodiment, as explained by reference to FIGS. 17 to 20, one route is selected among a plurality of routes that have been preliminarily determined; however, based upon the start point and end point that have been set by the driver, the guide information supplying device 200 may retrieve for routes and one route may be selected from the results of the route retrieval. The following description will discuss this case as a third embodiment.

Figure 41:
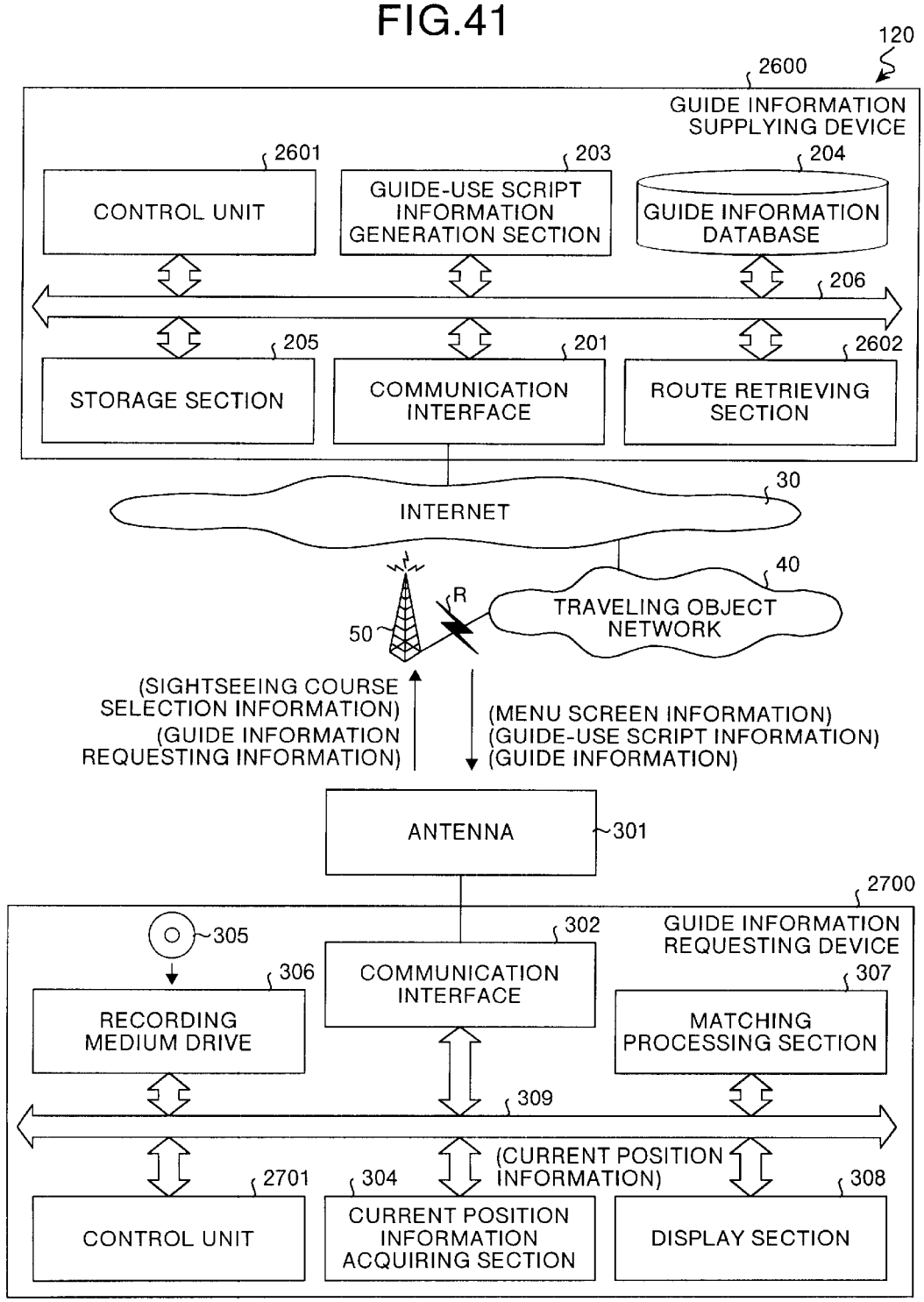
FIG. 41 is a block diagram that shows a construction of a third embodiment in the present invention.

FIG. 41 is a block diagram that shows a construction of the third embodiment in accordance with the present invention. In this figure, those parts that perform same or similar functions as the parts shown in FIG. 1 are indicated by the same reference numerals, and the description thereof is omitted. In a guide information supplying system 120 shown in this figure, in place of the guide information supplying device 200 and the guide information requesting device 300 shown in FIG. 1, a guide information supplying device 2600 and a guide information requesting device 2700 are installed.

In the guide information supplying device 2600, instead of the control unit 202 shown in FIG. 1, a control unit 2601 is installed, and a route retrieving section 2602 is newly installed. The operation of the control unit 2601 will be discussed in detail later by reference to flow charts.

Figure 42:
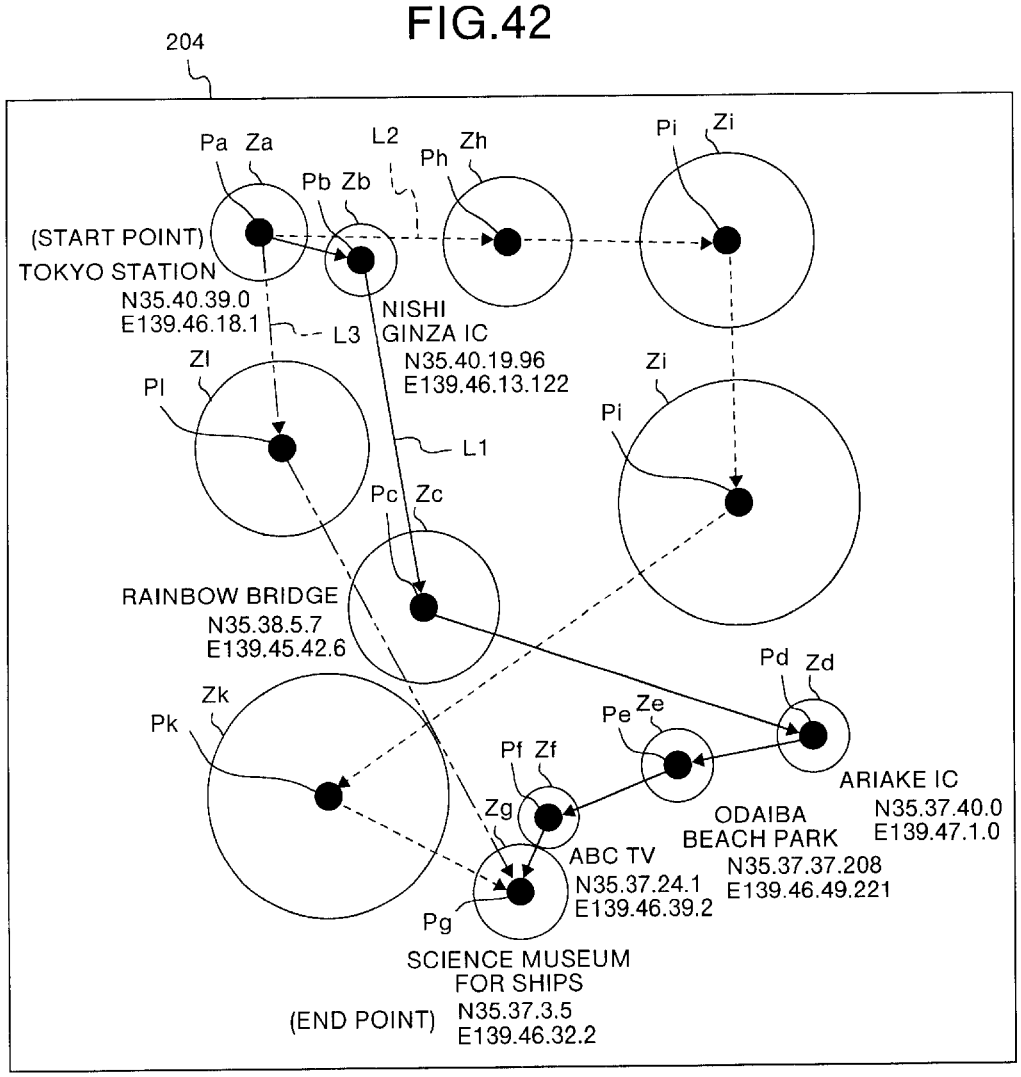
FIG. 42 is a drawing that explains the concept of a guide information database 204 shown in FIG. 41.

As shown in FIG. 42, based upon the start point (for example, Tokyo Station) and the end point (for example, Science Museum for Ships) the route retrieving section 2602 retrieves for routes. In an example shown in this figure, three routes, route L1, route L2 and route L3, have been found through the retrieval.

Here, in the guide information requesting device 2700 shown in FIG. 41, in place of the control unit 303 shown in FIG. 1, a control unit 2701 is installed. The operation of this control unit 2701 will be described in detail by reference to flow charts.

Figure 43:
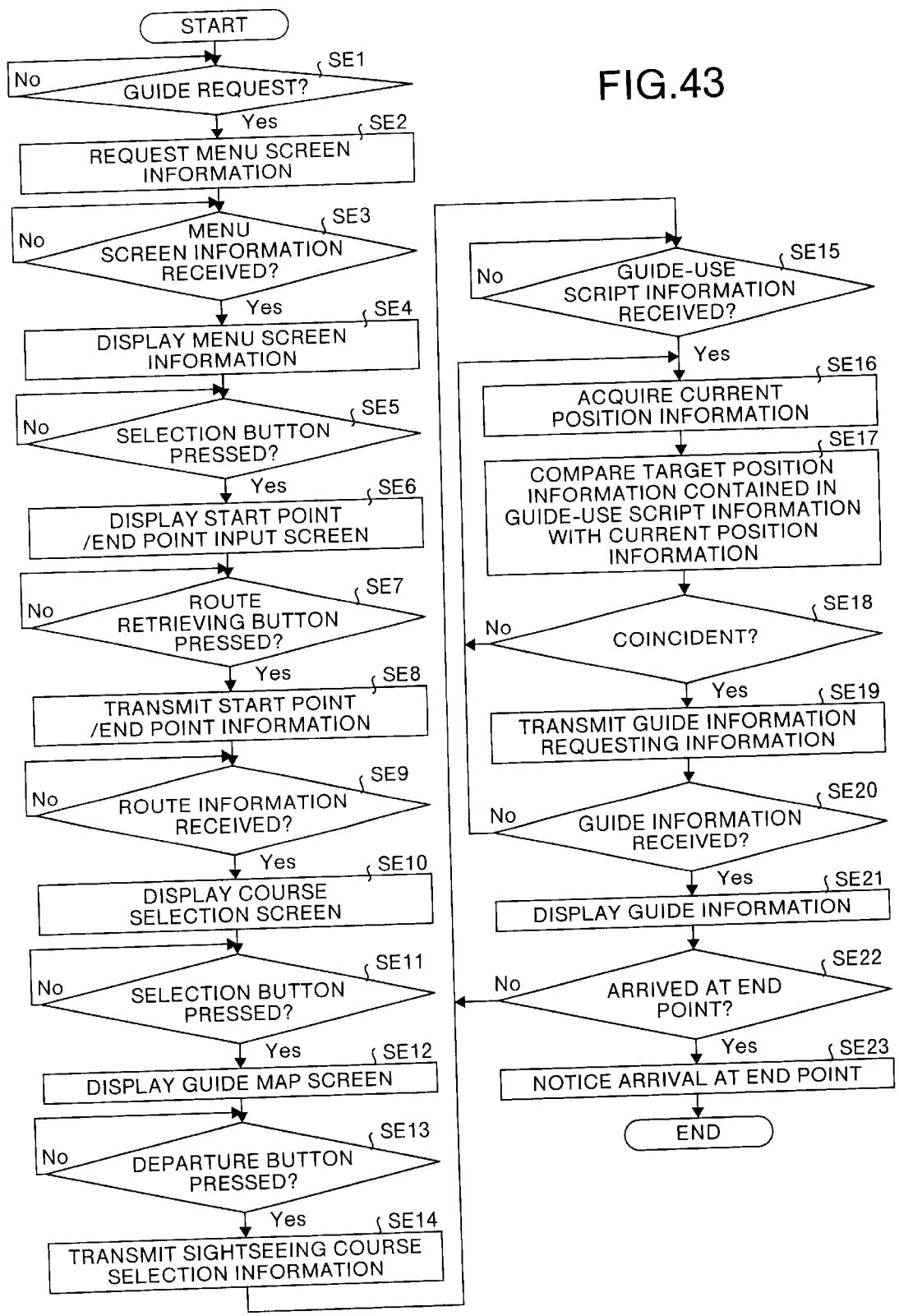
FIG. 43 is a flow chart that explains the operation of a guide information requesting device 2700 shown in FIG. 41.
Figure 44:
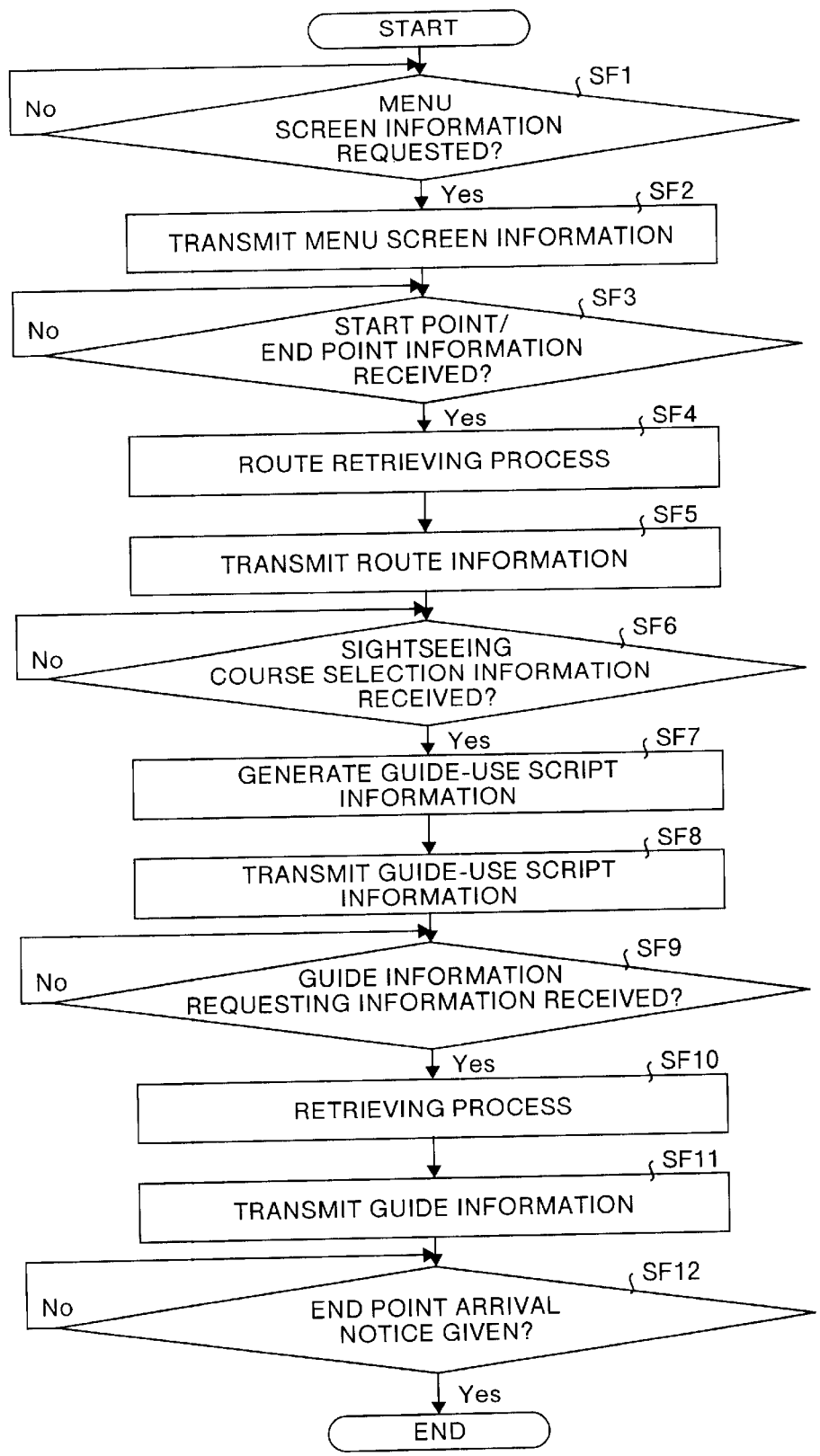
FIG. 44 is a flow chart that explains the operation of a guide information supplying device 2600 shown in FIG. 41.
Figure 45:
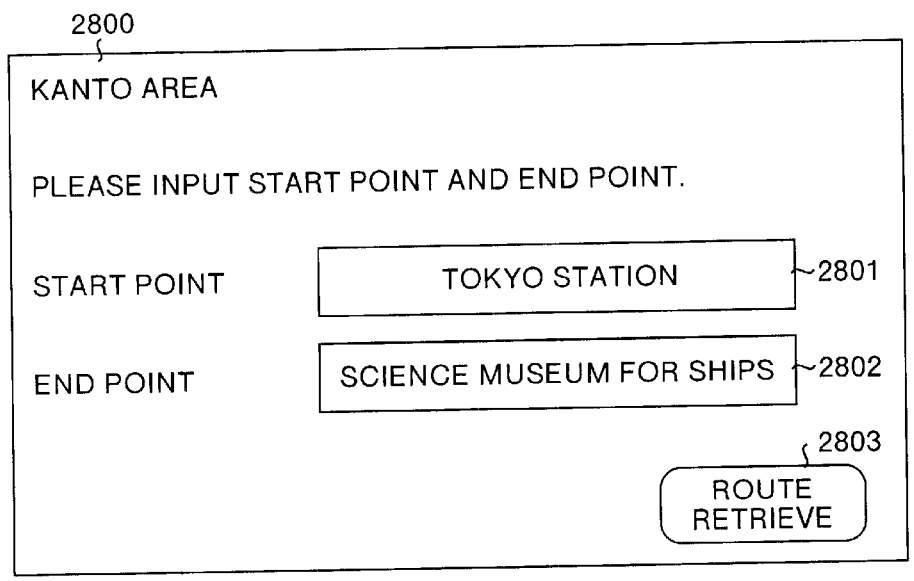
FIG. 45 is a drawing that shows a start point/endpoint input screen 2800 in the third embodiment.

Next, referring to flow charts shown in FIGS. 43 and 44 as well as to respective screens shown in FIGS. 45 and 46, the following description will discuss the operation of the third embodiment. FIG. 43 is a flow chart that explains the operation of the guide information requesting device 2700 shown in FIG. 41. FIG. 44 is a flow chart that explains the operation of the guide information supplying device 2600 shown in FIG. 41.

The following description will exemplify a case in which, after the start point (Tokyo Station) and the end point (Science Museum for Ships) shown in FIG. 42 have been specified in the Tokyo sightseeing course, a car provided with the guide information requesting device 2700 travels through route L1 among routes L1 to L3 that are the results of the route retrieval.

At step SE1 shown in FIG. 43, the control unit 2701 of the guide information requesting device 2700 makes a determination as to whether or not there is any guide request from the driver, and in this case, the same determination is repeated with the result of determination being "No".

At step SF1 shown in FIG. 44, the control unit 2601 of the guide information supplying device 2600 makes a determination as to whether or not there is any request for menu screen information from the guide information requesting device 2700, and in this case, the same determination is repeated with the result of determination being "No". The menu screen information discussed here is information used for allowing the display section 308 to display the respective screens (menu screens) shown in FIGS. 17, 21, 45 and 46.

When the driver has pressed a guide button (not shown), the control unit 2701 of the guide information requesting device 2700 turns the result of determination at step SE1 shown in FIG. 43 to "Yes". At step SE2, the control unit 2701 requests the guide information supplying device 2600 to send menu screen information.

Thus, the control unit 2601 of the guide information supplying device 2600 turns the result of determination at step SF1 shown in FIG. 44 to "Yes". At step SF2, the control unit 2601 transmits the menu screen information to the guide information requesting device 2700. At step SF3, the control unit 2601 makes a determination as to whether or not the start point/end point information related to the start point/end point of the sightseeing course has been received from the guide information requesting device 2700, and in this case, the same determination is repeated with the result of determination being "No".

At step SE3 shown in FIG. 43, the control unit 2701 makes a determination as to whether or not the menu screen information has been received, and in this case, the same determination is repeated with the result of determination being "No". When the menu screen information has been received by the guide information requesting device 2700, the control unit 2701 turns the result of determination at step SE3 shown in FIG. 43 to "Yes". At step SE4, the control unit 2701 allows the display section 308 to display a sightseeing area selection screen 800 shown in FIG. 17.

At step SE5, the control unit 2701 makes a determination as to which selection button among selection buttons 801, 802, 803, . . . shown in FIG. 17 has been pressed, and in this case, the same determination is repeated with the result of determination being "No".

When one of the selection buttons 801 (Kanto) has been pressed by the driver, the control section 2701 turns the result of determination at step SE5 shown in FIG. 43 to "Yes". At step SE6, the control section 2701 allows the display section 308 to display a start point/end point input screen 2800 shown in FIG. 45.

This start point/end point input screen 2800 is a screen for allowing the driver to input the start point and end point in the sightseeing route in Kanto area. The start point/end point input screen 2800 displays a start point information input frame 2801 for the start point input, an end point information input frame 2802 for the end point input and a route retrieving button 2803.

At step SE7, the control section 2701 makes a determination as to whether or not the route retrieving button 2803 has been pressed, and in this case, the same determination is repeated with the result of determination being "No". When, after having inputted "Tokyo Station" through the start point information input frame 2801 and "Science Museum for Ships" through the end point information input frame 2802, the driver presses the route retrieving button 2803, the control unit 2701 turns the result of determination at step SE7 to "Yes".

At step SE8, the control unit 2701 transmits the start point/end point information (Tokyo Station/Science Museum for Ships) to the guide information supplying device 2600. At step SE9, the control unit 2701 makes a determination as to whether or not the route information has been received from the guide information supplying device 2600, and in this case, the same determination is repeated with the result of determination being "No".

When the start point/end point information (Tokyo Station/Science Museum for Ships) has been received by the guide information supplying device 2600, the control section 2601 turns the result of determination at step SF3 shown in FIG. 44 to "Yes". At step SF4, based upon the start point/end point information (Tokyo Station/Science Museum for Ships) and the guide information database 204 shown in FIG. 42, the route retrieving section 2602 carries out a route retrieving process. In this case, it is assumed that three routes, route L1, route L2 and route L3, shown in FIG. 42, have been found.

At step SF5, the control unit 2601 transmits route information corresponding to routes L1 to L3 to the guide information requesting device 2700. At step SF6, in the same manner as step SB3 (see FIG. 16), the control unit 2601 makes a determination as to whether or not the sightseeing course selection information has been received, and in this case, the same determination is repeated with the result of determination being "No".

When the above-mentioned route information has been received by the guide information requesting device 2700, the control section 2701 turns the result of determination at step SE9 shown in FIG. 43 to "Yes". At step SE10, based upon the route information, the control unit 2701 allows the display section 308 to display a course selection screen 2900 shown in FIG. 46.

This course selection screen 2900 is a screen for allowing the driver to select one course from the three courses (routes) of the routes L1 to L3 shown in FIG. 42. The course selection screen 2900 displays a route retrieving result display frame 2901 and a course selection section 2902.

The course selection section 2902 displays detailed information of respective courses, numbers 1 to 3 (corresponding to routes L1 to L3), and selection buttons 2903 to 2905 for course selection. At step SE11, the control unit 2701 makes a determination as to whether or not any one of the selection buttons of 2903 to 2905 has been pressed, and in this case, the same determination is repeated with the result of determination being "No".

When selection button 2903 corresponding to number 1 (route L1: Rainbow Town stroll course) has been pressed by the driver, the control section 2701 turns the result of determination at step SE11 to "Yes". At step SE12, the control unit 2701 allows the control unit 2701 to display a guide map screen 1200 shown in FIG. 21.

Thereafter, the guide information requesting device 2700 executes the processes of steps SE13 to SE23 in the same manner as the steps SA5 to SA15 (see FIG. 15). In the same manner as steps SB3 to SB9 shown in FIG. 16, the guide information supplying device 2600 also executes the processes of step SF6 to SF12 shown in FIG. 44.

As described above, in accordance with the third embodiment, as shown in FIG. 42, after the route searching section 2602 has retrieved for a plurality of routes L1 to L3 based upon the start point/end point information inputted through the start point/end point input screen 2800 shown in FIG. 45, the driver is allowed to select any one of the routes L1 to L3. Therefore, it is possible to provide a convenient device for the driver.

The first embodiment has exemplified a case in which the guide information supplying device 200 shown in FIG. 1 manages the guide information in a concentrated manner. However, the guide information may be divided into a plurality of pieces based upon categories and stored in a plurality of servers, and the guide information requesting device 300 may download the guide information from these servers, if necessary. The following description will discuss such a case as a fourth embodiment.

FIG. 47 is a block diagram that shows a construction of the fourth embodiment in the present invention. In this figure, those parts that perform same or similar functions as the parts shown in FIG. 1 are indicated by the same reference numbers. In the guide information supplying system 130 in this figure, in place of the guide information supplying device 200 and the guide information requesting device 300 shown in FIG. 1, a guide information supplying device 3000 and a guide information requesting device 3200 are installed.

Moreover, as shown in FIG. 47, the following servers and databases are provided. That is, station information server 3100, station information database 3101, expressway information server 3102, expressway information database 3103, park information server 3104, park information database 3105, television station information server 3106, television station information database 3107, museum information server 3108, and museum information database 3109, etc.

In the guide information supplying device 3000, in place of the control unit 202 and the guide information database 3002 shown in FIG. 1, the control section 3001 and the guide information database 3002 are placed. With respect to the detailed operation of the control section 3001, it will be discussed later by reference to flowcharts. The guide information database 3002 has a table structure shown in FIG. 48.

In FIG. 48, those parts that perform same or similar functions as the parts shown in FIG. 2 are indicated by the same reference numerals. In this figure, a field named "pointer information" is set in place of "guide information" shown in FIG. 2. This "pointer information" is information representing pointers to URLs in which the pieces of guide information are stored. The pieces of pointer information Ua to Uk correspond to pieces of guide information Za to Zk shown in FIG. 2.

Pieces of guide information Za to Zk are stored in the station information database 3101, the expressway information database 3103, the park information database 3105, the television station information database 3107, the museum information database 3109, etc., shown in FIG. 47, in a dispersed manner, by using the categories as keys.

As shown in FIG. 49, the station information database 3101 is database that stores guide information Za, . . . (see FIG. 2) belonging to the category=station in association with pointer information. As shown in FIG. 50, the expressway information database 3103 is a database that stores guide information Zb, guide information Zc, guide information Zd, . . . (see FIG. 2) that belong to the category= Metropolitan expressway in association with pointer information.

The park information database 3105 is a database that stores guide information Ze, . . . (see FIG. 2) belonging to the category=park in association with pointer information. The TV station information database 3107 is a database that stores guide information Zf, . . . (see FIG. 2) belonging to the category=television station in association with pointer information. The museum information database 3109 is a database that stores guide information Zg, . . . belonging to the category=museum in association with pointer information.

When the guide information requesting device 3200 accesses a URL related to the corresponding pointer information, the station information server 3100 allows it to download the corresponding guide information from the station information database 3101. When the guide information requesting device 3200 accesses a URL related to the corresponding pointer information, the expressway information server 3102 allows it to download the corresponding guide information from the expressway information database 3103.

When the guide information requesting device 3200 accesses a URL related to the corresponding pointer information, the park information server 3104 allows it to download the corresponding guide information from the park information database 3105. When the guide information requesting device 3200 accesses a URL related to the corresponding pointer information, the television station information server 3106 allows it to download the corresponding guide information from the television station database 3107.

When the guide information requesting device 3200 accesses a URL related to the corresponding pointer information, the museum information server 3108 allows it to download the corresponding guide information from the museum information database 3109.

Moreover, in the guide information requesting device 3200, in place of the control unit 303 shown in FIG. 1, a control section 3201 is installed. The detailed operation of this control section 3201 will be described later by reference to flow charts.

Referring to flow charts shown in FIGS. 51 and 52, an explanation will be given of the operation of the fourth embodiment. FIG. 51 is a flow chart that explains the operation of the guide information requesting device 3200 shown in FIG. 47. FIG. 52 is a flow chart that explains the operation of the guide information requesting device 3000 shown in FIG. 47.

In the same manner as the first embodiment, the following description will discuss a case in which a car provided with the guide information requesting device 3200 travels through route L1 (Tokyo Station (start point) to Science Museum for Ships (end point)) shown in FIG. 5.

At step SG1 shown in FIG. 51, the control section 3201 of the guide information requesting device 3200 makes a determination as to whether or not there is any guide request from the driver, and in this case, the same determination is repeated with the result of determination being "No".

At step SH1 shown in FIG. 51, the control unit 3001 of the guide information supplying device 3000 makes a determination as to whether or not there is any request for menu screen information from the guide information requesting device 3200, in the same manner as step SB1 (see FIG. 16), and in this case, the same determination is repeated with the result of determination being "No".

When the driver has pressed a guide button (not shown), the control section 3201 of the guide information requesting a device 3200 turns the result of determination at step SG1 shown in FIG. 51 to "Yes". At step SG2, in the same manner as step SA2 (see FIG. 15), the control unit 3201 requests the guide information supplying device 3000 to send menu screen information.

Thus, the control unit 3001 of the guide information supplying device 3000 turns the result of determination at step SH1 shown in FIG. 51 to "Yes". At step SH2, the control unit 3001 transmits the corresponding menu screen information to the guide information requesting device 3200. At step SH3, in the same manner as step SB3 (see FIG. 16), the control unit 3001 makes a determination as to whether or not sightseeing course selection information has been received, and in this case, the same determination is repeated with the result of determination being "No".

At step SG3 shown in FIG. 51, the control unit 3201 makes a determination as to whether or not the menu screen information has been received, and in this case, the same determination is repeated with the result of determination being "No". When the menu screen information has been received by the guide information requesting device 3200, the control unit 3201 turns the result of determination at step SG3 shown in FIG. 51 to "Yes". Thereafter, at steps SG4 to SG6, the same operations as the aforementioned steps SA4 to SA6 (see FIG. 15) are carried out.

In other words, if the departure button 1202 shown in FIG. 21 is depressed, at step SG6, the control unit 3201 transmits the sightseeing course selection information indicating that the above-mentioned Rainbow Town stroll course has been selected to the guide information supplying device 3000. At step SG7, the control section 3201 determines whether or not guide-use script information (see FIGS. 53 and 54) has been received from the guide information supplying device 3000, and in this case, the same determination is repeated with the result of determination being "No".

When the sightseeing course selection information has been received by the guide information supplying device 3000, the control unit 3001 of the guide information supplying device 3000 turns the result of determination at step SH3 shown in FIG. 52 to "Yes". At step SH4, the guide-use script information generation section 203 generates guide-use script information 3300 (see FIGS. 53 and 54) corresponding to Rainbow Town stroll course (route L1: see FIG. 5).

In the guide-use script information 3300, those parts that perform same or similar functions as the parts shown in FIGS. 6 and 7 are indicated by the same reference numerals. With respect to the guide-use script information 3300 shown in FIG. 53, pointer information 3300*a* that is paired with target position information 520*a* is added thereto. This pointer information 3300*a*, which corresponds to pointer information Ua shown in FIG. 48, is URL information of guide information Za shown in FIG. 49.

Moreover, with respect to the guide-use script information 3300 shown in FIG. 53, pointer information 3300*b* that is paired with target position information 520*b* is added thereto. This pointer information 3300*b*, which corresponds to pointer information Ub (FIG. 48), is URL information of guide information Zb shown in FIG. 50.

In the same manner, with respect to the guide-use script information 3300 shown in FIG. 53, pointer information 3300*c* that is paired with target position information 520*c* is added thereto, and pointer information 3300*d* that is paired with target position information 520*d* is also added thereto.

Moreover, with respect to the guide-use script information 3300 shown in FIG. 54, pointer information 3300*e* paired with target position information 520*e*, pointer information 3300*f* paired with target position information 520*f* and pointer information 3300*g* paired with target position information 520*g* are respectively added thereto.

At step SH5 shown in FIG. 52, after having transmitted the guide-use script information 3300 shown in FIGS. 53 and 54 to the guide information requesting device 3200, the control unit 3001 completes a sequence of processes related to route L1.

When the guide-use script information 3300 has been received by the guide information requesting device 3200, the control unit 3201 turns the result of determination at step SG7 shown in FIG. 51 to "Yes". At step SG8, the matching processing section 307 acquires current position information (latitude/longitude) representing the current position of the car from the current position information acquiring section 304 every fixed interval of time.

At step SG9, the matching processing section 307 compares current position information acquired at step SG8 with pieces of target position information 520*a* to 520*g* contained in FIGS. 53 and 54. At step SG10, based upon the results of comparison at step SG9, the matching processing section 307 makes a determination as to whether or not the target position information and the current position information are coincident with each other within a predetermined range of error, and in this case, the result of determination is "No". Thereafter, the processes of steps SG8 to SG10 are repeated until the result of determination at step SG10 has become "Yes".

Upon arrival of the car at Tokyo Station (see FIG. 5), the matching processing section 307 turns the result of determination at step SG10 to "Yes" since the current position information acquired at step SG8 and the target position information 520*a* shown in FIG. 53 are made coincident with each other within a predetermined range of error.

At step SG11, the control section 3201 makes an access to URL http://www.station/tokyo.txt indicated by pointer information 3300*a* shown in FIG. 53. In other words, the control unit 3201 accesses the station information server 3100 so as to directly download guide information Za shown in FIG. 49. At step SG12, the control unit 3201 determines whether or not the download of guide information Za has been finished, and in this case, the same determination is repeated with the result of determination being "No".

Upon completion of the download of guide information Za, the control unit 3201 turns the result of determination at step SG12 to "Yes". At step SG13, the control unit 3201 allows the display section 308 to display the guide screen 1300 shown in FIG. 22.

At step SG14, the control unit 3201 determines whether or not the car has arrived at the end point (Science Museum for Ships), and in this case, the result of determination is "No". Thereafter, the processes of steps SG8 to SG14 are repeated until the car has arrived at the end point.

Moreover, the driver receives guide information related to Tokyo Station from the guide screen 1300. Then, the driver drives the car toward Nishi Ginza IC that is the next target position along route L1 (see FIG. 5).

Upon arrival of the car at Nishi Ginza IC (see FIG. 5), the matching processing section 307 turns the result of determination at step SG10 to "Yes" since the current position information acquired at step SG8 and the target position information 520*b* shown in FIG. 53 are made coincident with each other within a predetermined range of error.

At step SG11, the control section 3201 makes an access to URL http://www.highway/nishiginza.txt indicated by pointer information 3300b shown in FIG. 53. In other words, the control unit 3201 accesses the expressway information server 3102 so as to directly download guide information Zb shown in FIG. 50. At step SG12, the control unit 3201 determines whether or not the download of guide information Zb has been finished, and in this case, the same determination is repeated with the result of determination being "No".

Upon completion of the download of guide information Zb, the control unit 3201 turns the result of determination at step SG12 to "Yes". At step SG13, the control unit 3201 allows the display section 308 to display the guide screen 1400 shown in FIG. 23.

At step SG14, the control unit 3201 determines whether or not the car has arrived at the end point (Science Museum for Ships), and in this case, the result of determination is "No". Thereafter, the processes of steps SG8 to SG14 are repeated until the car has arrived at the end point.

As described above, in accordance with the fourth embodiment, pieces of guide information are stored in the station information database 3101, the expressway information database 3103, etc., shown in FIG. 47, in a dispersed manner, and the guide information requesting device 3200 is allowed to download guide information from any of the databases, that is, the station information database 3101, the expressway information database 3103, etc. Therefore, it becomes possible to further reduce the load of each server, and consequently to improve the processing capability as a whole.

Four embodiments in accordance with the present invention have been explained above. However, specific structural examples are not intended to be limited by the first to fourth embodiments, and it will be obvious that same may be varied in many ways, but such variations are not to be regarded as a departure from the spirit and scope of the present invention.

Figure 55:
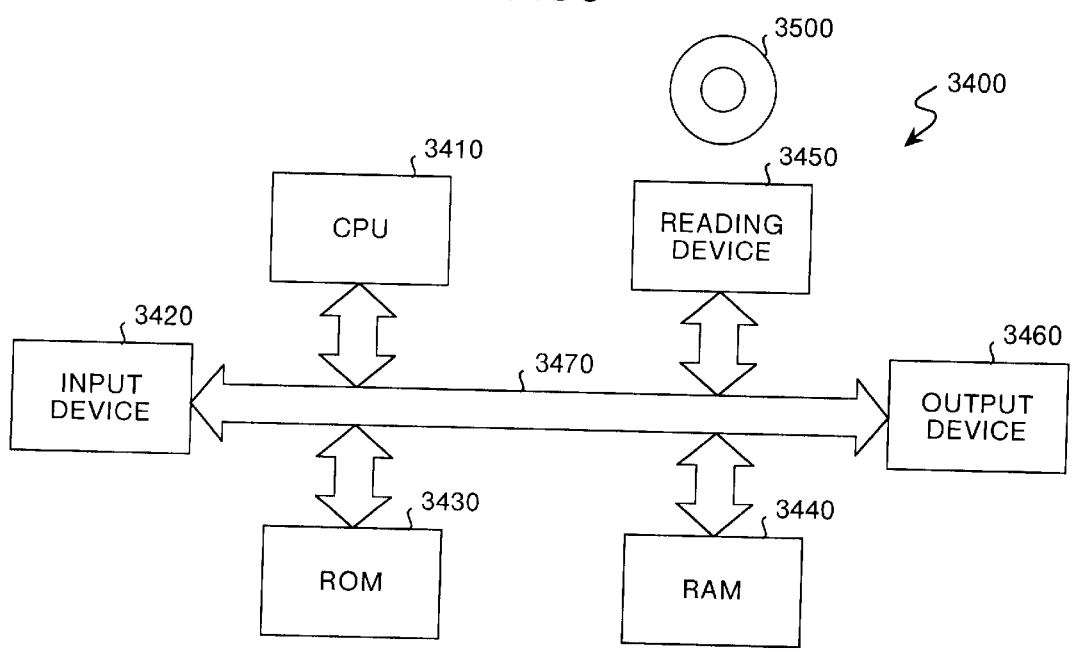
FIG. 55 is a block diagram that shows a construction of a modified example of the first to fourth embodiments.

For example, in the first to fourth embodiments, a guide information requesting program for achieving the functions of the aforementioned guide information requesting devices 300, 2400, 2700 and 3200 or a guide information supplying program for achieving the functions of the aforementioned guide information supplying devices 200, 2600, 3000 may be recorded in a computer-readable recording medium 3500 shown in FIG. 55, and the program recorded in this recording medium 3500 is read by a computer 3400 shown in the same figure so that the aforementioned sequence of processes may be executed.

The computer 3400, shown in the figure, is provided with a CPU 3410 for executing the above-mentioned program, an input device 3420, such as a key board and a mouse, a ROM (Read Only Memory) 3430 that stores various data, a RAM (Random Access Memory) 3440 that stores operation parameters, etc., a reading device 3450 for reading the program from the recording medium 3500, a display, an output device 3460 such as a printer, and a bus 3470 for connecting the respective parts.

After having read the program recorded in the recording medium 3500 via the reading device 3450, the CPU 3410 executes the program so that the aforementioned sequence of processes is carried out. Here, the recording medium 3500 includes a portable-type recording medium, such as an optical disk, a floppy disk, and a hard disk, and a transfer medium such as a network, that temporarily records and holds the data.

Moreover, in the first to fourth embodiments, the explanation has exemplified a case in which, based upon a position (target position, current position) as one example of situations, guide information is requested. However, guide information may be requested based upon another situation (such as the attitude of the driver, kind of the car, the behavior of the driver, peripheral environments and relationship with other people).

Furthermore, in the first to fourth embodiments, the present invention is applied to a car navigation system (guide information supplying device), however, the present invention may also be applied to mobile terminals, such as a mobile telephone terminal, a PHS terminal and a PDA.

As described above, in accordance with the present invention, it is not until there is a match between a normal situation and the current situation that a request is given to the guide information supplying device. Therefore, in comparison with the conventional system in which the guide information supplying device is always accessed every fixed interval of time or a database including unnecessary guide information needs to be downloaded, it is possible to reduce the network load and load on the guide information supplying device side.

Moreover, information indicating a normal situation is transmitted to the guide information supplying device as a pointer for guide information. Therefore, based upon the pointer, the guide information supplying device can readily retrieve and supply the corresponding guide information.

Furthermore, among a plurality of external guide information supplying devices, a request is given to any one of these guide information supplying devices in a dispersed manner. Therefore, it is possible to further reduce the load of each guide information supplying device, and consequently to improve the processing capability as a whole.

Moreover, the timing of request given to the guide information supplying device is adjusted so that, for example, prior to an event or after the event, the guide information is supplied. Therefore, the user is allowed to properly utilize the guide information in accordance with its characteristic.

Furthermore, it is not until there is a match between target position information and the current position information that a request is given to the guide information supplying device. Therefore, in comparison with the conventional system in which the guide information supplying device is always accessed every fixed interval of time or a database including unnecessary guide information needs to be downloaded, it is possible to reduce the network load and load on the guide information supplying device side.

Moreover, it is not until there is a match between a normal situation and the current situation that a request is received from the guide information requesting device. Therefore, in comparison with the conventional system in which the guide information supplying device is always accessed every fixed interval of time or a database including unnecessary guide information needs to be downloaded, it is possible to reduce the network load and load on the guide information supplying device side.

Furthermore, normal situation information consisting of a sequence of predetermined normal situations is generated, and the normal situation information is supplied to the guide information requesting device. Therefore, it becomes possible to reduce the load imposed on the guide information requesting device. In particular, even in the case of a small-size guide information requesting device having a small storage area and the subsequent low processing capability, it is possible to reduce the network load and the load imposed on the guide information supplying device.

Moreover, it is not until there is a match between target position information and the current position information that a request is received from the guide information requesting device. Therefore, in comparison with the conventional system in which the guide information supplying device is always accessed every fixed interval of time or a database including unnecessary guide information needs to be downloaded, it is possible to reduce the network load and load on the guide information supplying device side.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A guide information requesting device comprising:
    a situation information acquiring unit which acquires current situation information related to a current situation concerning a traveling object every predetermined interval of time;
    a matching unit which carries out a matching between a normal situation and the current situation, based upon the normal situation information including a sequence of a plurality of predetermined normal situations and the current situation information;
    a requesting unit which, if there is a match between the normal situation and the current situation, requests an external guide information supplying device to send guide information related to the normal situation, through a network; and
    a presenting unit which presents the guide information supplied by the guide information supplying device through the network.

2. The guide information requesting device according to claim 1, wherein said requesting unit transmits information indicating the normal situation to said guide information supplying device as a pointer for the guide information.

3. The guide information requesting device according to claim 1, wherein said requesting unit carries out the request to any of guide information supplying devices among a plurality of external guide information supplying devices in a scattered manner.

4. The guide information requesting device according to claim 1, further comprising a request timing adjusting unit which adjusts the timing when a request is given to said guide information supplying device.

5. A guide information requesting device comprising:
    a current position information acquiring unit which acquires current position information related to a current position concerning a traveling object every predetermined interval of time;
    a matching unit which carries out a matching between target position information including a sequence of target positions located on a route through which said traveling object shifts and the current position information;
    a requesting unit which, if there is a match between the target position information and the current position information, requests an external guide information supplying device to send guide information related to the target position, through a network; and
    a presenting unit which presents the guide information supplied by the guide information supplying device through the network.

6. The guide information requesting device according to claim 5, wherein said requesting unit transmits information indicating the target position to said guide information supplying device as a pointer for the guide information.

7. The guide information requesting device according to claim 5, wherein said requesting unit transmits information related to a storage location of said guide information to said guide information supplying device as a pointer for the guide information.

8. The guide information requesting device according to claim 5, wherein said requesting unit transmits a retrieving program used for retrieving a database for said guide information to said guide information supplying device.

9. The guide information requesting device according to claim 5, wherein said requesting unit carries out the request to any of guide information supplying devices among a plurality of external guide information supplying devices in a scattered manner.

10. The guide information requesting device according to claim 5, further comprising a request timing adjusting unit which adjusts the timing when a request is given to said guide information supplying device.

11. The guide information requesting device according to claim 5, further comprising a route selection unit which, based upon information of a start point and an end point that have been specified by the user, retrieves for a plurality of routes and allows the driver to select a desired route from the plurality of routes.

12. A computer program containing instructions which when executed on a computer realizes following units:
    a situation information acquiring unit which acquires current situation information related to a current situation concerning a traveling object every predetermined interval of time;
    a matching unit which carries out a matching between a normal situation and the current situation, based upon the normal situation information including a sequence of a plurality of predetermined normal situations and the current situation information;
    a requesting unit which, if there is a match between the normal situation and the current situation, requests an external guide information supplying device to send guide information related to the normal situation, through a network; and
    a presenting unit which presents the guide information supplied by the guide information supplying device through the network.

13. A guide information requesting method comprising the steps of:
    acquiring current situation information related to a current situation concerning a traveling object every predetermined interval of time;
    carrying out a matching between a normal situation and the current situation, based upon the normal situation information including a sequence of a plurality of predetermined normal situations and the current situation information;
    if there is a match between the normal situation and the current situation, requesting an external guide information supplying device to send guide information related to the normal situation, through a network; and
    presenting the guide information supplied by the guide information supplying device through the network.

14. A computer program containing instructions which when executed on a computer realizes following units:
    a current position information acquiring unit which acquires current position information related to a current position concerning a traveling object every predetermined interval of time;

a matching unit which carries out a matching between target position information including a sequence of target positions located on a route through which said traveling object shifts and the current position information;

a requesting unit which, if there is a match between the target position information and the current position information, requests an external guide information supplying device to send guide information related to the target position, through a network; and a presenting unit which presents the guide information supplied by the guide information supplying device through the network.

15. A guide information requesting method comprising the steps of:

acquiring current position information related to a current position concerning a traveling object every predetermined interval of time;

carrying out a matching between target position information including a sequence of target positions located on a route through which said traveling object shifts and the current position information;

if there is a match between the target position information and the current position information, requesting an external guide information supplying device to send guide information related to the target position, through a network; and presenting step for presenting the guide information supplied by the guide information supplying device through the network.

16. A guide information supplying device comprising:

a request receiving unit which, if there is match between a current situation related to a traveling object and a predetermined normal situation, receives a request for receiving a supply of guide information related to the normal situation from a guide information requesting device through a network; and a supply unit which, when the request has been accepted, supplies guide information related to the normal situation to said guide information requesting device through the network.

17. The guide information supplying device according to claim 16, wherein said request receiving unit receives the information concerning a pointer for the guide information as the request, and said supply unit retrieves a database for the guide information in accordance with the pointer so as to supply the guide information to the guide information requesting device through the network.

18. The guide information supplying device according to claim 16, further comprising a normal situation information generation unit which generates normal situation information including a sequence of predetermined normal situations, and for supplying the normal situation information to said guide information requesting device.

19. The guide information supplying device according to claim 16, further comprising a timing adjusting information generation unit which generates timing adjusting information that adjusts the timing in said guide information requesting device, and for supplying the timing adjusting information to said guide information requesting device.

20. A guide information supplying device comprising:

a request receiving unit which, if there is a match between a current position of a traveling object and a target position located on a route through which said traveling object shifts, receives a request for receiving a supply of guide information related to the target position from a guide information requesting device through a network; and a supply unit which, when the request has been accepted, supplies guide information related to the target position to said guide information requesting device through the network.

21. A computer program containing instructions which when executed on a computer realizes following units:

a request receiving unit which, if there is a match between a current situation related to a traveling object and a predetermined normal situation, receives a request for receiving a supply of guide information related to the normal situation from a guide information requesting device through a network; and a supply unit which, when the request has been accepted, supplies guide information related to the normal situation to said guide information requesting device through the network.

22. A guide information supplying method comprising the steps of:

if there is a match between a current situation related to a traveling object and a predetermined normal situation, receiving a request for receiving a supply of guide information related to the normal situation from a guide information requesting device through a network; and when the request has been accepted, supplies guide information related to the normal situation to said guide information requesting device through the network.

23. A computer program containing instructions which when executed on a computer realizes following units:

a request receiving unit which, if there is a match between a current position of a traveling object and a target position located on a route through which said traveling object shifts, receives a request for receiving a supply of guide information related to the target position from a guide information requesting device through a network; and a supply unit which, when the request has been accepted, supplies guide information related to the target position to said guide information requesting device through the network.

24. A guide information supplying method comprising the steps of:

if there is a match between a current position of a traveling object and a target position located on a route through which said traveling object shifts, receives a request for receiving a supply of guide information related to the target position from a guide information requesting device through a network; and when the request has been accepted, supplies guide information related to the target position to said guide information requesting device through the network.

* * * * *